(12) United States Patent
Matsui et al.

(10) Patent No.: US 12,366,049 B2
(45) Date of Patent: Jul. 22, 2025

(54) SWIVEL WORKING MACHINE

(71) Applicant: Kubota Corporation, Osaka (JP)

(72) Inventors: Kiyoshi Matsui, Sakai (JP); Junki Ito, Sakai (JP); Masamitsu Date, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 18/900,386

(22) Filed: Sep. 27, 2024

(65) Prior Publication Data
US 2025/0019928 A1   Jan. 16, 2025

Related U.S. Application Data

(63) Continuation of application No. PCT/JP2023/011856, filed on Mar. 24, 2023.

(30) Foreign Application Priority Data

| Mar. 31, 2022 | (JP) | 2022-060012 |
| Mar. 31, 2022 | (JP) | 2022-060013 |
| Mar. 31, 2022 | (JP) | 2022-060014 |
| Mar. 31, 2022 | (JP) | 2022-060026 |

(51) Int. Cl.
*E02F 9/08* (2006.01)

(52) U.S. Cl.
CPC .......... *E02F 9/0866* (2013.01); *E02F 9/0808* (2013.01)

(58) Field of Classification Search
CPC ......... E02F 3/04; E02F 3/3604; E02F 3/3677; E02F 3/3681
See application file for complete search history.

(56) References Cited

U.S. PATENT DOCUMENTS

| 6,990,757 | B2 * | 1/2006 | Takemura | E02F 9/0883 37/417 |
| 7,320,380 | B2 * | 1/2008 | Ueda | E02F 9/0833 296/190.08 |
| 7,481,289 | B2 * | 1/2009 | Ueda | B62D 33/0625 180/89.12 |
| 7,500,532 | B2 * | 3/2009 | Koga | E02F 9/121 296/190.04 |

(Continued)

FOREIGN PATENT DOCUMENTS

| EP | 0879920 A2 | 11/1998 |
| EP | 3975315 A1 | 3/2022 |

(Continued)

OTHER PUBLICATIONS

International Search Report in PCT/JP2023/011856, mailed May 30, 2023, 3 pages.

(Continued)

*Primary Examiner* — Toan C To
(74) *Attorney, Agent, or Firm* — Keating & Bennett, LLP

(57) ABSTRACT

A swivel working machine includes a swivel base, a battery, a support to support a battery on or above the swivel base, an electric motor to be driven by electricity outputted by the battery, a hydraulic pump to be driven by the electric motor to deliver hydraulic fluid, a support portion to support the electric motor and the hydraulic pump on or above the swivel base. The support portion is separate from the support body and attached to the swivel base via a plurality of mounting devices.

20 Claims, 28 Drawing Sheets

(56) References Cited

U.S. PATENT DOCUMENTS

| | | | |
|---|---|---|---|
| 7,503,419 B2* | 3/2009 | Miyake | E02F 9/0808 |
| | | | 180/326 |
| 7,788,915 B2* | 9/2010 | Shiozaki | F15B 21/14 |
| | | | 60/413 |
| 11,781,291 B2* | 10/2023 | Nishigori | B60N 2/75 |
| | | | 180/315 |
| 12,146,295 B2* | 11/2024 | Kitahara | E02F 9/2246 |
| 12,276,084 B2* | 4/2025 | Danguchi | E02F 9/24 |
| 2011/0073402 A1 | 3/2011 | Manabe et al. | |
| 2020/0263763 A1 | 8/2020 | Cai et al. | |
| 2022/0275601 A1 | 9/2022 | Kunizawa et al. | |
| 2023/0417015 A1 | 12/2023 | Kitahara et al. | |

FOREIGN PATENT DOCUMENTS

| | | |
|---|---|---|
| JP | S6034123 U | 3/1985 |
| JP | H11021947 A | 1/1999 |
| JP | 2008019616 A | 1/2008 |
| JP | 2011073490 A | 4/2011 |
| JP | 2011089369 A | 5/2011 |
| JP | 2014237943 A | 12/2014 |
| JP | 2019127751 A | 8/2019 |
| JP | 2020016286 A | 1/2020 |
| JP | 2020196432 A | 12/2020 |
| JP | 2021080705 A | 5/2021 |
| JP | 2021155991 A | 10/2021 |
| JP | 2022038128 A | 3/2022 |
| JP | 2022097079 A | 6/2022 |
| WO | 2020213673 A1 | 10/2020 |

OTHER PUBLICATIONS

Official Communication issued in Japanese Patent Application No. 2022-060012, Date of Submission Oct. 18, 2023, 2 pages.

* cited by examiner

SWIVEL WORKING MACHINE

CROSS REFERENCE TO RELATED APPLICATIONS

This application is a continuation application of International Application No. PCT/JP2023/011856, filed on Mar. 24, 2023, which claims the benefit of priority to Japanese Patent Application No. 2022-060012, filed on Mar. 31, 2022, to Japanese Patent Application No. 2022-060013, filed on Mar. 31, 2022, to Japanese Patent Application No. 2022-060014, filed on Mar. 31, 2022, and to Japanese Patent Application No. 2022-060026, filed on Mar. 31, 2022. The entire contents of each of these applications are hereby incorporated herein by reference.

BACKGROUND OF THE INVENTION

1. Field of the Invention

The present invention relates to swivel working machines such as backhoes.

2. Description of the Related Art

A swivel working machine disclosed in Japanese Unexamined Patent Application Publication No. 2014-237943 includes a swivel base, a hydraulic device provided on a swivel base, a battery, an electric motor driven by electricity outputted by a battery, and a hydraulic pump to be driven by the electric motor to deliver hydraulic fluid, and the battery includes a main secondary battery and an auxiliary secondary battery. The main secondary battery is provided at the central portion of the swivel base, the hydraulic pump and the electric motor are provided at the rear portion of the swivel base, and the auxiliary secondary battery is provided at a side portion of the swivel base.

A working vehicle disclosed in Japanese Unexamined Patent Application Publication No. 2011-89369 includes a swivel base frame, a hydraulic device provided on the swivel base frame, a battery provided on the swivel base frame, an electric motor provided on the swivel base frame to rotate an output shaft using electricity outputted by the battery, and a hydraulic pump provided on the swivel base frame to deliver hydraulic fluid to actuate the hydraulic device. The output shaft of the electric motor and the input shaft of the hydraulic pump are connected in series via a coupling such that the housing end surface of the electric motor and the casing end surface of the hydraulic pump face each other. In the working vehicle disclosed in Japanese Unexamined Patent Application Publication No. 2011-89369, the battery includes a main secondary battery and an auxiliary secondary battery. The hydraulic pump, the electric motor and the main secondary battery are provided at a rear portion of the swivel base frame, and the auxiliary secondary battery provided on a side portion of the swivel base frame.

SUMMARY OF THE INVENTION

With the technique of Japanese Unexamined Patent Application Publication No. 2014-237943, the hydraulic pump, the electric motor, the main secondary battery and the auxiliary secondary battery are provided at different positions. However, there are cases in which the vibrations resulting from the driving of the electric motor or pulsations of the hydraulic pump transmit through the swivel base and reach the battery.

With the technique of Japanese Unexamined Patent Application Publication No. 2011-89369, the hydraulic pump is connected via a coupling to the output shaft of the electric motor. However, in the case where the output shaft of the electric motor and the input shaft of the hydraulic pump are connected via a connector such as a coupling, a tool or the like may contact devices in the vicinity of the electric motor and the hydraulic pump or the connector attached to the output shaft or the input shaft may come off, resulting in a reduction in work performance when attaching the output shaft, the input shaft and the connector.

In the working vehicle of Japanese Unexamined Patent Application Publication No. 2011-89369, the housing end surface of the electric motor and the casing end surface of the hydraulic pump are fastened using screws.

It is noted here that there may be cases in which a support portion, which is connected to the housing end surface of the electric motor and the casing end surface of the hydraulic pump and which supports the electric motor and the hydraulic pump, is used to make it easy to attach the electric motor and the hydraulic pump to the swivel base frame. However, this may result in a limitation by the support portion on the area where work can be performed, and may result in difficulty in attaching the coupling and attaching the hydraulic pump to the support portion.

In the working vehicle of Japanese Unexamined Patent Application Publication No. 2011-89369, the auxiliary secondary battery is attachable to and detachable from the swivel base frame.

It is noted here that, since the battery needs to be supported in a stable manner, there are cases in which the surface for placement of the battery is smoothened by machining (cutting).

However, like the working vehicle of the Japanese Unexamined Patent Application Publication No. 2011-89369, in cases where the battery includes a plurality of rectangular battery packs and the area of the swivel base frame they occupy is relatively large, the area to be subjected to machining is also large. Thus, the machining takes a long time, resulting in an increase in cost for the machining of the area for placement of the battery.

One or more example embodiments of the present invention provide swivel working machines each of which makes it possible to eliminate or reduce the likelihood that vibrations from an electric motor and a hydraulic pump will be transmitted to a battery. One or more example embodiments of the present invention provide swivel working machines each of which makes it possible to improve work performance when attaching an electric motor, a connector, and a hydraulic pump. One or more example embodiments of the present invention provide swivel working machines each of which makes it possible to easily attach an electric motor to a support portion. One or more example embodiments of the present invention provide swivel working machines each of which makes it possible to easily attach a hydraulic pump to a support portion. One or more example embodiments of the present invention provide swivel working machines each of which makes it possible to reduce the cost for machining and reliably support a battery.

A swivel working machine according to an example embodiment of the present invention includes a swivel base, a battery, a support body to support the battery on or above the swivel base, an electric motor to be driven by electricity outputted from the battery, a hydraulic pump to be driven by the electric motor to deliver hydraulic fluid, a support portion to support the electric motor and the hydraulic pump on or above the swivel base, wherein the support portion is provided independently of the support body and is attached to the swivel base via a plurality of mounting devices.

The support body may be fixed to the swivel base.

The swivel working machine may include a stabilizer portion provided upright on the support body and attached to at least one of opposite sides of the battery.

The support portion may support the electric motor and the hydraulic pump arranged in a front-rear direction, and the plurality of mounting devices may each be located outward of the electric motor, the hydraulic pump and the support portion in plan view under the conditions in which the electric motor and the hydraulic pump are attached to the support portion.

The battery may be provided at a widthwise central portion of a rear portion of the swivel base, and the electric motor and the hydraulic pump may be provided at one side of the battery via the support portion.

The working machine may include a first bracket provided independently of the electric motor to connect the electric motor and the support portion, and a second bracket provided independently of the hydraulic pump to connect the hydraulic pump and the support portion, wherein at least two of the electric motor, the first bracket, the support portion, the second bracket and the hydraulic pump may be provided with a portion-for-attachment for attachment of a hoisting attachment thereto, the portion-for-attachment being configured such that attaching the hoisting attachment to the portion-for-attachment allows a connector to be hoisted, the connected structure being a structure in which the electric motor is connected to the support portion via the first bracket and the hydraulic pump is connected to the support portion via the second bracket.

An electric working machine (swivel working machine) according to an example embodiment of the present invention includes a machine body, a battery, an electric motor to rotate a drive shaft using electricity outputted from the battery, a hydraulic pump including an input shaft to receive input of power from the drive shaft and driven by power inputted into the input shaft from the drive shaft to deliver hydraulic fluid, a connector to connect the drive shaft and the input shaft, and a support portion to support the electric motor and the hydraulic pump on or above the machine body, wherein the connector is (i) rotatable together with one of the drive shaft and the input shaft and is restricted from moving in an axial direction, and (ii) rotatable together with the other of the drive shaft and the input shaft and is not restricted from moving in the axial direction.

The connector may include a first connector portion attached to one of the shafts, a second connector portion attached to the other of the shafts, and an elastic body connecting the first connector portion and the second connector portion.

The elastic body may include a first connecting structure fixed to the first connector portion, a second connecting structure fixed to the second connector portion, and an elastic portion fixed to the first connecting structure and the second connecting structure.

The elastic portion may be fixed by being bonded to the first connecting structure and the second connecting structure.

The drive shaft and the input shaft are splined shafts, and the first connector portion and the second connector portion may include splined bearings to fit with the splined shafts.

The first connector portion may have attached thereto a restrictor to restrict the one of the shafts from moving in the axial direction.

The electric working machine may further include a housing to surround the connector at a position radially outward of the connector under the conditions in which the electric motor and the hydraulic pump are attached to the support portion. Under the conditions in which the connector is attached to the electric motor or the hydraulic pump that has the one of the shafts and attached to the support portion, the electric motor or the hydraulic pump that has the other of the shafts may be removable from the connector by moving the connector in the axial direction of the shaft.

A method of assembling an electric working machine (swivel working machine) according to an example embodiment of the present invention is a method of assembling an electric working machine including an electric motor to rotate a drive shaft, a hydraulic pump including an input shaft to receive input of power from the drive shaft and drivable by power inputted into the input shaft via the drive shaft to deliver hydraulic fluid, a connector to connect the drive shaft and the input shaft, and a support portion to support the electric motor and the hydraulic pump, the method including a first step including attaching the connector to one of the drive shaft and the input shaft such that the connector is rotatable together with the one of the drive shaft and the input shaft and is restricted from moving in the axial direction, and a second step including attaching, to the connector, the other of the drive shaft and the input shaft such that the other of the drive shaft and the input shaft is rotatable together with the connector and is not restricted from moving in the axial direction.

A working machine according to an example embodiment of the present invention includes a swivel base, a battery, an electric motor to rotate a drive shaft using electricity outputted from the battery, a hydraulic pump including an input shaft to receive input of power from the drive shaft and drivable using power inputted into the input shaft from the drive shaft to deliver hydraulic fluid, a connector to connect the drive shaft and the input shaft, a support portion to support the electric motor and the hydraulic pump on or above the swivel base, and a first bracket provided independently of the electric motor to connect the electric motor and the support portion, wherein a structure in which the connector and the first bracket are attached to the electric motor is attached to the support portion via the first bracket.

The electric motor may include a spigot fitting portion around the drive shaft, and the first bracket may have a socket hole to attach the spigot fitting portion thereto.

The outer diameter of the connector may be greater than the inner diameter of the socket hole.

The support portion may be a housing to, under the conditions in which the electric motor is attached to the support portion via the first bracket, surround the connector at a position radially outward of the connector.

The first bracket may include a first extension portion extending outward in a radial direction of the drive shaft relative to the electric motor. The first extension portion may include a first connected portion connected to the support portion.

The first connected portion may include a hole to have a fastener inserted therethrough, and the first bracket and the support portion may be connected by the fastener.

The support portion may include a first dowel pin directed in the axial direction of the drive shaft; and the first bracket may include a hole to have the first dowel pin fitted therein.

The first bracket may include a portion-for-attachment to attach a hoisting attachment thereto.

The structure in which the connector and the first bracket are attached to the electric motor and the hydraulic pump is attached to another bracket different from the first bracket may be attached to the support portion via the another first bracket.

A method of assembling a swivel working machine according to an example embodiment of the present invention is a method of assembling a swivel working machine including an electric motor to rotate a drive shaft, a hydraulic pump including an input shaft to receive input of power from the drive shaft and drivable by power inputted into the input shaft from the drive shaft to deliver hydraulic fluid, a connector to connect the drive shaft and the input shaft, a support portion to support the electric motor and the hydraulic pump, and a first bracket provided independently of the electric motor to connect the electric motor and the support portion, the method including a first step including attaching the first bracket and the connector to the electric motor, and a second step including attaching the first bracket, the connector, and the electric motor assembled in the first step to the support portion.

A working machine according to an example embodiment of the present invention includes a swivel base, a battery, an electric motor to rotate a drive shaft using electricity outputted from the battery, a hydraulic pump including an input shaft to receive input of power from the drive shaft and configured to be driven by power inputted into the input shaft from the drive shaft to deliver hydraulic fluid, a support portion to support the electric motor and the hydraulic pump on or above the swivel base, and a second bracket provided independently of the electric motor to connect the electric motor and the support portion, wherein a structure in which the second bracket is attached to the hydraulic pump is attached to the support portion via the second bracket.

The second bracket may include a second extension portion extending outward in a radial direction of the input shaft relative to the hydraulic pump. The second extension portion may include a second connected portion connected to the support portion.

The second connected portion may include a hole to have a fastener inserted therethrough, and the second bracket and the support portion may be connected by the fastener.

The support portion may include a second dowel pin directed in the axial direction of the input shaft; and the second bracket have a hole to have the second dowel pin fitted therein.

The second bracket may include a first portion—for attachment to attach a first hoisting attachment.

The support portion may include a second portion-for-attachment to attach a second hoisting attachment.

The hydraulic pump may include a spigot fitting portion around the input shaft, and the second bracket may have a socket hole to have the spigot fitting portion attached thereto.

The swivel working machine may include a connector to connect the drive shaft and the input shaft, the hydraulic pump may be attached to the support portion via the second bracket, and the support portion may be a housing to, under the conditions in which the connector is attached to the input shaft, surround the connector at a position radially outward of the connector.

A method of assembling a swivel working machine according to an example embodiment of the present invention is a method of assembling a swivel working machine including an electric motor to rotate a drive shaft, a hydraulic pump including an input shaft to receive input of power from the drive shaft and drivable by power inputted into the input shaft from the drive shaft to deliver hydraulic fluid, a support portion to support the electric motor and the hydraulic pump, and a second bracket provided independently of the hydraulic pump to connect the hydraulic pump and the support portion, the method including a first step including attaching the second bracket to the hydraulic pump, and a second step including attaching the second bracket and the hydraulic pump assembled in the first step to the support portion.

An electric working machine (swivel working machine) according to an example embodiment of the present invention includes a machine body, a support body provided on the machine body, a battery to be placed on the support body, and an electric motor to be driven by electricity outputted from the battery, wherein the support body includes a plurality of elongated plates for placement of an outer peripheral portion of a bottom of the battery, and surfaces for placement of the battery unit of the elongated plates are smoothened or substantially smoothened by machining.

Portions of the support body that are other than the surfaces for placement of the plates may not be subjected to the machining.

The support body may include a frame to connect the plurality of plates, and the frame may be fixed by welding to lower surfaces and/or side surfaces of the plates.

The plates may be subjected to the machining after the plates are fixed to the frame by welding, for example.

The plurality of plates may be spaced away from each other and fixed to the frame.

The plurality of plates may include a first plate portion for placement of a front edge portion of the battery, a second plate portion for placement of a rear edge portion of the battery, a third plate portion for placement of one of opposite sides in the width direction of the battery, and a fourth plate portion for placement of the other of the opposite sides in the width direction of the battery.

The support body may include an elongated first connector plate connecting a widthwise central portion of the first plate portion and a widthwise central portion of the second plate portion.

The support body may include a second connector plate passing through the center of an opening in a central portion of the frame and extending from one of opposite end portions in the width direction of the frame to the other of the opposite end portions of the frame, and the first connector plate and the second connector plate may be perpendicular to each other.

The battery may include a plurality of batteries, the plurality of batteries may be provided adjacent to each other in the width direction, the first plate portion may have placed thereon front edge portions of the plurality of batteries, the second plate portion may have placed thereon rear edge portions of the plurality of batteries, the third plate portion may have placed thereon a first side portion of one of the batteries that is located at one of opposite ends in the width direction, and the fourth plate portion may have placed thereon a second side portion of another of the batteries that is located at the other of the opposite ends in the width direction.

The battery may include a plurality of batteries, the first connector plate may have placed thereon two adjacent ones of the plurality of batteries, and have a vent hole between the two adjacent ones of the plurality of batteries.

The support body may include a retainer provided on the first plate portion or the second plate portion to fix the battery, and the retainer may be attached such that the retainer is adjustable in the front-rear direction.

The swivel working machine may include a hydraulic device provided on the machined body and a hydraulic pump to be driven by the electric motor to deliver hydraulic fluid to actuate the hydraulic device.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 12 is a left rear perspective view showing a support body, a first upright portion, a second upright portion, and the like.

DETAILED DESCRIPTION OF THE EXAMPLE EMBODIMENTS

Figure 1:
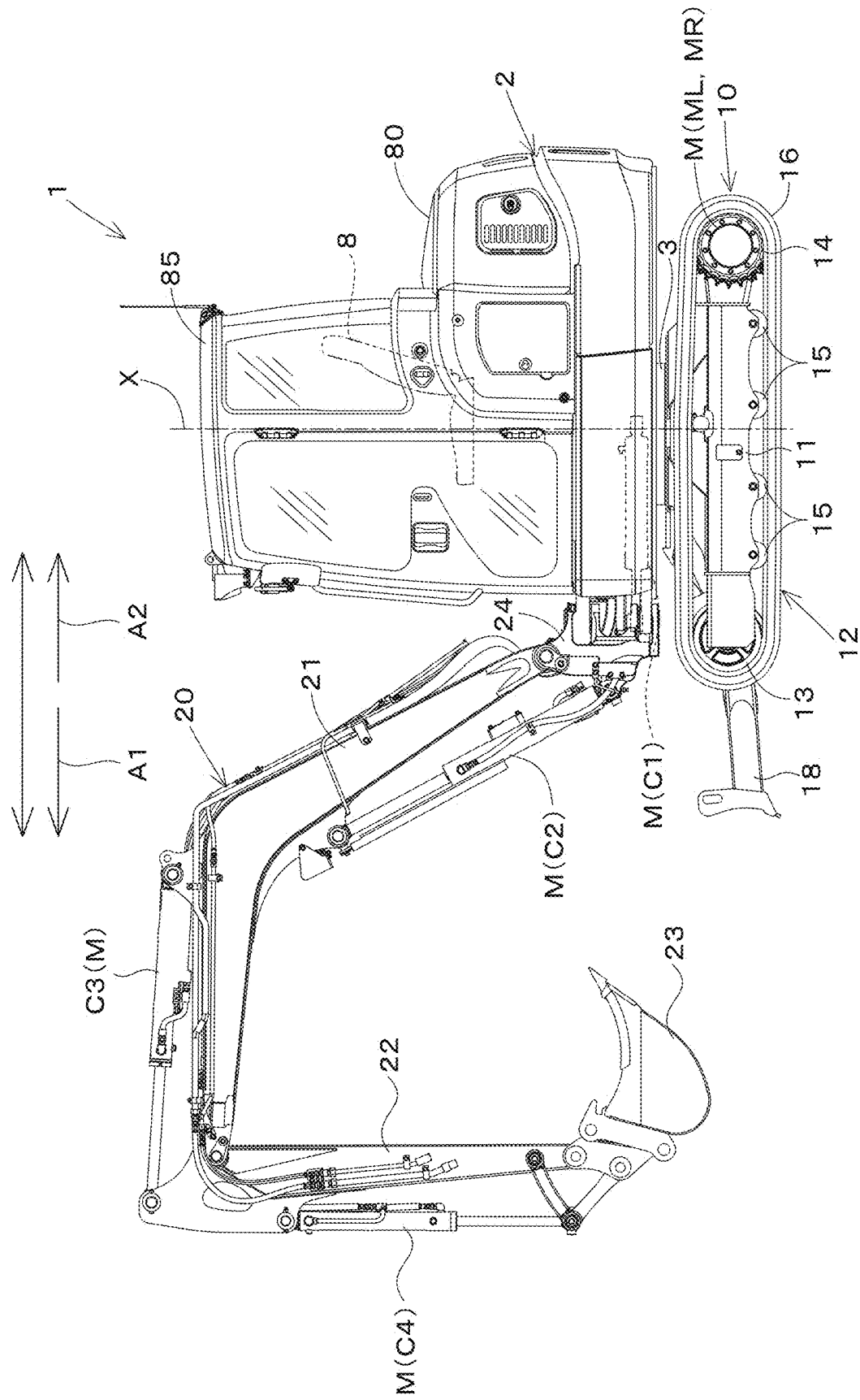
FIG. 1 is a side view schematically showing a swivel working machine.

Example embodiments will now be described with reference to the accompanying drawings, wherein like reference numerals designate corresponding or identical elements throughout the various drawings. The drawings are to be viewed in an orientation in which the reference numerals are viewed correctly.

Figure 2:
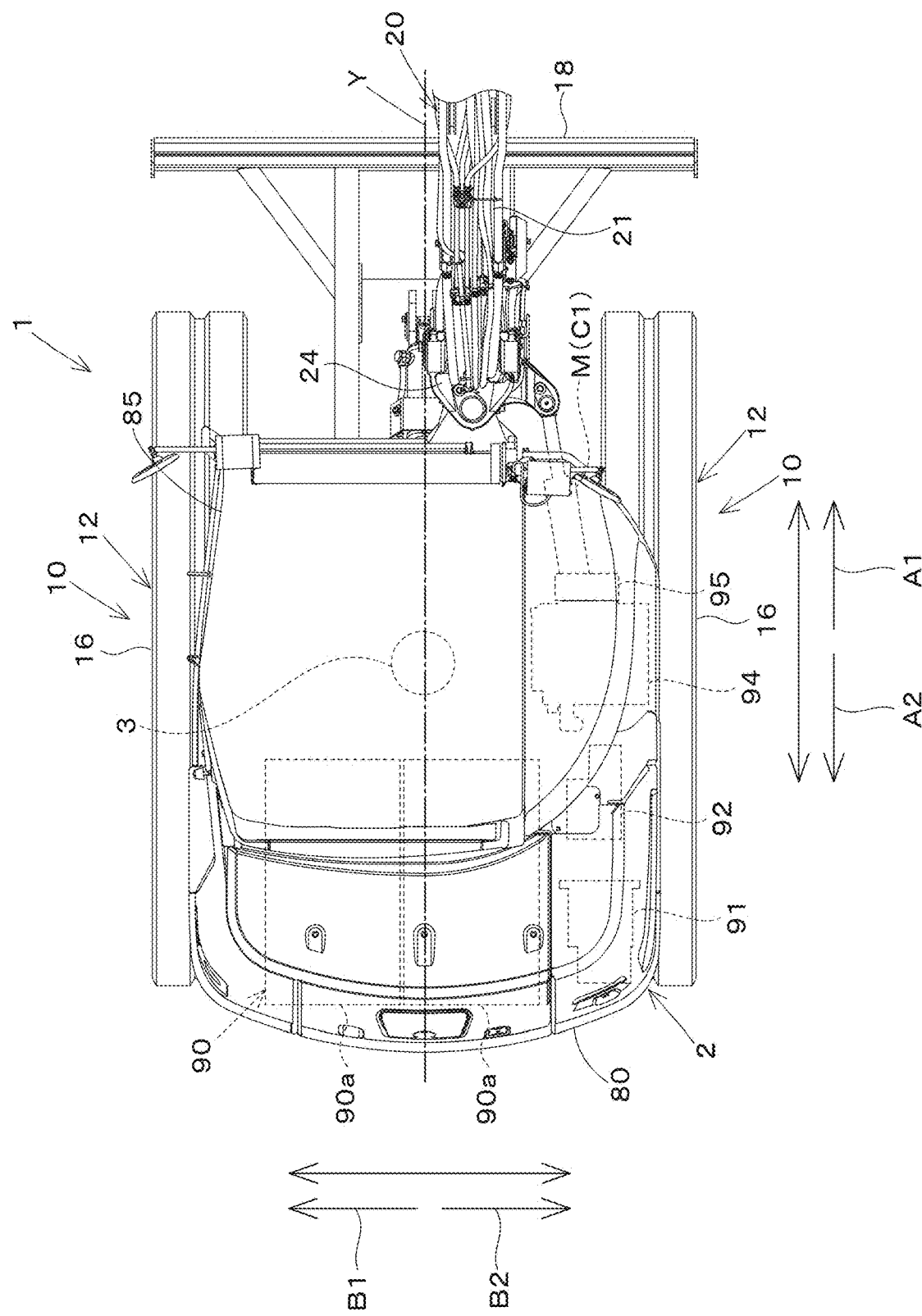
FIG. 2 is a plan view schematically showing a swivel working machine.
Figure 3:
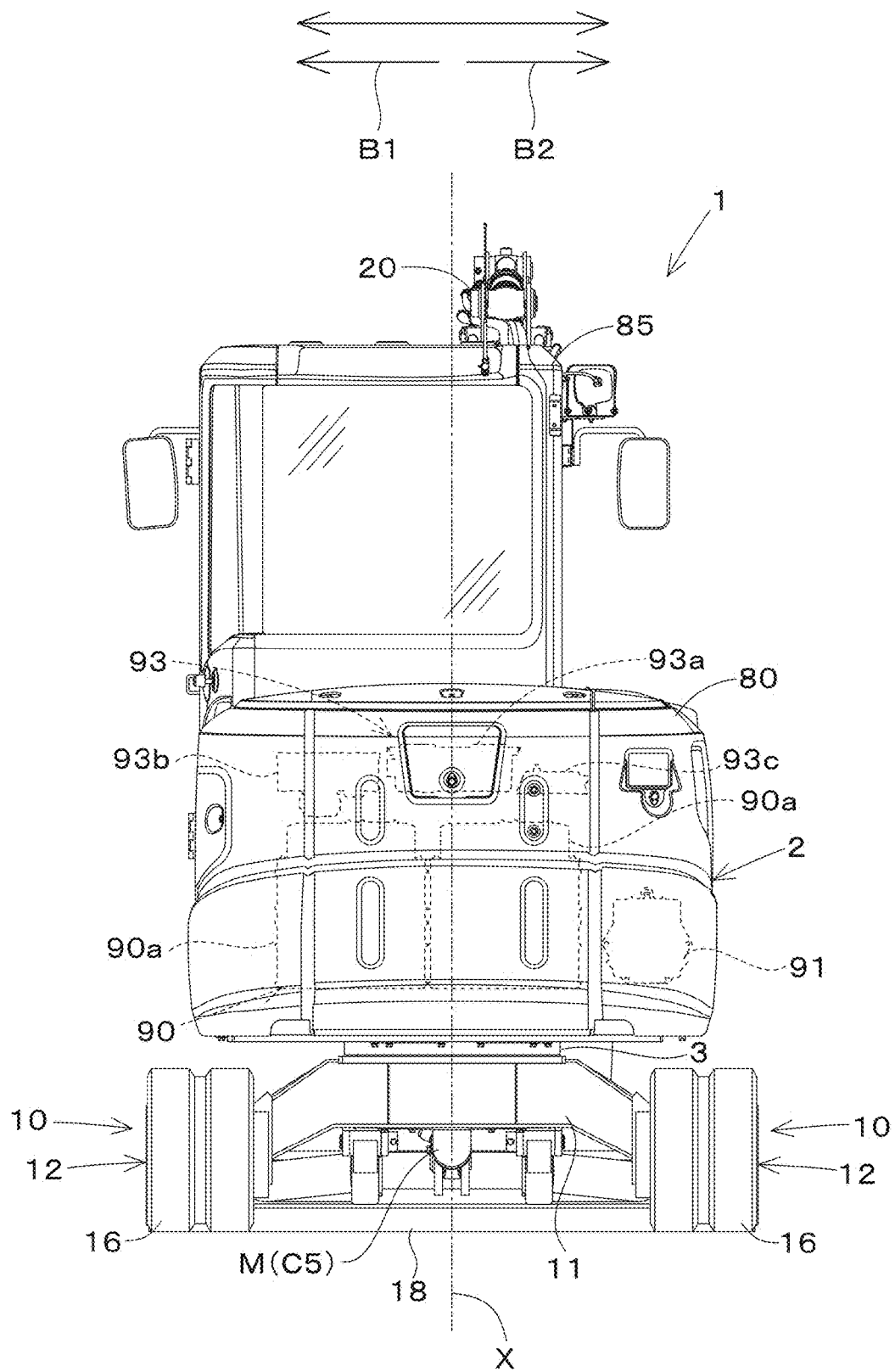
FIG. 3 is a rear view schematically showing a swivel working machine.

The following description discusses example embodiments of the present invention with reference to the accompanying drawings. FIG. 1 is a side view schematically illustrating a swivel working machine 1. FIG. 2 is a plan view schematically illustrating the swivel working machine 1. FIG. 3 is a rear view schematically illustrating the swivel working machine 1. First, an overall configuration of the working machine 1 will be described. As shown in FIG. 1, the swivel working machine 1 is a backhoe including, for example, a swivel base (machine body) 2, a lower carrier 10, and a working device 20. The swivel working machine 1 is an electric working machine driven by electricity. An operator's seat 8 where the operator can sit is provided on the swivel base 2, and the operator's seat 8 is enclosed by a protection structure 85.

Note that in the present example embodiment, the direction that the operator sitting on the operator's seat 8 of the swivel working machine 1 is facing (direction of arrow A1 in FIGS. 1 and 2) is referred to as front, and the opposite direction (direction of arrow A2 in FIGS. 1 and 2) is referred to as rear. The left side of the operator (near side in FIG. 1, and direction of arrow B1 in FIGS. 2 and 3) is referred to as left, and the right side of the operator (far side in FIG. 1, and direction of arrow B2 in FIGS. 2 and 3) is referred to as right. The horizontal direction perpendicular to the front-rear direction is referred to as a width direction (see FIGS. 2 and 3), and the direction from the widthwise center of the swivel base 2 to the right or left is referred to as an outward width direction.

As shown in FIGS. 1 and 3, the swivel base 2 is rotatable about a swivel axis (vertical axis) X extending in the up-down direction. Specifically, the swivel base 2 is supported on the lower carrier 10 via a swiveling bearing 3 such that the swivel base 2 is rotatable about the swivel axis X (rotatable leftward and rightward). The center of the swiveling bearing 3 is the swiveling axis X (swiveling center), and a swivel motor (not illustrated) is attached to the swivel base 2. This swivel motor is a hydraulic device M to be driven by hydraulic fluid delivered by a hydraulic pump 92, and is a motor to drive the swivel base 2 to rotate about the swivel axis X. The swivel base 2 includes an exterior cover (cover) 80, bracket(s), stays(s)m and the like. The exterior cover 80 defines a space (rear room) R at a rear portion of the swivel base 2 for devices, tanks, and other components on the swivel base 2. Bracket(s), stay(s) and the like are configured to attach the components and the like.

As shown in FIGS. 1 and 3, the lower carrier 10 includes a travel frame 11 and travel mechanism(s) 12. The travel frame (truck frame) 11 is a structure on which the travel mechanism(s) 12 is/are attached and which supports the swivel base 2 on an upper portion thereof.

Each travel mechanism 12 is, for example, a crawler travel mechanism. The travel mechanism 12 includes an idler 13, a driving wheel 14, a plurality of track rollers 15, an endless crawler belt 16, and a travel-related hydraulic device M (travel motor ML, MR) to be driven by hydraulic fluid delivered by the hydraulic pump 92. The travel motors ML, MR are hydraulic motors, and each cause a corresponding crawler belt 16 to rotate circumferentially by driving a corresponding driving wheel 14. As shown in FIG. 3, a front portion of the lower carrier 10 includes a dozer device 18 driven to move up and down by the extension and retraction of a dozer cylinder C5 (M) which is a hydraulic cylinder (hydraulic actuator).

As shown in FIGS. 1 and 2, the working device 20 is provided at a front portion of the swivel base 2. The working device 20 includes a boom 21, an arm 22 and a bucket (working tool) 23. The proximal end of the boom 21 is pivotally attached to a swing bracket 24 such that the boom 21 is rotatable about a lateral axis (axis extending in the width direction) and that the boom 21 is swingable up and down (vertical direction). The arm 22 is pivotally attached to the distal portion of the boom 21 such that the arm 22 is rotatable about a lateral axis and that the arm 22 is swingable forward and rearward or up and down. The bucket 23 is provided at the distal portion of the arm 22 such that the bucket 23 is capable of shoveling and dumping. The swivel working machine 1 is configured to attach thereto other working tools (hydraulic attachments) to be driven by hydraulic fluid, instead of or in addition to the bucket 23. Examples of such other working tools include hydraulic breakers, hydraulic crushers, angle brooms, earth augers, pallet forks, sweepers, mowers, and snow blowers.

As shown in FIG. 1, the swivel working machine 1 includes work-related hydraulic devices M to be driven by hydraulic fluid delivered by the hydraulic pump 92, and the working device 20 is driven by operation of the work-related hydraulic devices M. In the present example embodiment, the hydraulic devices M include a swing cylinder C1, a boom cylinder C2, an arm cylinder C3, and a bucket cylinder C4. The swing cylinder C1, the boom cylinder C2, the arm cylinder C3 and the bucket cylinder C4 each include a hydraulic cylinder (hydraulic actuator). As shown in FIG. 1, the swing bracket 24 is swingable by the extension and retraction of the swing cylinder C1 provided at a right portion of the swivel base 2. The boom 21 is swingable by the extension and retraction of the boom cylinder C2. The arm 22 is swingable by the extension and the retraction of the arm cylinder C3. The bucket 23 is capable of shoveling and dumping by the extension and retraction of the bucket cylinder C4.

Thus, the hydraulic devices M included in the swivel working machine 1 include the swivel motor, the travel motors ML and MR, the swing cylinder C1, the boom cylinder C2, the arm cylinder C3, the bucket cylinder C4, and the dozer cylinder C5.

Figure 4:
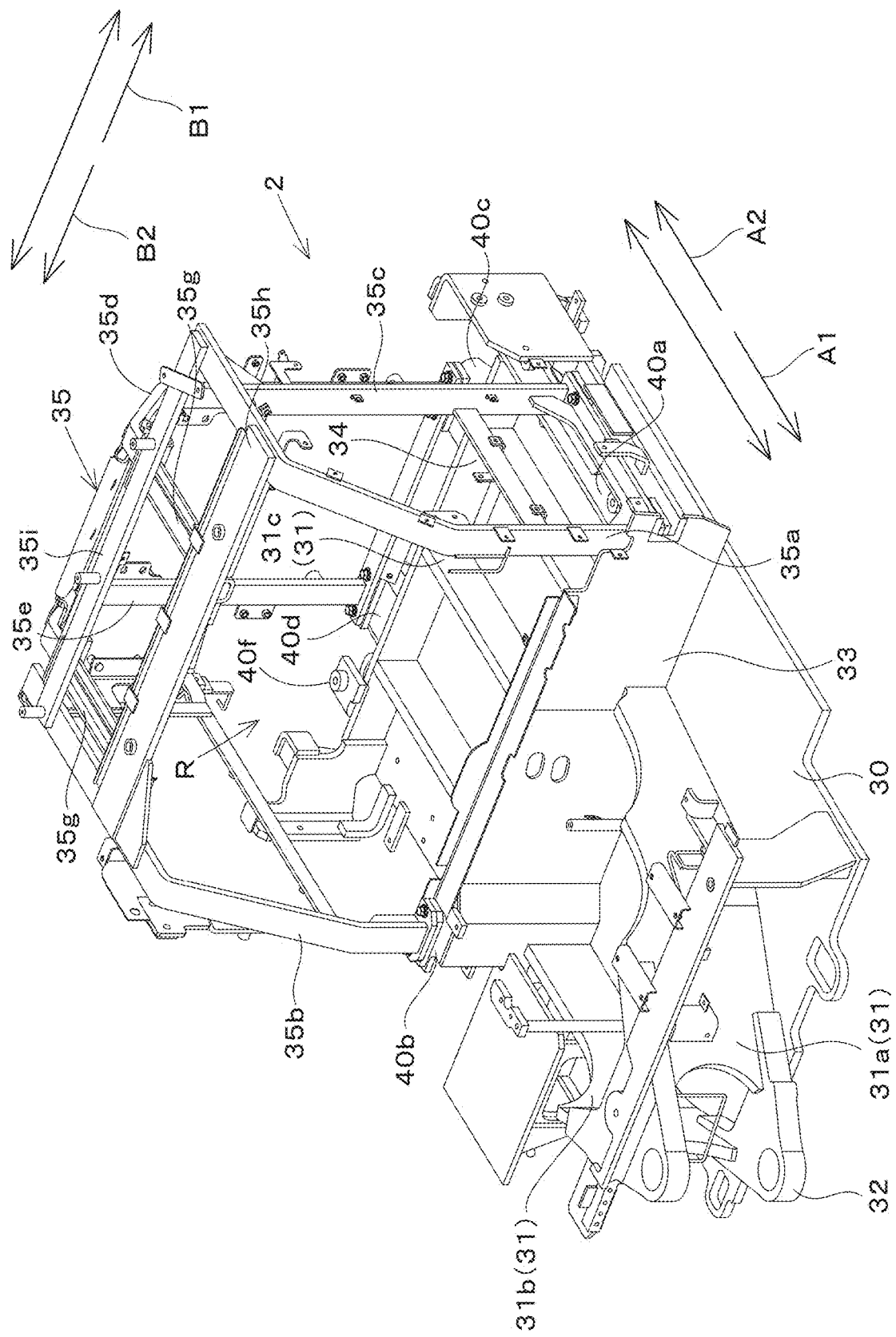
FIG. 4 is a left front perspective view showing a swivel base.
Figure 5:
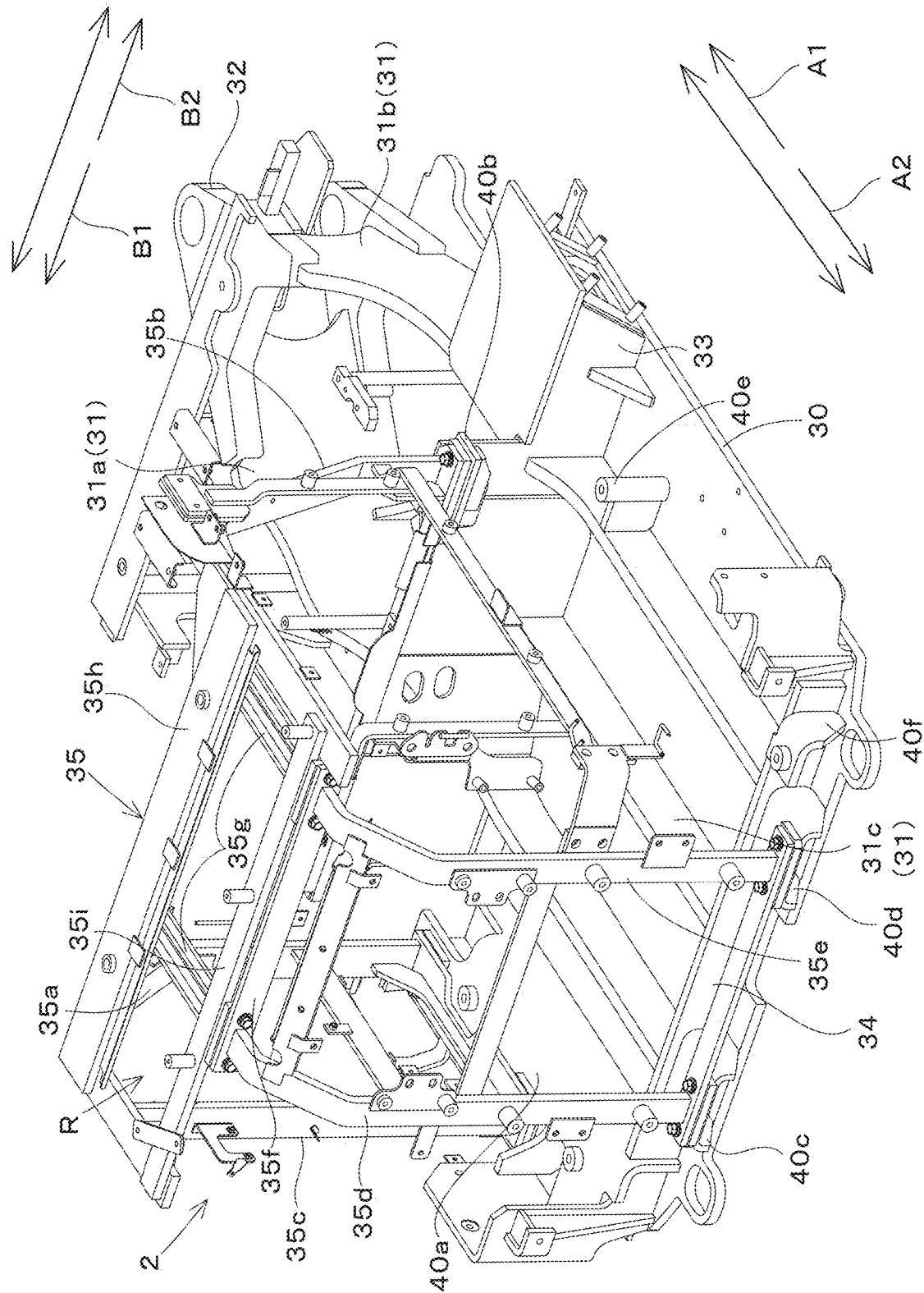
FIG. 5 is a right rear perspective view showing a swivel base.

The swivel base 2 will now be described. FIG. 4 is a front left perspective view showing the swivel base 2. FIG. 5 is a rear right perspective view showing the swivel base 2. As shown in FIGS. 4 and 5, the swivel base 2 includes a swivel board (board) 30, a plurality of vertical ribs 31 (first vertical rib 31a, second vertical rib 31b, and third vertical rib 31c), a support bracket 32, a partition plate 33, a lateral rib 34, and a support frame 35. The swivel board 30 includes a thick steel plate, and the plate is positioned such that the plate surfaces face up and down. The swivel board 30 is supported on the lower carrier 10 via the swiveling bearing 3 such that the swivel board 30 is rotatable about the swivel axis X.

The first vertical rib 31a, the second vertical rib 31b, and the third vertical rib 31c reinforce the swivel board 30, and extend in the front-rear direction of the swivel board 30. The first vertical rib 31a and the second vertical rib 31b are provided upright on the swivel board 30 and are separated from each other in the width direction. The first vertical rib 31a is provided at a left portion of the swivel board 30, and the second vertical rib 31b is provided at a right portion of the swivel board 30. The third vertical rib 31c is provided between the first vertical rib 31a and the second vertical rib 31b, and is provided to extend from a rear portion of the swivel board 30 to the partition plate 33.

The support bracket 32 is provided at front portions of the first vertical rib 31a and the second vertical rib 31b. As shown in FIG. 4, the support bracket 32 and the front portions of the first vertical rib 31a and the second vertical rib 31b are displaced from the widthwise center of the swivel board 30 to the right. As shown in FIG. 1, the swing bracket 24 is attached to the support bracket 32 such that the swing bracket 24 is rotatable on a vertical axis (axis extending in the up-down direction).

As shown in FIGS. 4 and 5, the partition plate 33 is a component to define a front lower side of the rear room R. The partition plate 33 is positioned such that the plate surfaces face forward and rearward and extends one of opposite sides in the width direction (left side) to the other of the opposite sides (right side) at the central portion of the swivel board 30.

The lateral rib 34 reinforces the swivel board 30, and is positioned to extend from one of opposite sides in the width direction (left side) to the other of the opposite sides (right side) at the rear portion of the swivel board 30. The lateral rib 34 is provided upright on the swivel board 30 and is connected to the rear end of the first vertical rib 31a, the rear end of the second vertical rib 31b, and the rear end of the third vertical rib 31c.

The support frame 35 is provided upright on the rear portion of the swivel board 30 and is located rearward of the partition plate 33. The rear portion of the support frame 35 is located rearward of the rear portion of the lower carrier 10. Specifically, the support frame 35 is provided inside the rear room R, and supports the exterior cover 80 and surrounding component(s) provided inside the exterior cover 80. The support frame 35 includes a plurality of legs provided upright on the swivel board 30 (first leg 35a, second leg 35b, third leg 35c, fourth leg 35d, and fifth leg 35e), a first rod 35h, and a second rod 35i.

The first leg 35a is provided upright at a front left of the rear room R. The first leg 35a is provided upright at a front portion of a first base 40a which is provided at a left rear of the first vertical rib 31a. The first base 40a extends from the partition plate 33 to the lateral rib 34. The first leg 35a includes a lower portion extending upward from the first base 40a, an intermediate portion extending diagonally rearward and upward, and an upper portion bent and extending rearward.

The second leg 35b is provided upright at a front right of the rear room R. The second leg 35b is provided upright on a second base 40b which is attached to a rear right portion of the partition plate 33. That is, the lower end of the second leg 35b is located forward of the lower end of the first leg 35a. The second leg 35b includes a lower portion extending upward from the second base 40b, an intermediate portion extending diagonally upward and rearward, and an upper portion bent and extending rearward.

The third leg 35c is provided upright at a rear left of the rear room R. The third leg 35c is provided upright at a central portion of the first base 40a. The third leg 35c includes a lower portion extending upward from the first base 40a to reach the upper portion of the first leg 35a.

The fourth leg 35d is provided upright at a rear portion of the rear room R. The fourth leg 35d is provided at a rear left portion of the rear room R, and is located inward (rightward) of the third leg 35c in the width direction. The fourth leg 35d is provided upright on a third base 40c which is provided at a left portion of the lateral rib 34. The fourth leg 35d includes a lower portion extending upward from the third base 40c, an intermediate portion extending diagonally upward and forward, and an upper portion bent and extending forward.

The fifth leg 35e is provided upright at a rear portion of the rear room R. The fifth leg 35e is provided upright at a right rear portion of the rear room R, and is provided on a fourth base 40d which is provided at a right portion of the lateral rib 34. The fifth leg 35e includes a lower portion extending upward from the fourth base 40d, an intermediate portion extending diagonally upward and forward, and an upper portion bent and extending forward.

As shown in FIGS. 4 and 5, the upper end of the fourth leg 35d and the upper end of the fifth leg 35e are connected by a connector plate 35f extending in the width direction. The connector plate 35f includes a pair of support beams 35g extending from the front edge of the connector plate 35f in the front direction. The pair of support beams 35g are spaced in the width direction such that the support beams 35g correspond to the upper end of the fourth leg 35d and the upper end of the fifth leg 35e. The rear portion of the fourth leg 35d and the rear portion of the fifth leg 35e are located rearward of the rear portion of the lower carrier 10.

The first rod 35h and the second rod 35i are positioned such that their plate surfaces face upward and rearward and that the first rod 35h and the second rod 35i each extend in the width direction. The first rod 35h is located forward of the second rod 35i. The first rod 35h and the second rod 35i are placed on and fixed to the upper portion of the first leg 35a, the upper portion of the second leg 35b, the upper end of the left support beam 35g, and the upper end of the right support beam 35g. The first rod 35h supports a rear portion of the protection structure 85. The second rod 35i supports the exterior cover 80.

Figure 6:
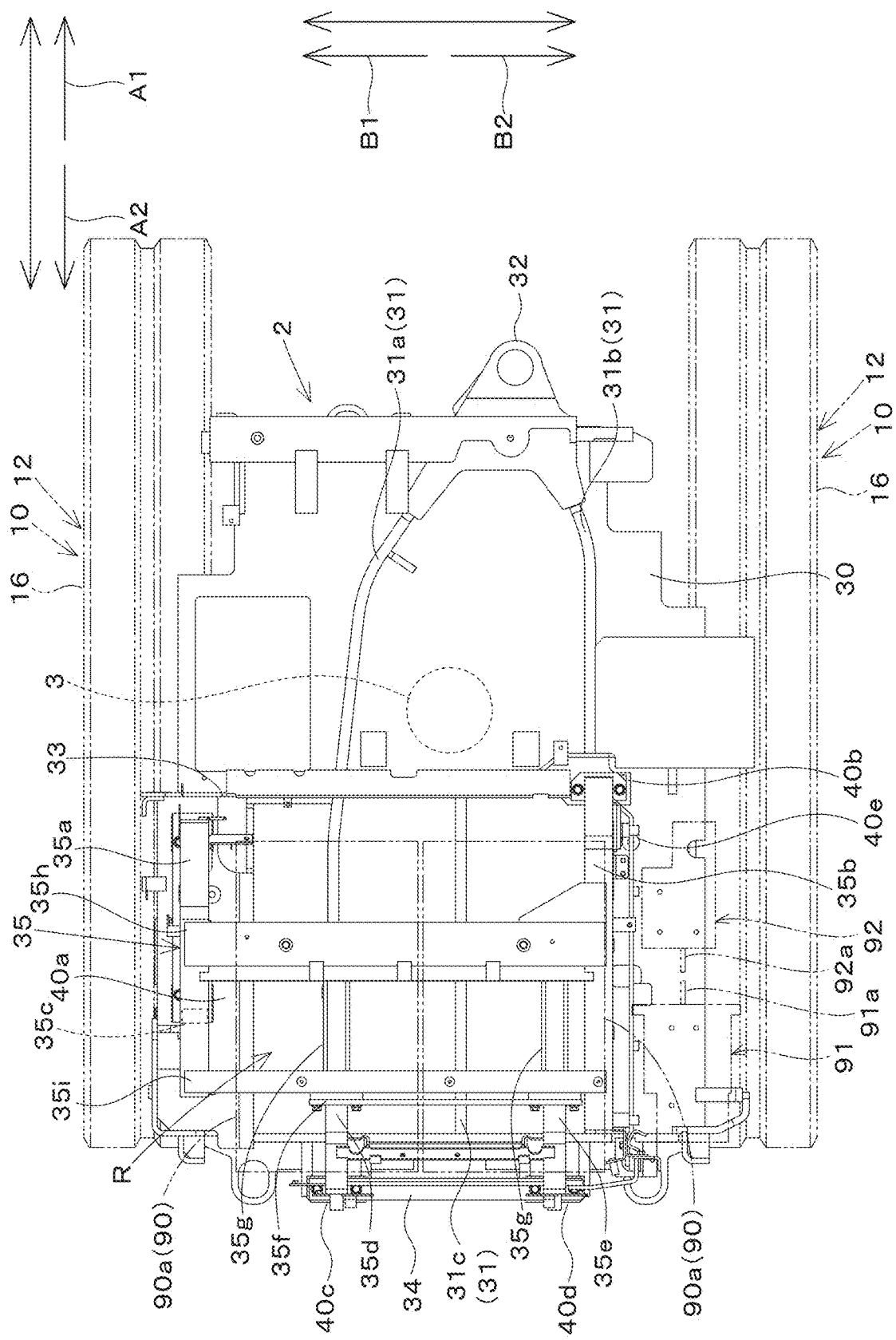
FIG. 6 is a plan view showing a lower carrier, a swivel board, and devices and the like provided on the swivel board.
Figure 7:
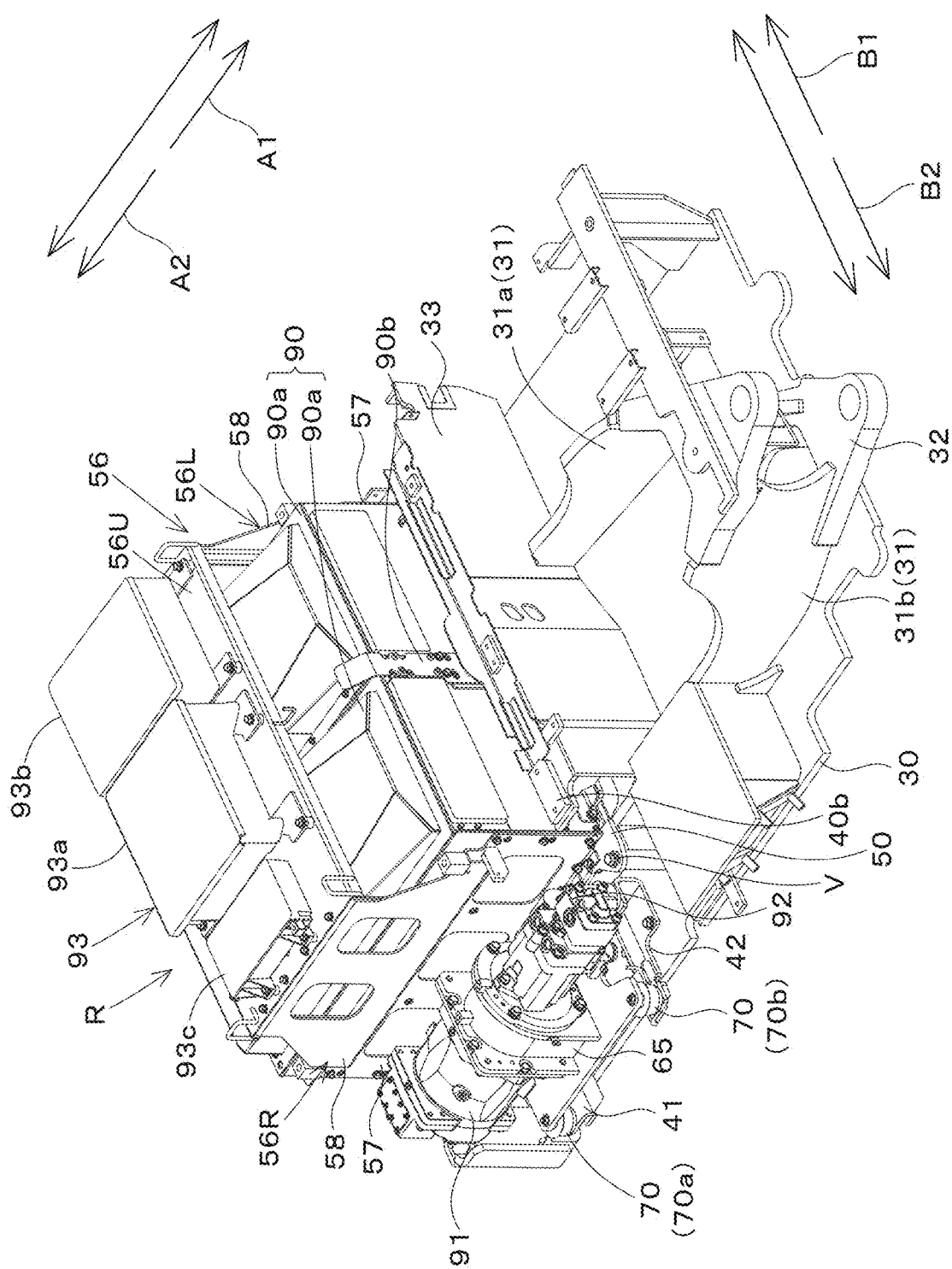
FIG. 7 is a right front perspective view showing a swivel board, a battery, an electric motor, a hydraulic pump, and electrical components.

The following description discusses devices provided in the rear room R of the swivel base 2. FIG. 6 is a plan view showing the lower carrier 10, the swivel board 30, and various devices and the like provided on the swivel board 30. FIG. 7 is a right front perspective view showing the swivel board 30, a battery 90, an electric motor 91, a hydraulic pump 92, and electrical component(s) 93. As shown in FIGS. 6 and 7, the swivel working machine 1 includes the battery 90, the electric motor 91, the hydraulic pump 92, and the electrical component(s) 93. The battery 90, the electric motor 91, the hydraulic pump 92, and the electrical component(s) 93 are provided on the swivel base 2. The battery 90 can store electricity and output the stored electricity. In the present example embodiment, the battery 90 includes a plurality of batteries 90a. The plurality of batteries 90a are connected in parallel to each other. The plurality of batteries 90a can store electricity and are, for example, secondary batteries such as lithium-ion batteries or lead storage batteries. The plurality of batteries 90a each include a housing made of a flat steel sheet, and a plurality of cells provided inside that housing, and the plurality of cells are connected electrically in series and/or in parallel.

In the present example embodiment, the battery 90 includes two batteries 90a. Note that the battery 90 need only include a plurality of batteries 90a, and the number of batteries included in the battery 90 is not limited to two. For example, the number of batteries included in the battery 90 may be an even number other than two or three. The plurality of batteries 90a are arranged adjacent to each other in the width direction, and are connected by a coupling bracket 90b.

The electric motor 91 is a drive source driven by electricity outputted from the battery 90 to rotate a drive shaft 91a. The electric motor 91 is an interior permanent magnet three-phase AC synchronous motor. The electric motor 91 includes a rotatable rotor (rotator) and a stator to generate a force to cause the rotor to rotate. Note that the electric motor 91 may be another type of synchronization motor, an alternative-current (AC) motor, or a direct-current motor. The electric motor 91 causes the drive shaft 91a to rotate, and the drive shaft 91a transmits the driving force to the hydraulic pump 92. The drive shaft 91a is a splined shaft having a splined outer surface.

The hydraulic pump 92 includes an input shaft 92a to receive input of power from the drive shaft 91a, and the power inputted from the drive shaft 91a into the input shaft 92a drives the input shaft 92a to deliver hydraulic fluid. The input shaft 92a is connected to the drive shaft 91a of the electric motor 91, and is driven by the driving force transmitted from the drive shaft 91a. The input shaft 92a is a splined shaft having a splined outer surface.

In the following descriptions, the splines on the drive shaft 91a and the input shaft 92a may be referred to as external splines.

The electrical component(s) 93 are, for example, device(s) connected directly or indirectly to the battery 90 and transmit(s) the electricity supplied by the battery 90 or is/are actuated by the electricity. The electrical component(s) 93 include, for example, a junction box 93a, an inverter 93b, and a DC/DC converter 93c. The junction box 93a is connected to the battery 90 and to other device(s) including the inverter 93b, and transmits the electricity supplied by the battery 90 to other device(s).

The inverter 93b is provided on an electricity supply route from the battery 90 to the electric motor 91, and regulates the electricity outputted to the electric motor 91. The inverter 93b is a device to drive the electric motor 91, and convert direct current electricity into three phase AC electricity and supply the three phase AC electricity to the electric motor 91. The inverter 93b is configured to freely change the electric current or voltage of the electricity supplied to the electric motor 91.

The DC/DC converter 93c converts the voltage of the inputted direct electric current into a different voltage. In the present example embodiment, the DC/DC converter 93c is a step-down converter to convert the inputted voltage into a lower voltage. The DC/DC converter 93c is, for example, provided in or on the swivel working machine 1, and supplies electricity to an in-vehicle battery (not illustrated) to supply power to electronic equipment.

The following description discusses the arrangement of the battery 90, the electric motor 91, the hydraulic pump 92 and the electrical components 93. As shown in FIG. 6, the battery 90 is provided at the widthwise center of the rear portion of the swivel base 2. Specifically, the battery 90 extends from an intermediate portion in the front-rear direction of the swivel base 2 to the rear portion of the swivel base 2. That is, the rear portion of the battery 90 is located rearward of the rear portion of the lower carrier 10. As shown in FIG. 2, the battery 90 is positioned such that the position of the center of gravity thereof is displaced in a first direction (leftward) from the widthwise central line Y of the swivel base 2, and is located rearward of the protection structure 85.

As shown in FIG. 6, the outer perimeter of the battery 90 is surrounded by the support frame 35. Specifically, the lower end of the first leg 35a and the lower end of the second leg 35b are positioned forward of the battery 90. The third leg 35c is positioned leftward of the battery 90. The lower end of the fourth leg 35d and the lower end of the fifth leg 35e are positioned rearward of the battery 90. The upper end of the first leg 35a, the upper end of the second leg 35b, the upper end of the fourth leg 35d, the upper end of the fifth leg 35e, the pair of support beams 35g, the first rod 35h and the second rod 35i are positioned above the battery 90.

As shown in FIG. 2, the electric motor 91 and the hydraulic pump 92 are displaced in a second direction (rightward) from the widthwise center line Y of the swivel base 2 and, as shown in FIGS. 6 and 7, arranged in the front-rear direction at one side of the battery 90. Specifically, the electric motor 91 and the hydraulic pump 92 are provided at a lower portion of the space sideward of (rightward of) the battery 90. More specifically, as shown in FIG. 6, the electric motor 91 and the hydraulic pump 92 are located rightward of the lower end of the second leg 35b. The electric motor 91 is provided rearward of the hydraulic pump 92, and is positioned such that the drive shaft 91a is directed in the front-rear direction. The hydraulic pump 92 is positioned such that the input shaft 92a is directed in the front-rear direction and that the axis of the input shaft 92a coincides with the axis of the drive shaft 91a.

The hydraulic pump 92 is located forward of the electric motor 91. As shown in FIG. 2, a hydraulic fluid tank 94 which stores hydraulic fluid to be sucked by the hydraulic pump 92 is provided in front of that hydraulic pump 92. The front portion of the hydraulic fluid tank 94 includes a control valve 95 to regulate the flow rate of hydraulic fluid supplied to the hydraulic device(s) M.

As shown in FIGS. 3 and 7, the electrical components 93 are provided above the battery 90 and are arranged in the width direction. In other words, the battery 90 is provided below the electrical components 93, and the swivel base 2, the battery 90, and the electrical components 93 are provided in this order in the bottom-to-top direction. That is, the relatively heavy battery 90 is located lower than the electrical components 93, and is located at a low position in the swivel working machine 1.

Figure 8:
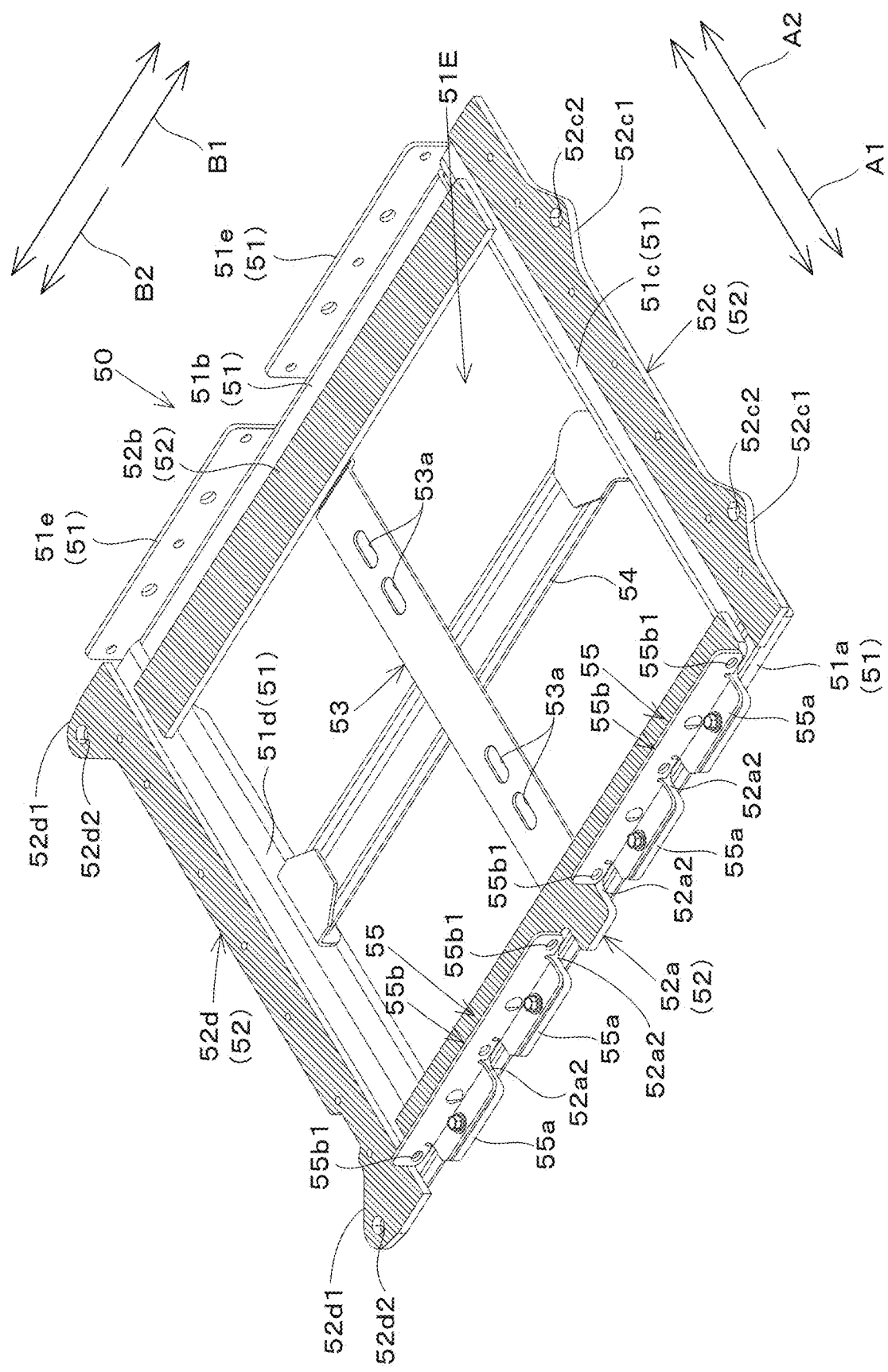
FIG. 8 is a left front perspective view showing a support body.
Figure 9:
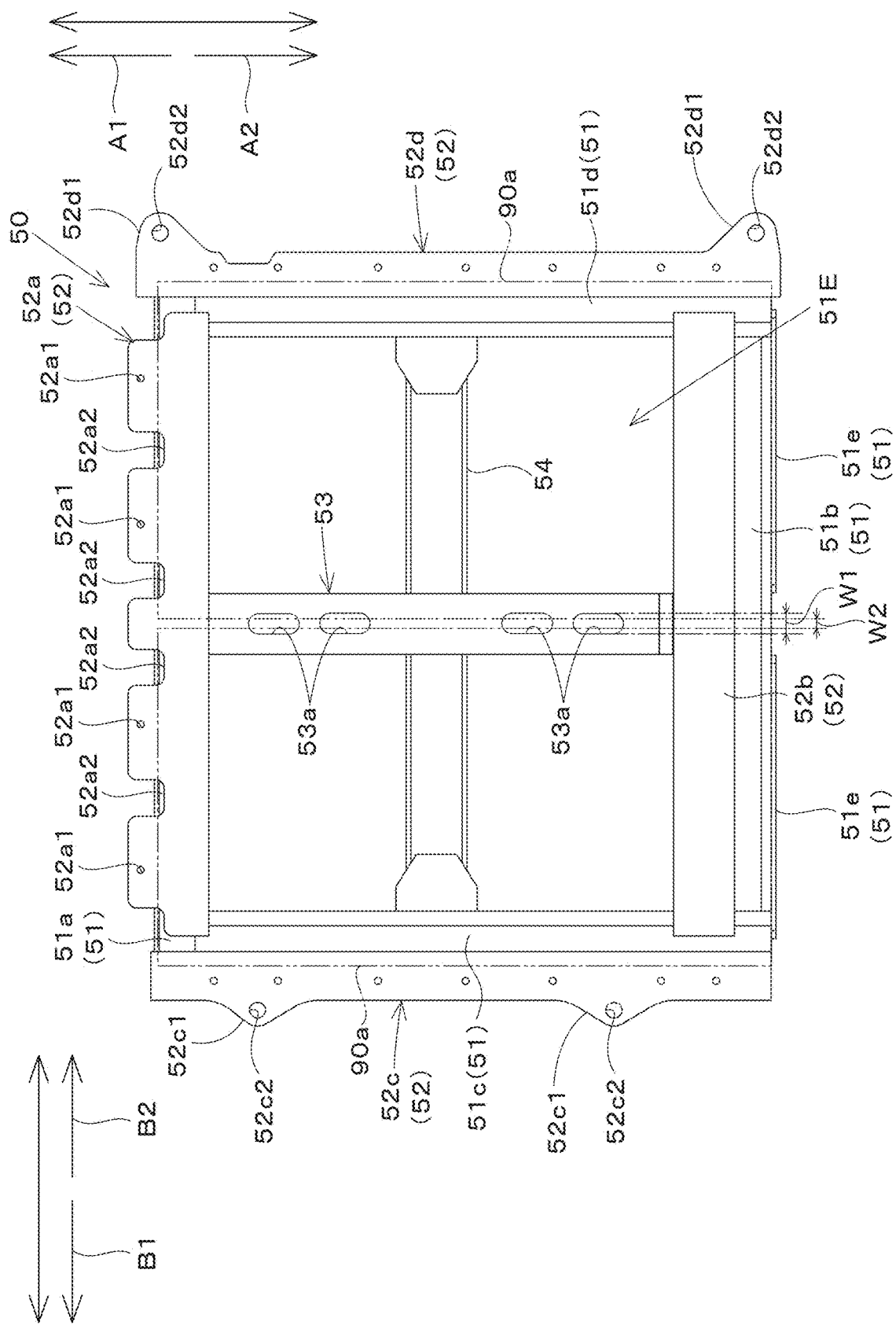
FIG. 9 is a plan view showing a support body.
Figure 10:
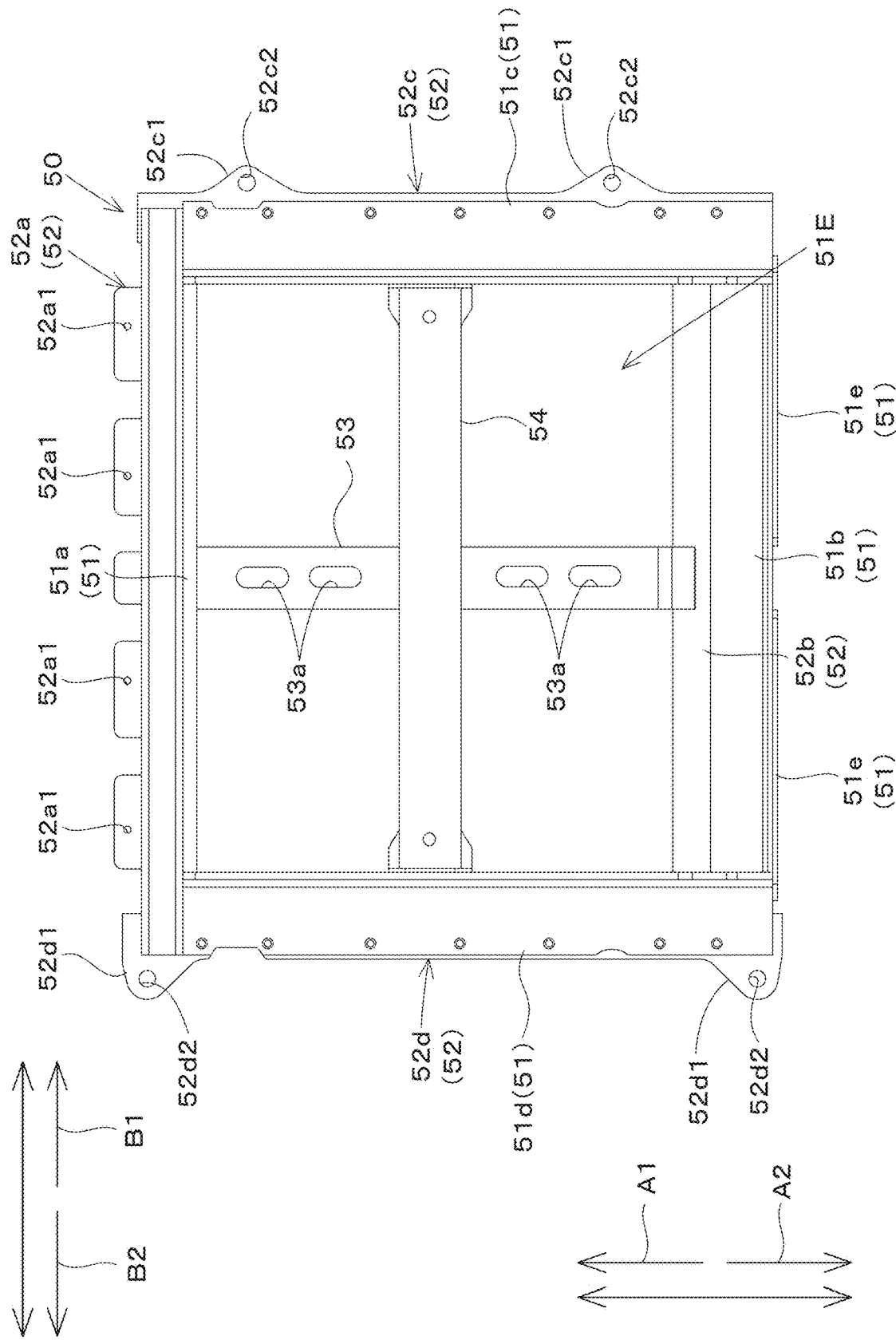
FIG. 10 is a bottom view showing a support body.

The following discusses the manner in which the battery 90, the electric motor 91, the hydraulic pump 92, and the electrical components 93 are attached. As shown in FIG. 7, the swivel working machine 1 includes a support body 50, a upright frame 56, and a support portion 65. The support body 50 is a structure to support the battery 90 on or above the swivel base 2. FIG. 8 is a left front perspective view showing the support body 50. FIG. 9 is a plan view showing the support body 50. FIG. 10 is a bottom view showing the support body 50.

As shown in FIGS. 8, 9 and 10, the support body 50 includes a thick steel sheet or the like. The support body 50 is provided on the swivel base 2 such that the sheet surfaces face upward and downward. The support body 50 is fixed to the swivel base 2 via fastener(s) V such as bolt(s). That is, the support body 50 is attached to the swivel base 2 such that the support body 50 cannot move relative to the swivel base 2.

The support body 50 includes a frame 51 and a plurality of plates 52. The frame 51 connects the plurality of plates 52 together. The frame 51 connects the plurality of plates 52 such that the upper faces of the plurality of plates 52 are flush with each other.

The frame 51 includes a front frame 51a, a front frame 51a, a rear frame 51b, and a pair of a lateral frames 51c and 51d. The front frame 51a, the rear frame 51b, and the pair of lateral frames 51c and 51d are long frames each having a substantially L shaped cross section obtained by bending a thick steel.

The front frame 51a defines the front end portion of the frame 51, and is positioned such that the lengthwise direction thereof matches the width direction.

The rear frame 51b defines the rear end portion of the frame 51, and is positioned such that the lengthwise direction thereof matches the width direction. The rear frame 51b is spaced away from the front frame 51a in the front-rear direction.

The pair of lateral frames 51c and 51d are spaced away from each other in the width direction. The pair of lateral frames 51c and 51d respectively define one of opposite end portions in the width direction (left end portion) of the frame 51 and the other of the opposite end portions (right end portion) of the frame 51, and are positioned such that the lengthwise direction thereof matches the front-rear direction. That is, the frame 51 is, in plan view, substantially in the form of a number sign (#) defined by the front frame 51a, the pair of lateral frames 51c and 51d, and the rear frame 51b. Thus, the frame 51 includes an opening 51E at a central portion thereof. Note that the front frame 51a, the pair of lateral frames 51c and 51d, and the rear frame 51b need only connect the plurality of plates 52, and may be connected together directly such as by welding, or may be connected indirectly via the plurality of plates 52.

The frame 51 includes a pair of mount brackets 51e. The pair of mount brackets 51e are provided at one of opposite portions in the width direction (left portion) of the frame 51 and the other of the opposite portions (right portion) of the frame 51. In the present example embodiment, the pair of mount brackets 51e are located at the rear end portion of the frame 51. The left mount bracket 51e connects the rear end portion of the left lateral frame 51c and the rear portion of the rear frame 51b, and extends upward. The right mount bracket 51e connects the rear end portion of the right lateral frame 51d and the rear portion of the rear frame 51b, and extends upward. The pair of mount brackets 51e are fixed to a lower portion of a rear portion of the battery 90 via fastener(s) such as bolt(s).

The frame 51 is fixed to lower surfaces and/or side surfaces of the plates 52 by welding, for example.

The plates 52 are long flat components, and have placed thereon the outer peripheral portion of the bottom of the battery 90. The surfaces for placement of the battery 90 (hereinafter may be referred to as "placement surfaces") of the plates 52 (surfaces on which the battery 90 is placed)

(hatched portions in FIG. 8) are smoothened or substantially smoothened by machining. In other words, the support body 50 is not subjected to the machining, except for the placement surfaces of the plates 52. Note that the plates 52 are fixed to the frame 51 and then subjected to machining. Thus, it is possible to eliminate the distortion (welding distortion) of the placement surfaces of the plates 52 resulting from welding. Note that in the present example embodiment, the battery 90 is placed on the upper surfaces of the plates 52, and therefore the placement surfaces are the upper surfaces of the plates 52.

The plurality of plates 52 are spaced away from each other and fixed to the frame 51. The lower surfaces and/or side surfaces of the plates 52 are fixed to the frame 51 by welding, for example. In the present example embodiment, the plurality of plates 52 are four plates 52 including a first plate portion 52a, a second plate portion 52b, a third plate portion 52c, and a fourth plate portion 52d. Note that the number of the plurality of plates 52 is not limited to four, and may be three or five.

The first plate portion 52a is for placement of a front edge portion of the battery 90. In the present example embodiment, the first plate portion 52a is for placement of the front edge portions of a plurality of batteries 90a. The first plate portion 52a is provided at a front edge portion of the support body 50, and is positioned such that the longitudinal direction thereof matches the width direction. The first plate portion 52a is connected to the third plate portion 52c and the fourth plate portion 52d via the front frame 51a.

The lower surface and/or a side surface of the first plate portion 52a is/are fixed to the front frame 51a and to the pair of lateral frames 51c and 51d by welding, for example. In the present example embodiment, both the lower surface and a side surface of the first plate portion 52a are fixed to the front frame 51a and to the pair of lateral frames 51c and 51d by welding, for example.

The first plate portion 52a includes, in a front portion thereof, hole(s) 52a1 passing therethrough in the up-down direction, and cutout(s) 52a2 extending from its front edge portion rearward. The holes 52a1 are arranged over an area from one of the opposite ends in the width direction (left end) of the first plate portion 52a to the other of the opposite ends (right end) of the first plate portion 52a. The cutouts 52a2 are arranged over the area from one of the opposite ends in the width direction (left end) of the first plate portion 52a to the other of the opposite ends (right end) of the first plate portion 52a. The cutouts 52a2 are each provided between adjacent holes 52a1. Thus, in plan view, the first plate portion 52a is substantially in the form of a comb.

The rear edge portion of the battery 90 is placed on the second plate portion 52b. In the present example embodiment, rear edge portions of the plurality of batteries 90a are placed on the second plate portion 52b. The second plate portion 52b is provided at a rear edge portion of the support body 50, and is positioned such that the longitudinal direction thereof matches the width direction. The second plate portion 52b is connected to the third plate portion 52c and the fourth plate portion 52d via the rear frame 51b.

The lower surface and/or a side surface of the second plate portion 52b is/are fixed to the rear frame 51b and the pair of lateral frames 51c and 51d by welding, for example. In the present example embodiment, both the lower surface and a side surface of the second plate portion 52b are fixed to the rear frame 51b and the pair of lateral frames 51c and 51d by welding, for example.

One of the opposite edge portions in the width direction (left edge portion) of the battery 90 is placed on the third plate portion 52c. The left edge portion of one of the plurality of batteries 90a that is located at one of opposite sides in the width direction (leftmost battery 90a) is placed on the third plate portion 52c. The third plate portion 52c is provided at a left edge portion of the support body 50 and is positioned such that the longitudinal direction thereof matches the front-rear direction. The third plate portion 52c is connected to the first plate portion 52a and the second plate portion 52b via the left lateral frame 51c.

The lower surface and/or a side surface of the third plate portion 52c is/are fixed to the front frame 51a and the left lateral frame 51c by welding, for example. In the present example embodiment, both the lower surface and a side surface of the third plate portion 52c are fixed to the front frame 51a and the left lateral frame 51c by welding, for example.

The third plate portion 52c includes first attached portion(s) 52c1 to be fixed to the swivel base 2 via fastener(s) V such as bolt(s). Each first attached portion 52c1 extends outward along the width direction (leftward), and has a hole 52c2 passing therethrough in the up-down direction. The hole 52c2 has a fastener V inserted therein, and the fastener V is fastened to the first base 40a. In the present example embodiment, a plurality of the first attached portions 52c1 are provided near a front end portion of the third plate portion 52c and near a rear end portion of the third plate portion 52c.

The other of the opposite edge portions in the width direction (right edge portion) of the battery 90 is placed on the fourth plate portion 52d. The right edge portion of one of the plurality of batteries 90a that is located at the other of the opposite ends in the width direction (rightmost battery 90a) is placed on the fourth plate portion 52d. The fourth plate portion 52d is provided at a right edge portion of the support body 50, and is positioned such that the longitudinal direction thereof matches the front-rear direction. The fourth plate portion 52d is connected to the first plate portion 52a and the second plate portion 52b via the right lateral frames 51d.

The lower surface and/or a side surface of the fourth plate portion 52d is/are fixed to the front frame 51a and the right lateral frames 51d by welding, for example. In the present example embodiment, both the lower surface and a side surface of the fourth plate portion 52d are fixed to the front frame 51a and the right lateral frame 51d by welding, for example.

The fourth plate portion 52d includes second attached portion(s) 52d1 to be fixed to the swivel base 2 via fastener(s) V such as bolt(s). Each second attached portion 52d1 extends outward along the width direction (rightward), and has a hole 52d2 passing therethrough in the up-down direction. The hole 52d2 has a fastener V inserted therein, and the fastener V is fastened to a fifth base 40e provided at a right rear portion of the second vertical rib 31b and a sixth base 40f attached at a right end of the lateral rib 34. In the present example embodiment, a plurality of the second attached portions 52d1 are provided at a front end portion of the fourth plate portion 52d and a rear end portion of the fourth plate portion 52d. That is, the front second attached portion 52d1 is located forward of the front first attached portion 52c1, and the rear second attached portion 52d1 is located rearward of the rear first attached portion 52c1.

As shown in FIGS. 8, 9 and 10, the support body 50 includes a first connector plate 53 and a second connector plate 54. The first connector plate 53 is a long frame to connect a widthwise central portion of the first plate portion 52a and a widthwise central portion of the second plate portion 52*b*. The first connector plate 53 includes a thick steel sheet thinner than the plates 52, and the rear end portion of the first connector plate 53 is connected to the lower surface at the widthwise central portion of the second plate portion 52*b*. The rear end portion of the first connector plate 53 extends forward from the second plate portion 52*b*, is bent upward, is bent forward, and reaches the first plate portion 52*a* such that the upper surface is flush with the plurality of plates 52. The lower surface and a side surface of the front end portion of the first connector plate 53 are fixed to the rear edge portion of the first plate portion 52*a* by welding, for example. An adjacent pair of the plurality of batteries 90*a* are placed on the first connector plate 53.

As shown in FIGS. 8, 9 and 10, the first connector plate 53 includes vent hole(s) 53*a*, and the vent holes 53*a* are located between the two batteries 90*a*. The vent holes 53*a* are through-holes extending in the up-down direction. The width W1 of each vent hole 53*a* is greater than the distance W2 between batteries 90*a*. Note that the vent hole 53*a* need only overlap the gap between the batteries 90*a*, and that the shape, the size and the number of batteries 90*a* are not limited to the example shown in FIG. 9, etc. For example, the vent hole 53*a* may be in the form of a circle, a slit, a fin, and/or the like.

As shown in FIGS. 8, 9 and 10, the second connector plate 54 is a long frame which passes through the center of the opening 51E in the central portion of the frame 51 and extends from one of the opposite sides in the widthwise direction (left side) of the frame 51 to the other of the opposite sides (right sides) of the frame 51. The left end portion of the second connector plate 54 is connected to the central portion in the front-rear direction of the third plate portion 52*c*, and the right end portion of the second connector plate 54 is connected to the central portion in the front-rear direction of the fourth plate portion 52*d*. Thus, the first connector plate 53 and the second connector plate 54 are perpendicular to each other.

Note that the first connector plate 53 and the second connector plate 54 are not machined, and that the plates 52 are machined before the first connector plate 53 and the second connector plate 54 are attached to the plates 52 but after the plates 52 are fixed to the frame 51.

As shown in FIG. 8, the support body 50 includes retainer(s) 55. Each retainer 55 is a bracket provided on the first plate portion 52*a* or the second plate portion 52*b* to secure the battery 90. The retainer 55, together with a pair of mount brackets 51*e*, secures the battery 90. In the present example embodiment, the retainer 55 is provided on the first plate portion 52*a*. The retainer 55 is attached such that the retainer 55 is adjustable in the front-rear direction.

Figure 11:
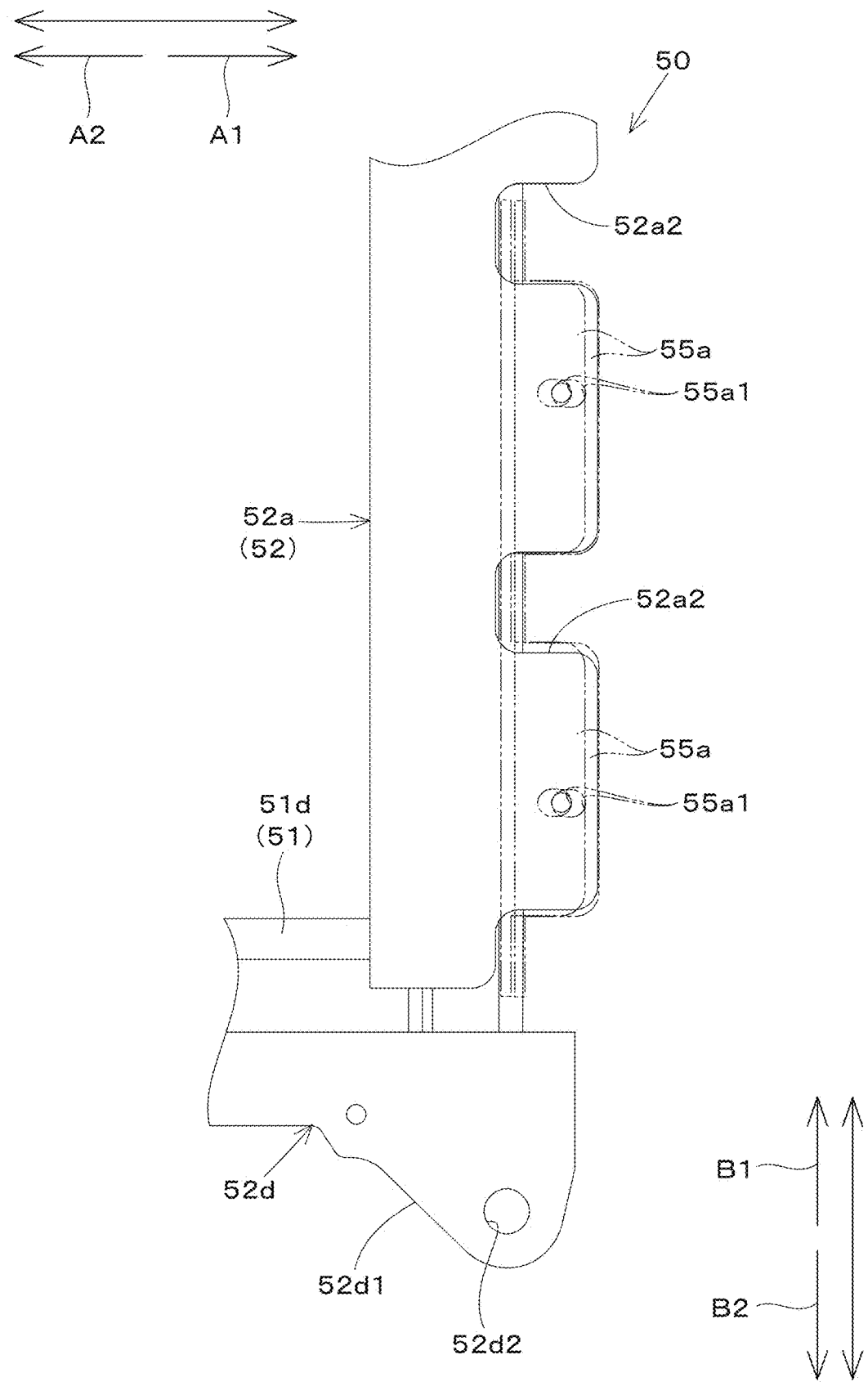
FIG. 11 illustrates how retainers move.

FIG. 11 illustrates how the retainers 55 move. As shown in FIG. 11, each retainer 55 is attached to the first plate portion 52*a* using fastener(s) such as bolt(s) and nut(s), and the fastener(s) is/are fastened to the hole(s) 52*a*1 in the front portion of the first plate portion 52*a*. Specifically, the retainer 55 is a member having a substantially L-shaped cross section including a first fixing portion 55*a* and a second fixing portion 55*b* extending upward from the first fixing portion 55*a*. The first fixing portion 55*a* includes a through-hole 55*a*1 passing therethrough in the up-down direction and elongated in the front-rear direction. Thus, as shown in FIG. 11, by changing the position in which the fastener is inserted through the through-hole 55*a*1, it is possible to adjust the position at which the retainer 55 is attached along the front-rear direction. The second fixing portion 55*b* includes a through-hole 55*b*1 passing therethrough in the front-rear direction and elongated in the width direction. The second fixing portion 55*b* is attached and fixed to the lower portion of the rear portion of the battery 90 using fastener(s) such as bolt(s). Note that in the case where the pair of mount brackets 51*e* are provided at the front portion of the frame 51, the retainers 55 are attached to the second plate portion 52*b*.

Figure 12:
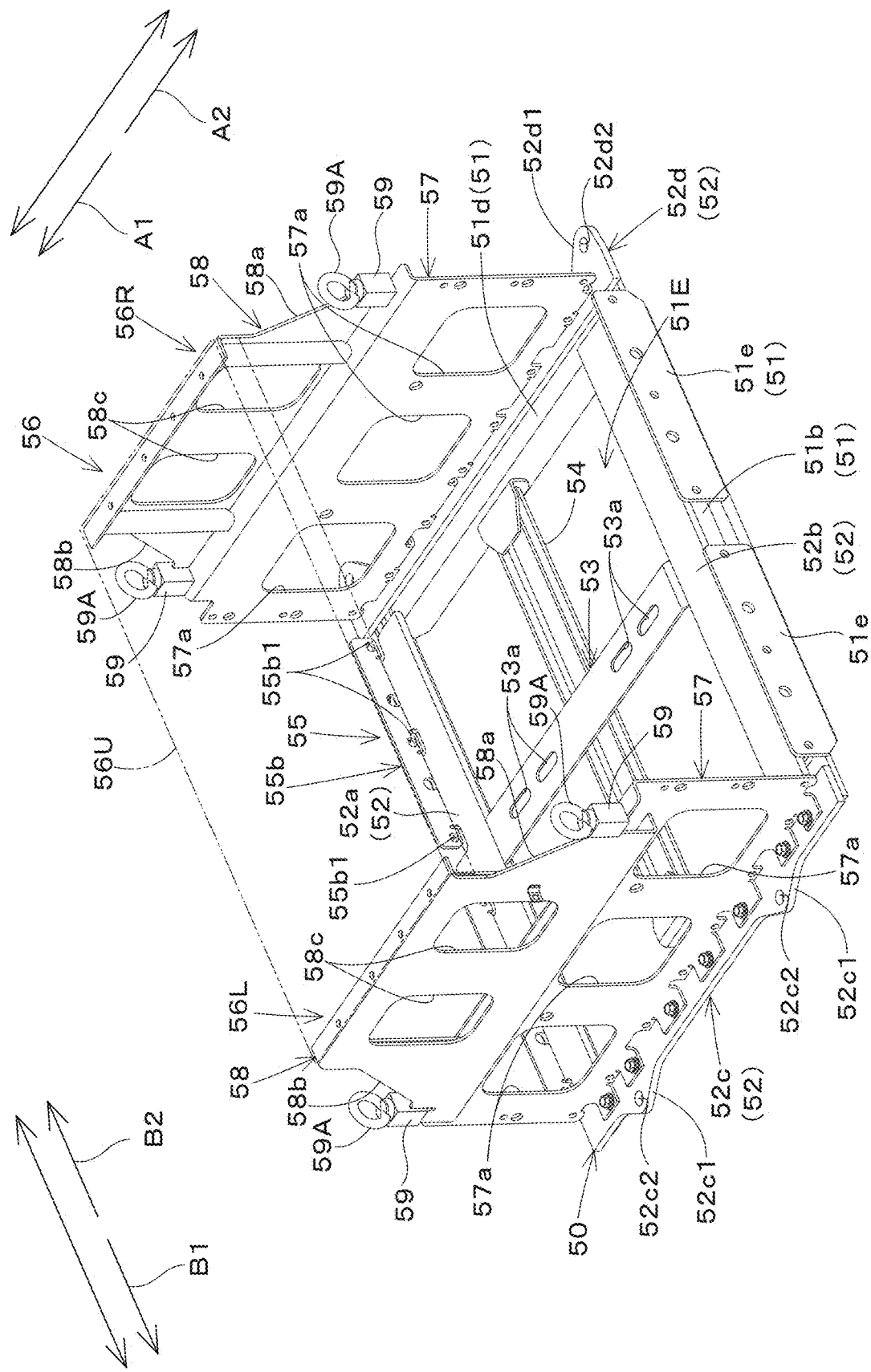

The following details the manner in which the electrical components 93 are attached. As shown in FIG. 7, the upright frame 56 includes a first upright portion 56L, a second upright portion 56R, and a coupling stay 56U. FIG. 12 is a left rear perspective view showing the support body 50, the first upright portion 56L, the second upright portion 56R, and the like.

As shown in FIG. 12, the first upright portion 56L is provided upright on the upper portion of the third plate portion 52*c* and, as shown in FIG. 7, supports one side of the battery 90. The first upright portion 56L is a plate that includes a thick steel sheet or the like. Thus, the first upright portion 56L supports the battery 90 such that the first upright portion 56L supports the entire dimension in the front-rear direction at one of opposite sides in the width direction (left side) of the battery 90.

On the other hand, as shown in FIG. 12, the second upright portion 56R is provided upright on the upper portion of the fourth plate portion 52*d* and, as shown in FIG. 7, supports the opposite side (right side) of the battery 90. The second upright portion 56R is a plate that includes a thick steel sheet or the like. Thus, the second upright portion 56R supports the battery 90 such that the second upright portion 56R supports the entire dimension in the front-rear direction at the other of the opposite sides in the width direction (right side) of the battery 90. That is, the battery 90 is held between the first upright portion 56L and the second upright portion 56R in the width direction.

As shown in FIG. 12, the first upright portion 56L and the second upright portion 56R each include a lower upright portion (stabilizer portion) 57 and an upper upright portion 58. The lower upright portion 57 is attached to the battery 90 such that the lower upright portion 57 extends over the dimension of the battery 90 in the front-rear direction. The lower upright portions 57 are provided at the left side and the right side of the support body 50, respectively. The lower upright portion 57 of the second upright portion 56R is provided upright between the support portion 65 and the battery 90, and attached to the opposite side (right side) of the battery 90.

The lower upright portion 57 of the first upright portion 56L is provided, at the one side (left side) of the battery 90, upright on the upper portion of the support body 50 (swivel base 2). The lower upright portion 57 of the first upright portion 56L is attached to the one side (left side) of the battery 90, independently of the lower upright portion 57 of the second upright portion 56R. In the present example embodiment, the lower upright portion 57 and the battery 90 are attached and fixed using fastener(s) such as bolt(s). Note that the lower upright portion 57 includes a plurality of openings 57*a* spaced away from each other in the front-rear direction.

As shown in FIG. 12, the upper upright portion 58 is attached to the upper portion of the lower upright portion 57. The upper upright portion 58 decreases in its front-rear dimension in the below-to-top direction. That is, the upper upright portion 58 includes, at a rear portion thereof, an inclined portion 58*a* extending from the lower rear to the upper front. The upper upright portion 58 includes, at a front portion thereof, an inclined portion 58*b* extending from the lower front to the upper rear.

Note that the upper upright portion 58 includes a plurality of openings 58c spaced away from each other in the front-rear direction. The upper upright portion 58 and the battery 90 are spaced away from each other, and a space is defined between the upper upright portion 58 and the battery 90.

The upper upright portion 58 includes, at the front and rear ends thereof, mounting portions 59 to and from which eyebolts 59A are attachable and detachable. With this, it is possible, when mounting an assembly in which the battery 90 is placed on the support body 50 and the electrical components 93 are attached to the coupling stay 56U on the swivel base 2, to lift up (hoist up) the entire assembly.

As shown in FIG. 7, the coupling stay 56U connects the upper portion of the first upright portion 56L and the upper portion of the second upright portion 56R, and supports the electrical components 93. That is, the coupling stay 56U reinforces the first upright portion 56L and the second upright portion 56R, and also supports the electrical components 93. Specifically, the coupling stay 56U includes, for example, a thick steel sheet or the like and is positioned such that the sheet surfaces face upward and downward. The coupling stay 56U is longer in the width direction than in the front-rear direction, and the dimension in the front-rear direction is shorter than the dimension in the front-rear direction of the battery 90.

As shown in FIG. 7, the electrical components 93 are placed on the upper portion of the coupling stay 56U such that the electrical components 93 are arranged in the width direction. The electrical components 93 are arranged on the upper portion of the coupling stay 56U in the following order from one of the opposite sides in the width direction (left side) of the coupling stay 56U: the inverter 93b, the junction box 93a, and the DC/DC converter 93c.

Figure 13:
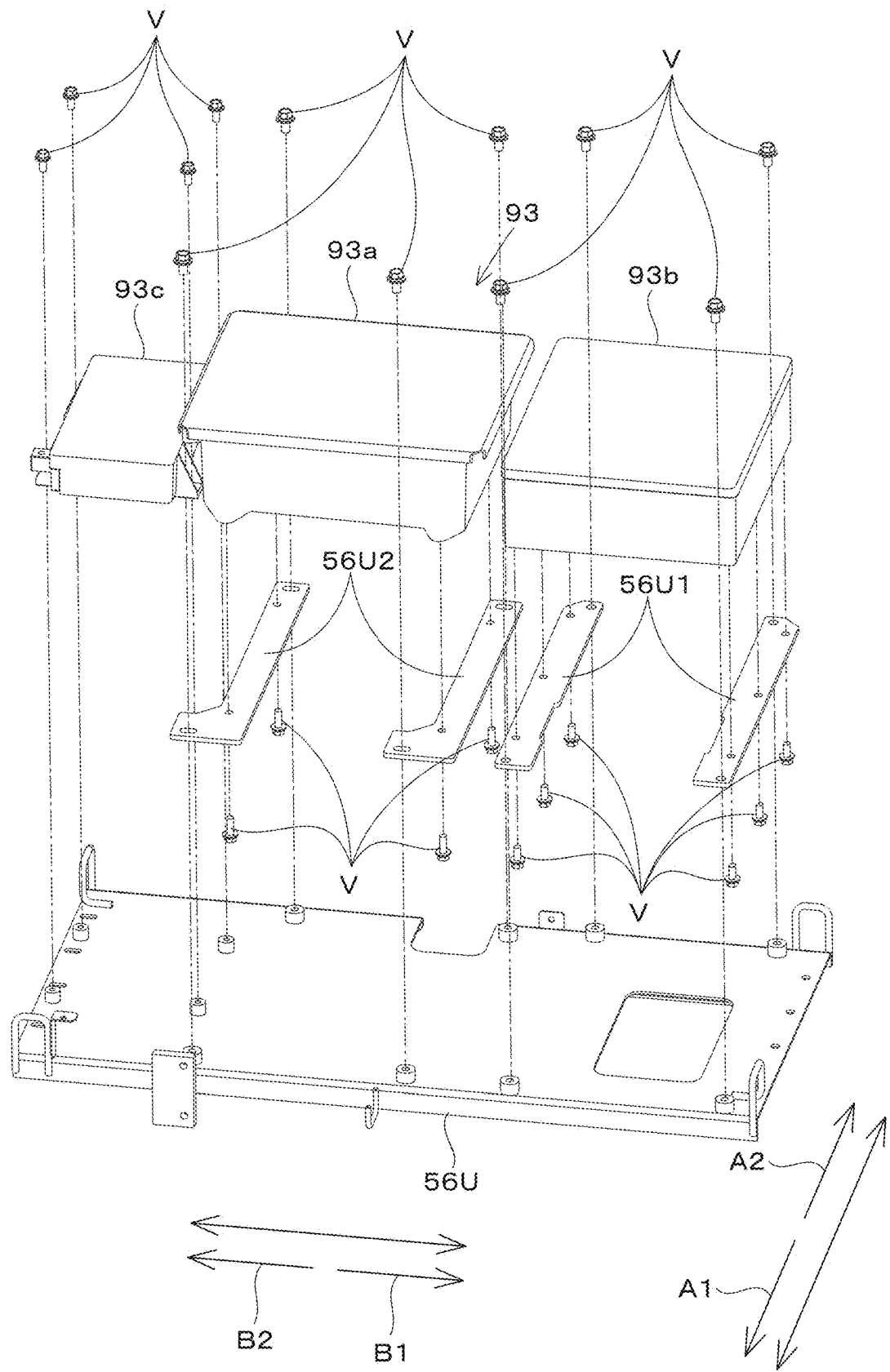
FIG. 13 is an exploded perspective view showing coupling stays and electrical components as seen from the left front.

FIG. 13 is an exploded perspective view showing the coupling stay 56U and the electrical component 93 as seen diagonally from the front left. As shown in FIG. 13, the electrical components 93 and the coupling stay 56U are attached and fixed using fasteners such as bolts. The electrical components 93 may be attached and fixed to the coupling stay 56U via mounting stay(s) 56U1, 56U2. In the present example embodiment, the junction box 93a and the DC/DC converter 93c are attached and fixed to the coupling stay 56U via the mounting stay 56U2. The mounting stays 56U1 and 56U2 have holes to be attached and fixed to the electrical components 93 and the coupling stay 56U via fasteners V such as bolts. One or more of the holes in the mounting stays 56U2 to attach at least the junction box 93a that are to be attached and fixed to the coupling stay 56U using fastener(s) V are long holes elongated in the width direction. With this, it is possible to eliminate or reduce the likelihood that harnesses connected to the electrical components 93 will be subjected to a load resulting from variations in dimensional tolerances of the electrical components 93 and the coupling stay 56U.

Figure 14:
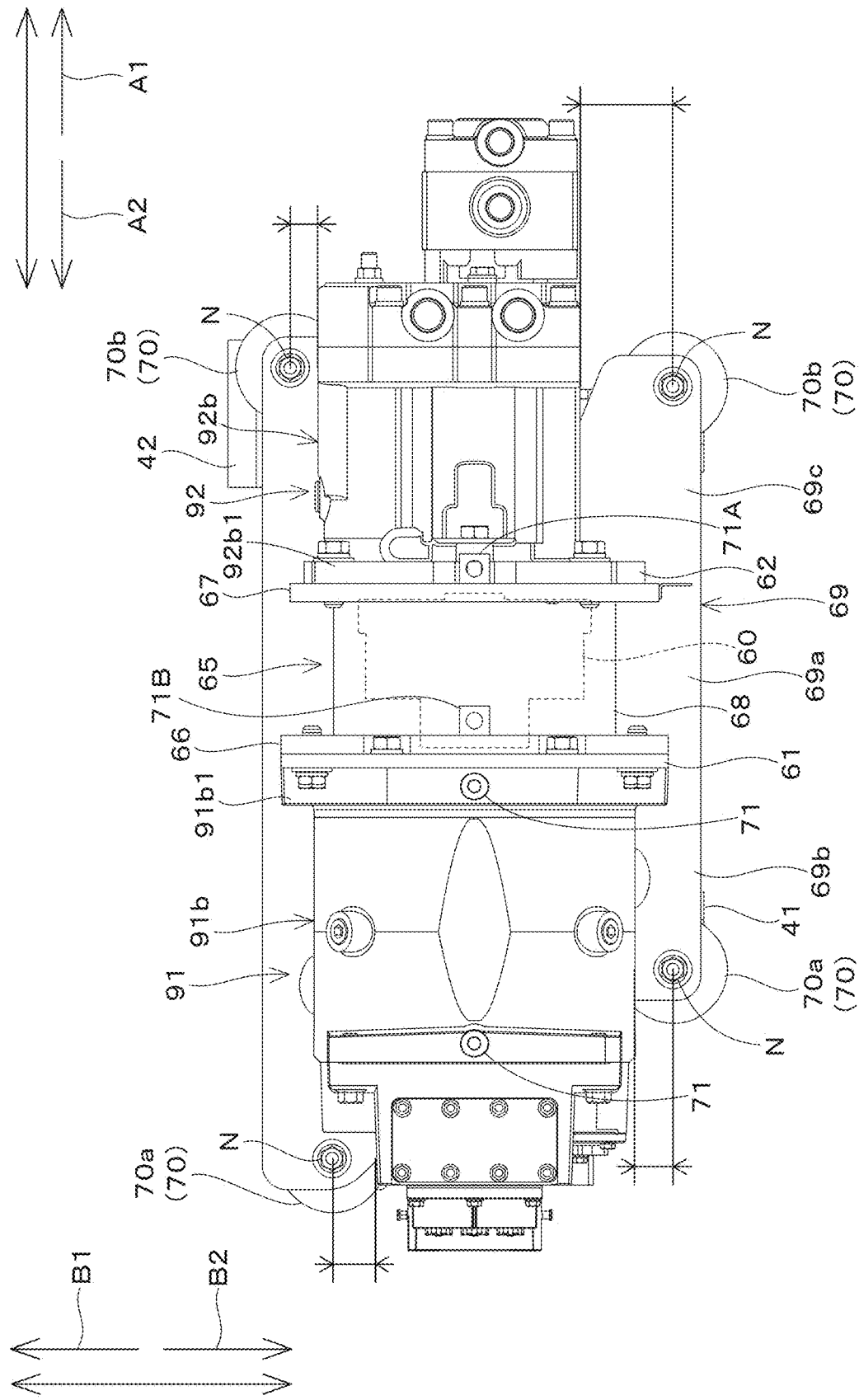
FIG. 14 is a plan view showing an electric motor, a support portion, and a hydraulic pump.

The following details the manner in which the electric motor 91 and the hydraulic pump 92 are attached. FIG. 14 is a plan view showing the electric motor 91, the support portion 65, and the hydraulic pump 92. As shown in FIG. 14, the swivel working machine 1 includes a connector 60, a first bracket 61, a second bracket 62, and the support portion 65. The electric motor 91 and the hydraulic pump 92 have their drive shaft 91a and input shaft 92a connected via the connector 60, and are attached to the support portion 65 via the first bracket 61 and the second bracket 62 as one unit. A structure including the electric motor 91 as well as the connector 60 and the first bracket 61 attached to the electric motor 91 is attached to the support portion 65 via the first bracket 61. A structure including the hydraulic pump 92 and the second bracket 62 attached to the hydraulic pump 92 is attached to the support portion 65 via the second bracket 62.

Figure 15:
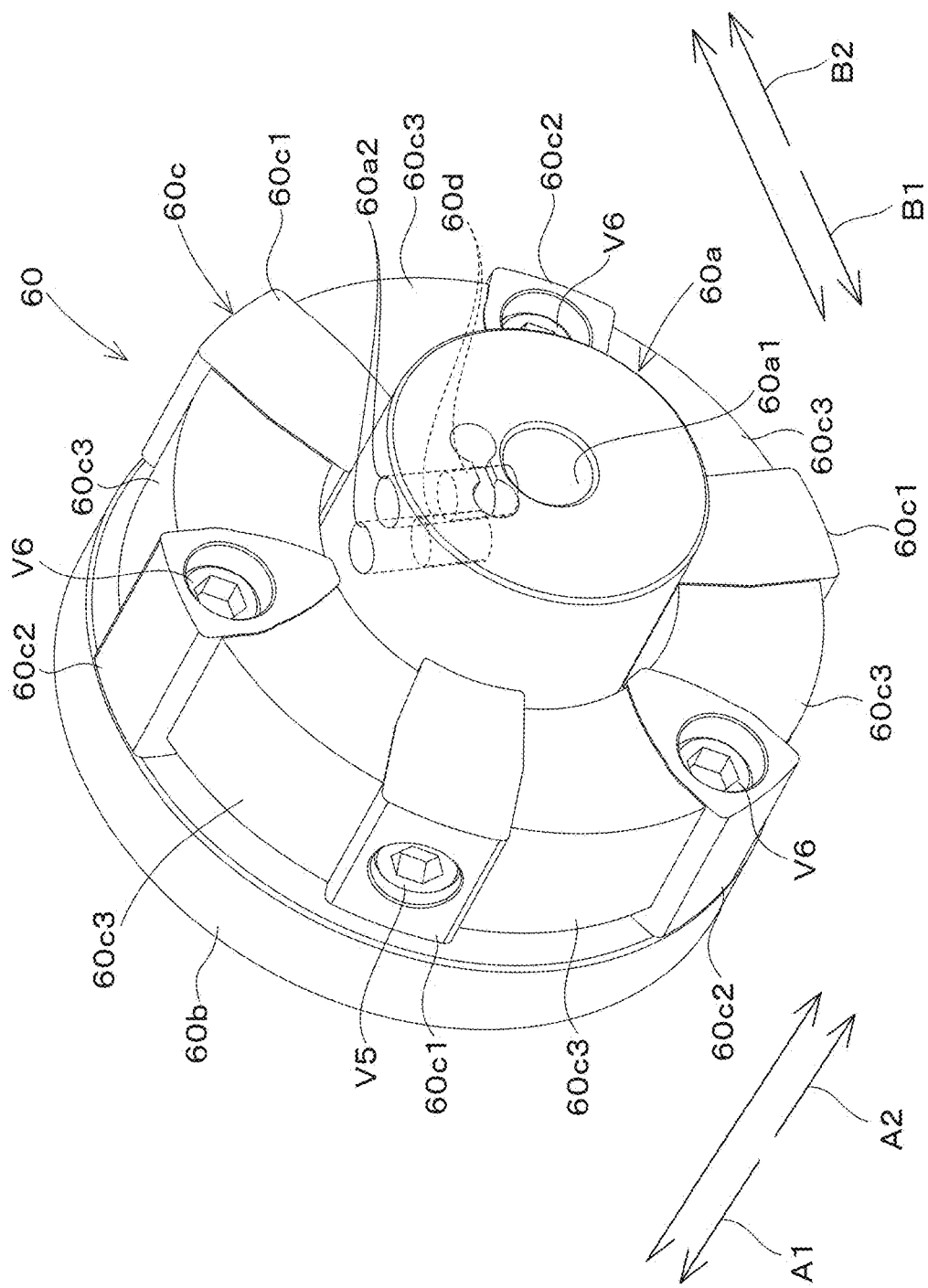
FIG. 15 is a perspective view showing a connector as seen from the left rear.

FIG. 15 is a perspective view of the connector 60 as seen from the left rear. The connector 60 is a coupling to connect the drive shaft 91a and the input shaft 92a. The connector 60 extends between the drive shaft 91a and the input shaft 92a, and connects the drive shaft 91a and the input shaft 92a such that the drive shaft 91a and the input shaft 92a rotate together about the same axis.

As shown in FIG. 15, the connector 60 is, for example, a substantially cylindrical structure extending in the axial direction of the drive shaft 91a and the input shaft 92a. The connector 60 is rotatable together with one of the drive shaft 91a and the input shaft 92a and is restricted from moving in the axial direction. The connector 60 is rotatable together with the other of the drive shaft 91a and the input shaft 92a and is not restricted from moving in the axial direction.

Figure 16:
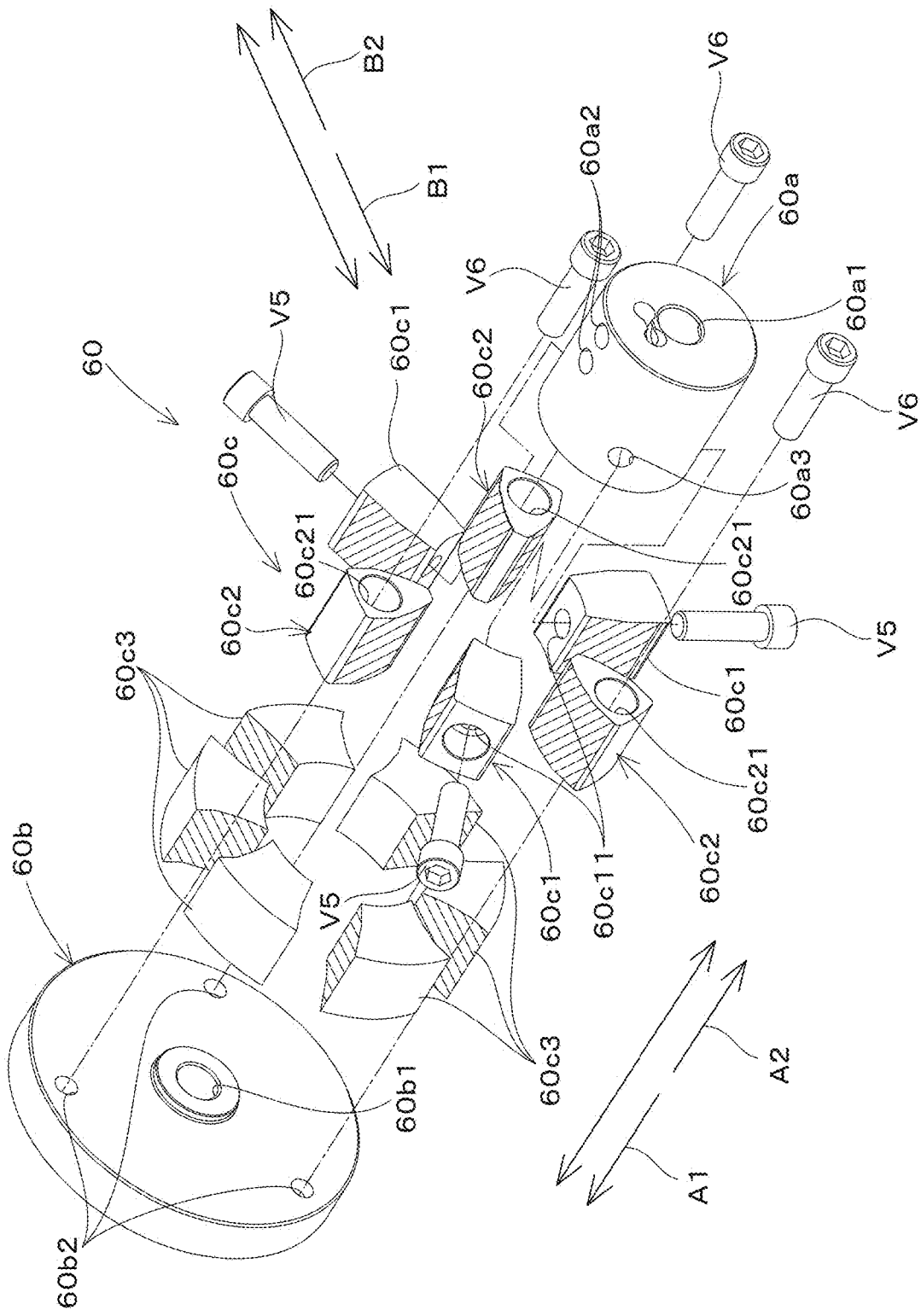
FIG. 16 is an exploded perspective view showing a connector as seen from the left rear.

FIG. 16 is an exploded perspective view showing the connector 60 as seen from the left rear. As shown in FIGS. 15 and 16, the connector 60 includes a first connector portion (clamping hub, boss portion) 60a to have attached thereto one of the drive shaft 91a and the input shaft 92a, a second connector portion (flange hub, flange portions) 60b to have attached thereto the other one of the drive shaft 91a and the input shaft 92a, and an elastic body 60c to connect the first connector portion 60a and the second connector portion 60b. Thus, the first connector portion 60a is rotatable together with one of the drive shaft 91a and the input shaft 92a and is restricted from moving in the axial direction. The second connector portion 60b is rotatable together with the other of the drive shaft 91a and the input shaft 92a and is not restricted in moving the axial direction.

Specifically, the first connector portion 60a has attached thereto a restrictor 60d to restrict (lock) the movement in the axial direction of one of the shafts. On the other hand, the second connector portion 60b has no restrictors 60d attached thereto, unlike the connector portion 60a. The following details the connector 60 using, as an example, a case where the drive shaft 91a is attached to the first connector portion 60a, and the input shaft 92a is attached to the second connector portion 60b. Note that the input shaft 92a may be attached to the first connector portion 60a and the drive shaft 91a may be attached to the second connector portion 60b.

As shown in FIGS. 15 and 16, the first connector portion 60a is in the shape of a cylinder, and has, at a central portion thereof, a first insertion hole 60a1 to have the drive shaft 91a inserted therethrough. The first insertion hole 60a1 defines a splined bearing having internal splines which fit the external splines on the drive shaft 91a. The outer surface of the first connector portion 60a have first attaching hole(s) 60a2 and second attaching hole(s) 60a3.

Figure 17:
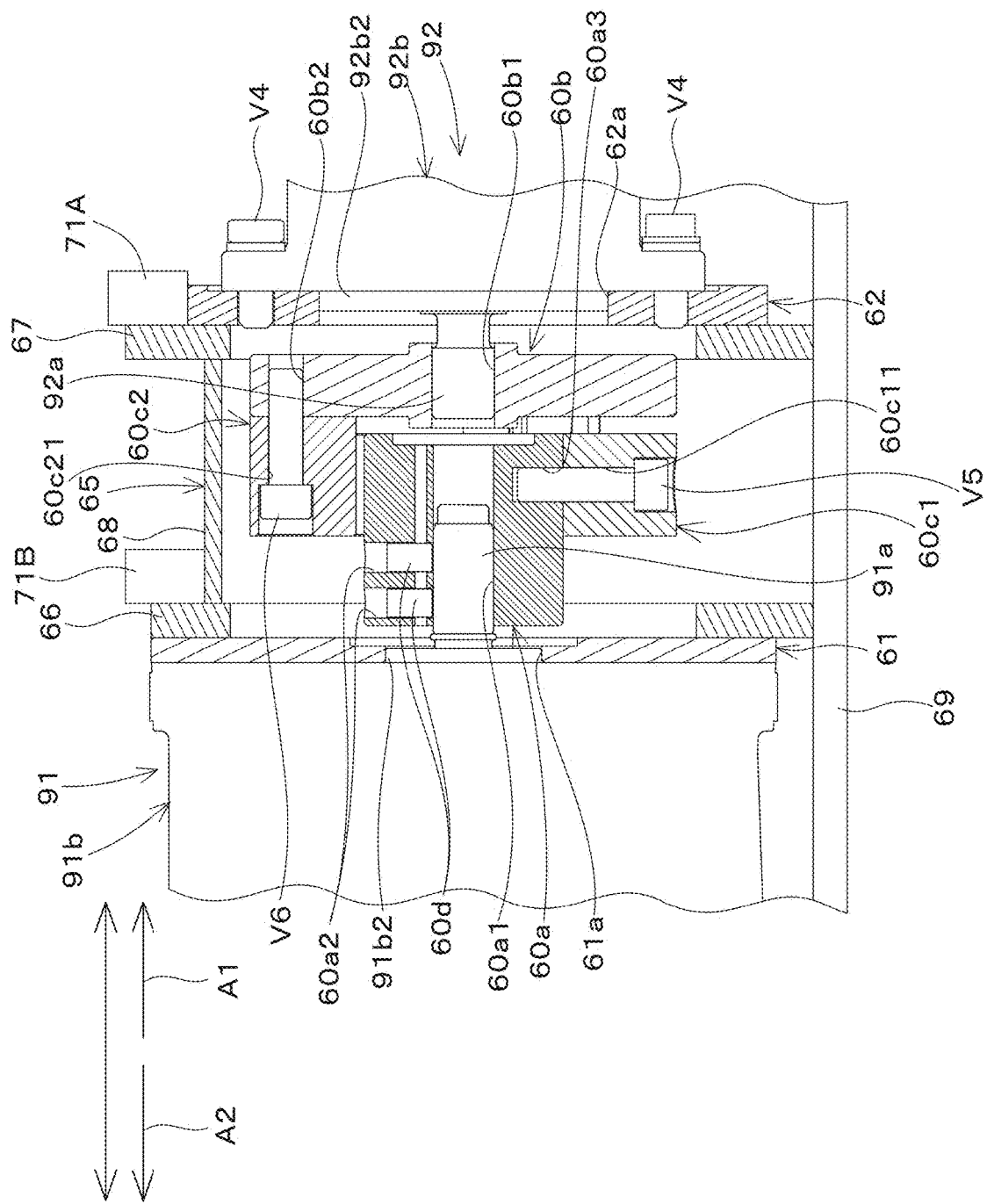
FIG. 17 is a cross-sectional view showing an electric motor, a support portion, a connector, and a hydraulic pump as seen from the right.

The first attaching hole 60a2 is a hole to attach the restrictor 60d thereto. As shown in FIGS. 15 and 16, the first attaching hole 60a2 is a through-hole extending in a radial direction from the outer surface of the first connector portion 60a to the first insertion hole 60a1. The first attaching hole 60a2 is located in one of opposite end portions of the first connector portion 60a that is distant from the second connector portion 60b the other (in a rear portion of the first connector portion 60a in the present example embodiment), and, when the first connector portion 60a is attached to the elastic body 60c, the first attaching hole 60a2 is located rearward of the elastic body 60c. The first connector portion 60a has a plurality of the first attaching holes 60a2 (two holes in the present example embodiment). FIG. 17 is a cross-sectional view showing the electric motor 91, the support portion 65, the connector 60, and the hydraulic pump 92 as seen from the right side. As shown in FIG. 17, the plurality of first attaching holes 60a2 are adjacent to each other in the axial direction (front-rear direction) of the drive shaft 91a and the input shaft 92a.

The restrictor 60d is able to restrict the movement of the drive shaft 91a inserted in the first insertion hole 60a1. The restrictor 60d prevents the movement in the front-rear direction of the drive shaft 91a inserted in the first insertion hole 60a1. In the present example embodiment, the restrictor 60d includes a socket set screw. The restrictor 60d is screwed into the first insertion hole 60a1, and, when the distal portion of the restrictor 60d abuts the outer surface of the drive shaft 91a inserted in the first insertion hole 60a1, the restrictor 60d restricts the movement of the drive shaft 91a.

With this, it is possible to connect the connector 60 to one of the drive shaft 91a and the input shaft 92a such that the connector 60 is rotatable together with the one of the drive shaft 91a and the input shaft 92a and is restricted from moving in the axial direction.

Note that the restrictor 60d is not limited to a socket set screw, and may be, for example, a bolt to be screwed into the first attaching hole 60a2, or may be a spring pin to be pressed into the first attaching hole 60a2. Further, the restrictor 60d need only be capable of restricting at least the movement in the axial direction of the drive shaft 91a, and may, for example, be a pin passing through the first attaching hole 60a2 and the drive shaft 91a. The restrictor 60d may be a ball lock mechanism provided on one of the first connector portion 60a and the drive shaft 91a instead of providing the first attaching hole 60a2 in the first connector portion 60a, and an existing technique can be used. In such a case, the other of the first connector portion 60a and the drive shaft 91a includes a recess with fits the ball lock mechanism or the like.

The second attaching hole 60a3 is a hole to attach the elastic body 60c thereto. As shown in FIG. 16, the second attaching hole 60a3 is a through-hole extending in a radial direction from the outer surface of the first connector portion 60a to the first insertion hole 60a1. The second attaching hole 60a3 is provided at one of the opposite end portions of the first connector portion 60a that is closer to the second connector portion 60b than the other (a front portion of the first connector portion 60a in the present example embodiment). Specifically, the second attaching hole 60a3 is positioned such that the second attaching hole 60a3 overlaps the elastic body 60c in side view. The first connector portion 60a includes a plurality of the second attaching holes 60a3 (three holes in the present example embodiment). The plurality of second attaching holes 60a3 are equally spaced away from each other along the direction of rotation of the drive shaft 91a and the input shaft 92a.

The second connector portion 60b is substantially in the form of a disc, and includes, at the central portion thereof, a second insertion hole 60b1 to have the input shaft 92a inserted therethrough. The second insertion hole 60b1 is a splined bearing including internal splines which fit the external splines on the input shaft 92a. The second connector portion 60b does not have attached thereto any member to restrict the movement in the axial direction of the shaft attached thereto, such as the restrictor 60d of the first connector portion 60a. Thus, it is possible to connect the other of the drive shaft 91a and the input shaft 92a to the connector 60 such that the other of the drive shaft 91a and the input shaft 92a is rotatable together with the connector 60 and is not restricted from moving in the axial direction. That is, it is possible to detach the hydraulic pump 92 from the connector 60 by moving the hydraulic pump 92 in the axial direction of the input shaft 92a with the connector 60 attached to the electric motor 91.

Note that the description of example embodiments above discusses example cases in which the drive shaft 91a and the input shaft 92a are splined shafts whereas the first insertion hole 60a1 and the second insertion hole 60b1 are splined bearings. However, it is only necessary that at least a structure to fix (keep) the relative positions in the direction of rotation of the drive shaft 91a, the input shaft 92a and the connector 60 but allow the drive shaft 91a, the input shaft 92a and the connector 60 to rotate together be provided. That is, an existing technique, such as including a key and a keyway, can be used to achieve the structure to fix the relative positions in the direction of rotation of the drive shaft 91a, the input shaft 92a and the connector 60.

As shown in FIG. 16, the second connector portion 60b includes, at a radially outer portion thereof, third attaching hole(s) 60b2 to attach the elastic body 60c. Each third attaching hole 60b2 is a through-hole extending in the axial direction of the drive shaft 91a and of the input shaft 92a. The second connector portion 60b includes a plurality of the third attaching holes 60b2 (three holes in the present example embodiment). The plurality of third attaching holes 60b2 are equally spaced away from each other in the direction of rotation of the drive shaft 91a and the input shaft 92a. The plurality of third attaching holes 60b2 are positioned such that they do not coincide with the plurality of second attaching holes 60a3 in the direction of rotation of the drive shaft 91a and the input shaft 92a. In the present example embodiment, the plurality of third attaching holes 60b2 are each located between adjacent second attaching holes 60a3.

The elastic body 60c includes first connecting structure(s) 60c1, second connecting structure(s) 60c2, and elastic portion(s) 60c3. Each first connecting structure 60c1 is fixed to the first connector portion 60a. In the present example embodiment, the first connecting structure 60c1 is made of metal or the like. The elastic body 60c includes a plurality of the first connecting structures 60c1 and, in the present example embodiment, includes three first connecting structures 60c1 corresponding to the number of second attaching holes 60a3. The first connecting structures 60c1 are fixed to the first connector portion 60a via fastener(s) V5 such as bolt(s). Each first connecting structure 60c1 includes hole(s) 60c11 to have the fastener(s) V5 inserted therein. The first connecting structures 60c1 are equally spaced away from each other in the direction of rotation of the drive shaft 91a and of the input shaft 92a at the outer perimeter of the first connector portion 60a.

Each second connecting structure 60c2 is fixed to the second connector portion 60b. In the present example embodiment, the second connecting structure 60c2 is made of metal or the like. The elastic body 60c includes a plurality of the second connecting structures 60c2 and, in the present example embodiment, includes three second connecting structures 60c2 corresponding to the number of third attaching holes 60a3. The second connecting structures 60c2 are fixed to the second connector portion 60b via the fastener(s) V6 such as bolt(s). Each second connecting structures 60c2 includes holes(s) 60c21 to have fastener(s) V6 inserted therein. The plurality of second connecting structures 60c2 are equally spaced away from each other in the direction of rotation of the drive shaft 91a and of the input shaft 92a at the outer perimeter of the second connector portion 60b.

The elastic portions 60c3 are fixed to the first connecting structures 60c1 and to the second connecting structures

60c2. In the present example embodiment, each elastic portion 60c3 is substantially in the shape of a sector in front view and rear view. As shown in FIG. 15, each elastic portion 60c3 is provided between a corresponding first connecting structure 60c1 and a corresponding second connecting structure 60c2. That is, the first connecting structures 60c1, the second connecting structures 60c2 and the elastic portions 60c3 are arranged in the direction of rotation of the first drive shaft 91a and the input shaft 92a in the repeating order of the first connecting structure 60c1, the second connecting structure 60c2, and the elastic portion 60c3.

The elastic portion 60c3 is fixed by being bonded to the first connecting structure 60c1 and the second connecting structure 60c2. The elastic portion 60c3 is bonded at the contact surfaces with the first connecting structure 60c1 and the second connecting structure 60c2 using an adhesive. In FIG. 16, the contact surfaces of the first connecting structure 60c1 and the elastic portion 60c3, and the contact surfaces of the second connecting structure 60c2 and the elastic portion 60c3 are hatched.

With this, even in the case where the speed of rotation of the drive shaft 91a increases and decreases and the load variations occur repeatedly, since the elastic portions 60c3 are fixed to the first connecting structures 60c1 and to the second connecting structures 60c2, it is possible to eliminate or reduce the likelihood that the contact surfaces of the first connecting structures 60c1 and the elastic portions 60c3 will rub against each other to wear and the contact surfaces of the second connecting structures 60c2 and the elastic portions 60c3 will rub against each other to wear.

As shown in FIG. 14, the first bracket (bracket) 61 is provided independently of the electric motor 91 and connects the electric motor 91 and the support portion 65. The first bracket 61, which is attached in advance to electric motor 91 together with the connector 60, is attached to the support portion 65.

Figure 18:
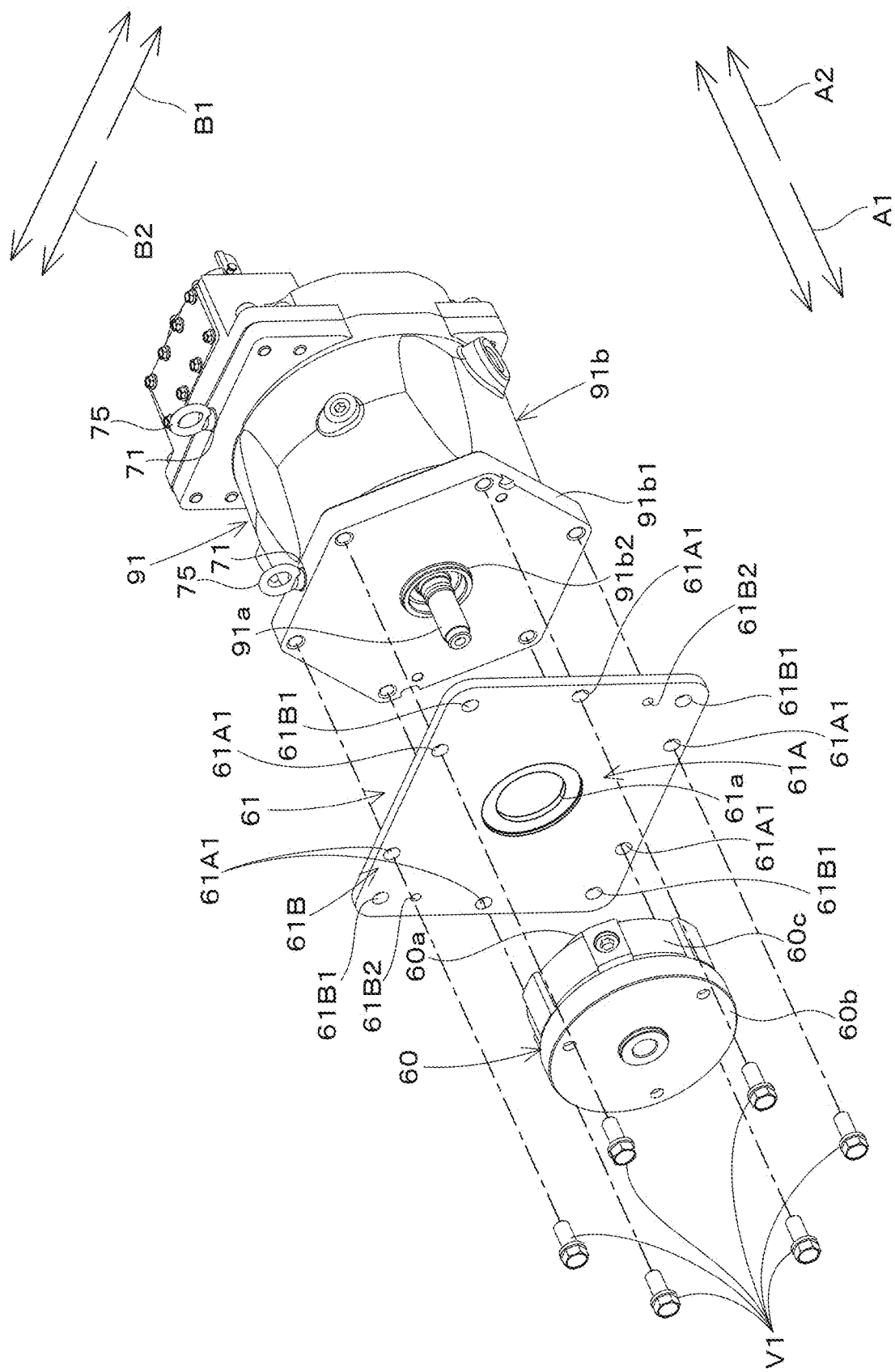
FIG. 18 is an exploded perspective view showing an electric motor, a connector, and a first bracket as seen from the left front.

FIG. 18 is an exploded perspective view showing the electric motor 91, the connector 60, and the first bracket 61 as seen from the left front. As shown in FIG. 18, the first bracket 61 includes a plate made of a thick steel sheet or the like. In the present example embodiment, the first bracket 61 is substantially in the shape of a square in front view or rear view, and has, at the central portion thereof, a first socket hole (socket hole) 61a. The first socket hole 61a is for insertion of the drive shaft 91a, and has attached thereto a first spigot fitting portion (spigot fitting portion) 91b2 provided around the drive shaft 91a on a casing 91b of the electric motor 91. The first spigot fitting portion 91b2 projects toward the distal end of the drive shaft 91a from a first collar portion 91b1 provided at one of opposite end portions of the casing 91b of the electric motor 91 that is closer to the drive shaft 91a than the other. The inner diameter of the first socket hole 61a is smaller than the outer diameter of the connector 60, and the first bracket 61 is attached to the electric motor 91 before the connector 60 is connected to the drive shaft 91a.

The first bracket 61 includes a first coupling portion 61A connected to the electric motor 91, and a first extension portion (extension portion) 61B connected to the support portion 65. The first coupling portion 61A is connected to the first collar portion 91b1, and has hole(s) 61A1 passing through the first coupling portion 61A in the axial direction of the first coupling portion 61A and configured to have fastener(s) V1 such as bolt(s) inserted therethrough.

The first extension portion 61B is located outward of the first coupling portion 61A in the radial direction of the drive shaft 91a. That is, the first extension portion 61B projects outward in the radial direction of the drive shaft 91a relative to the electric motor 91. The first extension portion 61B includes first connected portion(s) (connected portion) 61B1 connected to the support portion 65. Each first connected portion 61B1 is a through-hole extending in the axial direction of the drive shaft 91a and configured to have a fastener V2 such as a bolt inserted therein, and the first bracket 61 and the support portion 65 are fastened via the fastener(s) V2. In the present example embodiment, the first extension portion 61B has four first connected portions 61B1, which are located at respective corners of the first extension portion 61B.

Thus, the first bracket 61 is attached to the electric motor 91 after fitting the first spigot fitting portion 91b2 and the first socket hole 61a with each other to position the axis of the drive shaft 91a and the center of the first socket hole 61a relative to each other.

As shown in FIG. 14, the second bracket (bracket) 62 is provided independently of the hydraulic pump 92 and connects the hydraulic pump 92 and the support portion 65. The second bracket 62, which is attached in advance to the hydraulic pump 92 together with the connector 60, is attached to the support portion 65.

Figure 19:
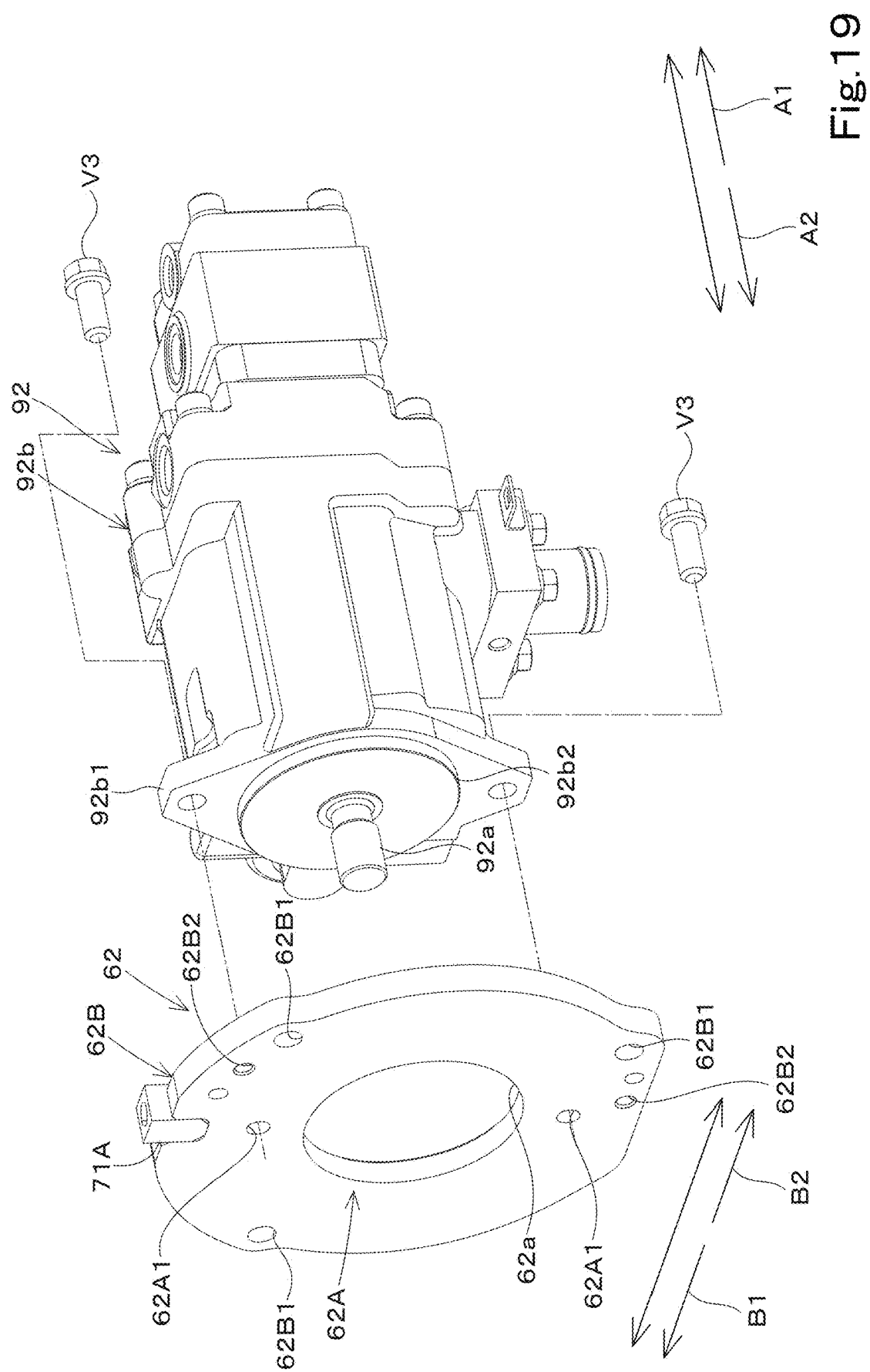
FIG. 19 is an exploded perspective view showing a hydraulic pump and a second bracket as seen from the right rear.

FIG. 19 is an exploded perspective view showing the hydraulic pump 92 and the second bracket 62 as seen from the right rear. As shown in FIG. 19, the second bracket 62 includes a plate made of a thick steel sheet or the like. In the present example embodiment, the second bracket 62 is substantially in the form of a ring in front view and rear view, and has, at the central portion thereof, a second socket hole (socket hole) 62a. The second socket hole 62a is a hole to have the input shaft 92a inserted therethrough, and has attached thereto a second spigot fitting portion (spigot fitting portion) 92b2 provided around the input shaft 92a on a casing 92b of the hydraulic pump 92. The second spigot fitting portion 92b2 projects toward the distal portion of the input shaft 92a from a second collar portion 92b1 provided at one of the opposite end portions of the casing 92b of the hydraulic pump 92 that is closer to the input shaft 92a than the other. The second bracket 62 is attached to the hydraulic pump 92 before being attached to the support portion 65.

The second bracket 62 includes a second coupling portion 62A connected to the hydraulic pump 92, and a second extension portion (extension portion) 62B connected to the support portion 65. The second coupling portion 62A is connected to the second collar portion 92b1, and has hole(s) 62A1 passing through the second coupling portion 62A in the axial direction of the input shaft 92a and configured to have fastener(s) V3 such as bolt(s) fastened. In the present example embodiment, the two holes 62A1 are provided in the second coupling portion 62A, and are located above and below the input shaft 92a.

The second extension portion 62B is located outward of the second coupling portion 62A in the radial direction of the input shaft 92a. That is, the second extension portion 62B projects outward in the radial direction of the input shaft 92a relative to the hydraulic pump 92. The second extension portion 62B includes second connected portion(s) (connected portion) 62B1 connected to the support portion 65. Each second connected portion 62B1 is a through-hole extending in the axial direction of the input shaft 92a and configured to have a fastener V4 such as a bolt inserted therethrough, and the second bracket 62 and the support portion 65 are connected via the fastener(s) V4. In the present example embodiment, three second connected portions 62B1 are provided in the second extension portion 62B, for example. Two of the second connected portions 62B1 are provided at the upper portion of the second extension portion 62B, and the other one second connected portion 62B1 is provided at the lower portion of the second extension portion 62B. The second connected portion 62B1 at the lower portion of the second extension portion 62B is offset in the width direction from the input shaft 92a. With this, the operator can easily achieve access using a tool when attaching the fastener V4 to the second connected portion 62B1 at the lower portion of the second extension portion 62B.

Thus, the second bracket 62 is attached to the hydraulic pump 92 after fitting the second spigot fitting portion 92b2 and the second socket hole 62a with each other to position of the axis of the input shaft 92a and the center of the second socket hole 62a relative to each other.

As shown in FIG. 7, the support portion 65 is a base to support the electric motor 91 and the hydraulic pump 92 above the swivel base 2 at one side of the battery 90. The support portion 65 is independent of the support body and supports the electric motor 91 and the hydraulic pump 92 above the swivel base 2 at the rear portion of the swivel base 2. As shown in FIG. 14, under the conditions in which the electric motor 91 is attached to the support portion 65 via the first bracket 61 and the hydraulic pump 92 is attached to the support portion 65 via the second bracket 62, the support portion 65 also defines and functions as a housing to surround the connector 60 at a position radially outward of the connector. Note that, in the present example embodiment, the support portion 65 defines and functions also as a housing, but a housing to surround the connector 60 at a position radially outward of the connector 60 may be provided independently of the support portion 65. The support portion 65 connects the electric motor 91 and the hydraulic pump 92 and supports the electric motor 91 and the hydraulic pump 92 such that the electric motor 91 and the hydraulic pump 92 are arranged in the front-rear direction.

Figure 20:
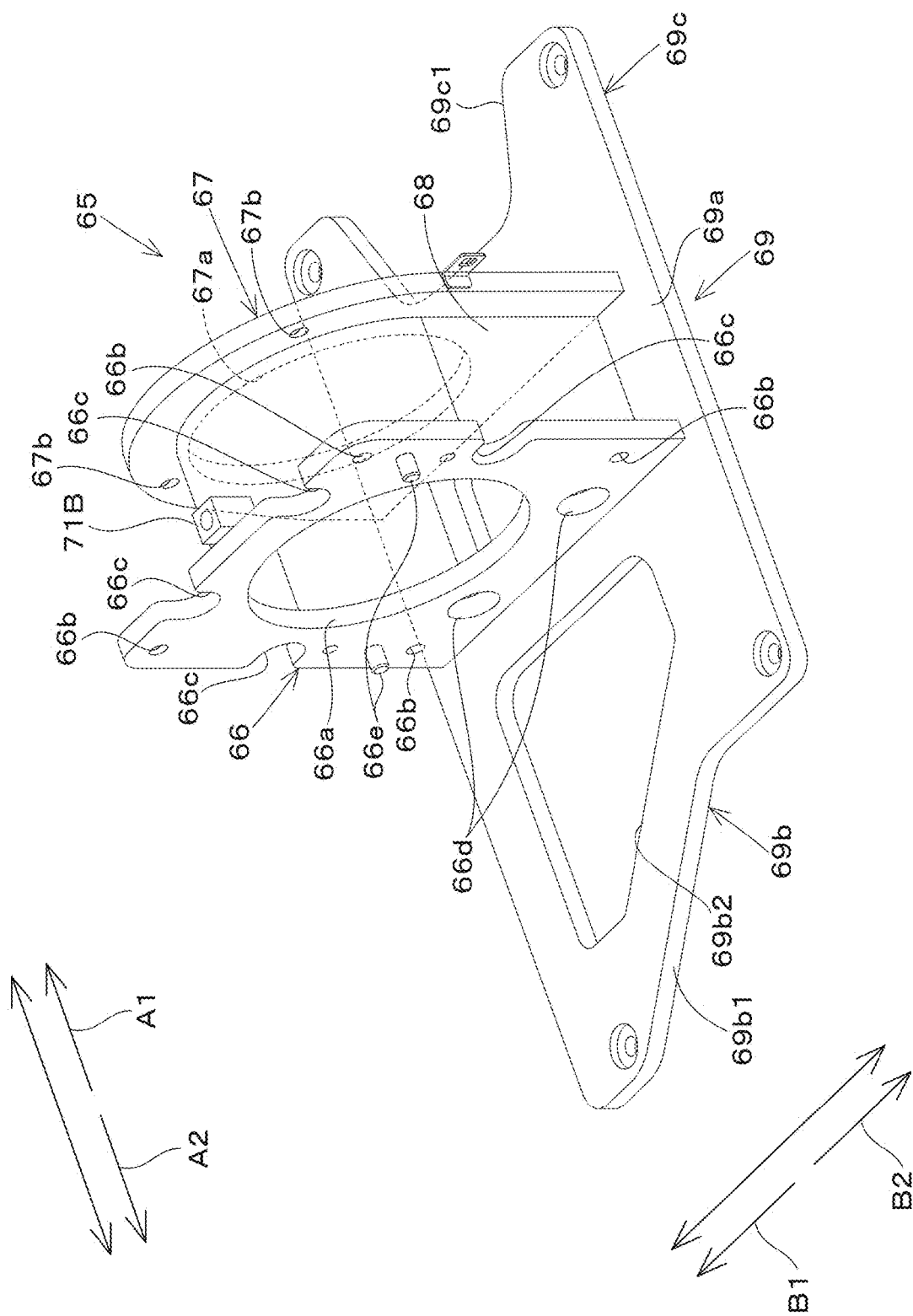
FIG. 20 is a right front perspective view showing a support portion.
Figure 21:
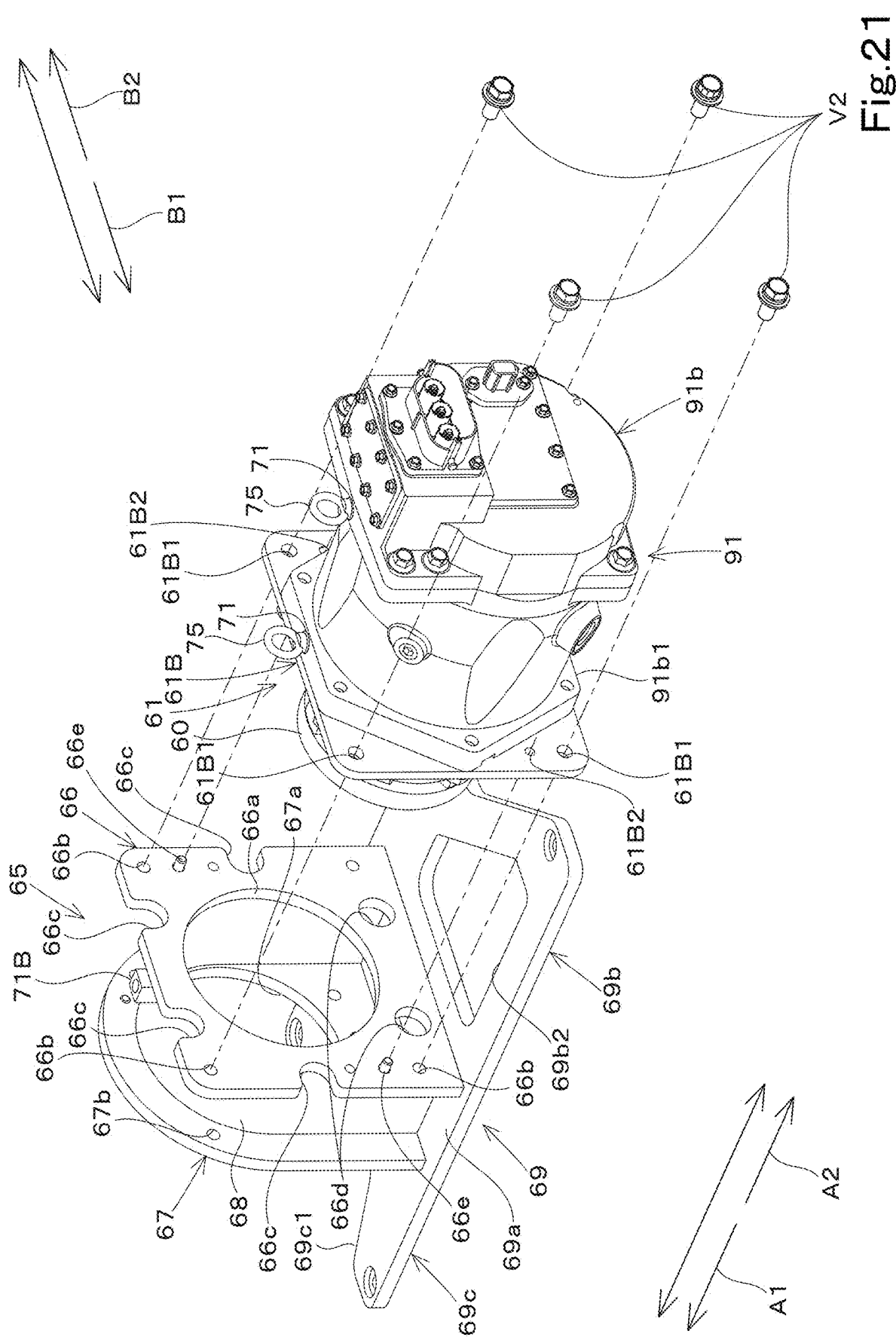
FIG. 21 is an exploded perspective view showing the manner in which a first bracket and the like are attached to a support portion.
Figure 22:
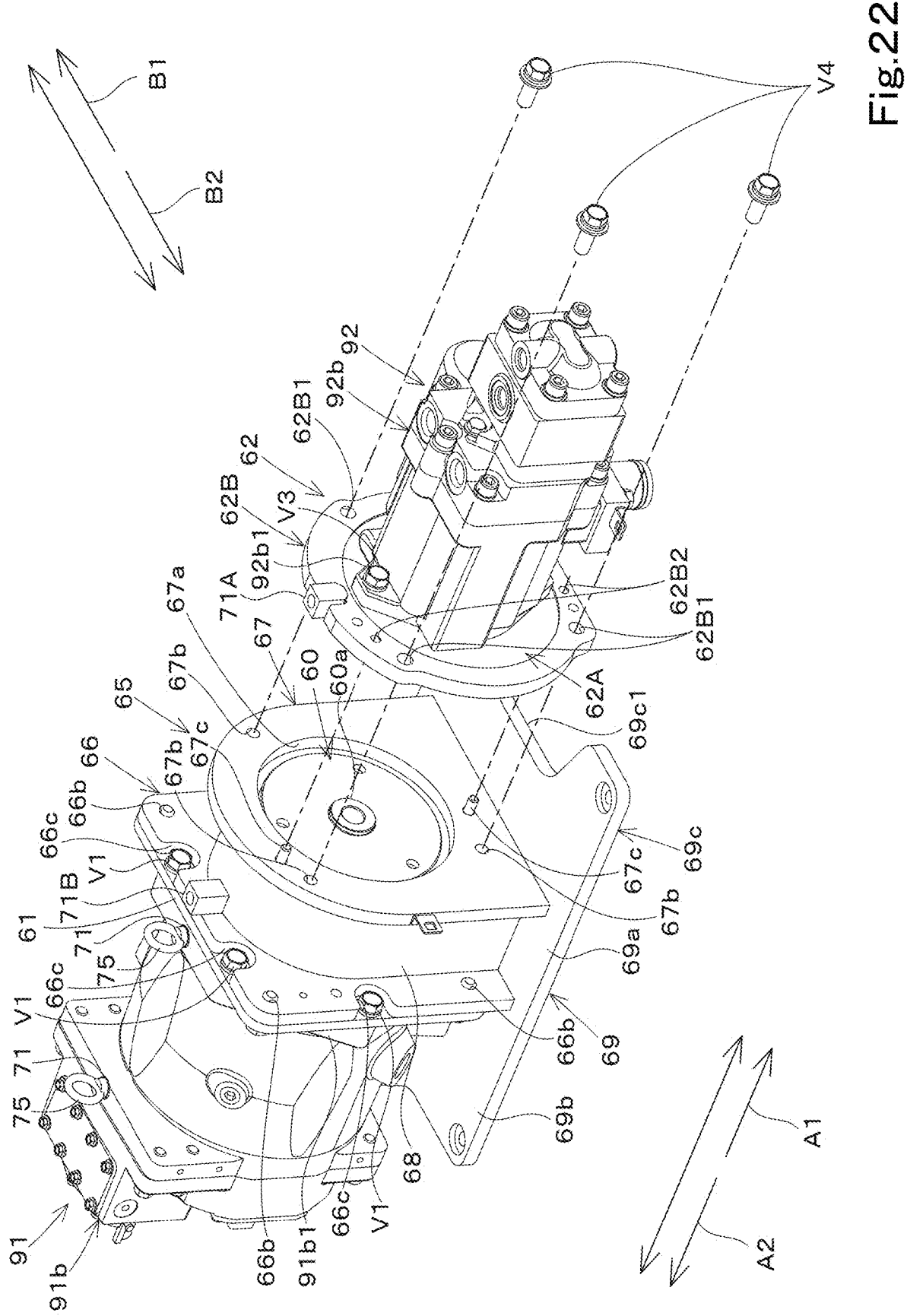
FIG. 22 is an exploded perspective view showing the manner in which a second bracket and the like are attached to a support portion.

FIG. 20 is a right-rear perspective view showing the support portion 65. FIG. 21 is an exploded perspective view showing the manner in which the first bracket 61 and the like are attached to the support portion 65. FIG. 22 is an exploded perspective view showing the manner in which the second bracket 62 and the like are attached to the support portion 65. As shown in FIGS. 20, 21 and 22, the support portion 65 includes a first upright plate 66, a second upright plate 67, a curved portion 68, and a base portion 69. The first upright plate 66 includes a plate made of a thick steel sheet or the like. The first upright plate 66 is provided upright such that the sheet surfaces face in the axial direction of the drive shaft 91a and the input shaft 92a (front-rear direction).

In the present example embodiment, the first upright plate 66 is substantially in the shape of a square in front view and rear view, and corresponds to the first bracket 61. The central portion of the first upright plate 66 includes a first opening portion 66a to have the connector 60 inserted therein. That is, the inner diameter of the first opening portion 66a is greater than the outer diameter of the connector 60. The first upright plate 66 has, at a peripheral portion thereof, hole(s) 66b to have fastened thereto fastener(s) V2 such as bolt(s) inserted in the first connected portion(s) 61B1.

Note that first upright plate 66 has, at a peripheral portion thereof, cutout(s) 66c and hole(s) 66d to avoid contact with the fastener(s) V1 connecting the electric motor 91 and the first bracket 61.

The second upright plate 67 includes a plate made of a thick steel sheet or the like. The second upright plate 67 is provided upright such that the sheet surfaces face in the axial direction of the drive shaft 91a and the input shaft 92a (front-rear direction). The second upright plate 67 is spaced away from the first upright plate 66 and faces the first upright plate 66 in the axial direction of the drive shaft 91a and the input shaft 92a (front-rear direction). The upper portion of the second upright plate 67 is in the form of a semicircle, and the lower portion of the second upright plate 67 is substantially in the form of a rectangle in front view or rear view, and the second upright plate 67 corresponds to the second bracket 62. The second upright plate 67 has, at a central portion thereof, a second opening portion 67a corresponding to the first opening portion 66a. The second upright plate 67 has, at a peripheral portion thereof, hole(s) 67b to have fastened thereto fastener(s) V4 such as bolt(s) inserted in the second connected portion(s) 62B1.

The curved portion 68 is a component provided between the first upright plate 66 and the second upright plate 67, and connecting the first upright plate 66 and the second upright plate 67. The curved portion 68 includes a plate made of a thick steel sheet or the like, and is in the form of a reverse U letter protruding upward in front view or rear view. One of opposite side portions (left end portion) of the curved portion 68 extends upward from the upper surface of the base portion 69, an intermediate portion of the curved portion 68 curves along the outer perimeter of the connector 60, and the other of the opposite side portions (right portion) of the curved portion 68 reaches the upper surface of the base portion 69.

The base portion 69 includes a plate made of a thick steel sheet or the like, and is positioned such that the plate surfaces face in the up-down direction. The base portion 69 supports the first upright plate 66, the second upright plate 67, and the curved portion 68 above the swivel base 2. The base portion 69 includes a central portion 69a provided with the first upright plate 66, the second upright plate 67, and the curved portion 68, and a pair of extension portions 69b and 69c extending from the central portion 69a. The central portion 69a is substantially in the shape of a rectangle elongated in the width direction, and opposite side portions in the width direction of the central portion 69a protrude outward relative to the electric motor 91 and the hydraulic pump 92 along the width direction.

The pair of extension portions 69b and 69c include a first extension portion 69b extending rearward from the rear edge of the central portion 69a, and a second extension portion 69c extending forward from the front edge of the central portion 69a. The first extension portion 69b defines a rear portion of the base portion 69, and is substantially in the shape of a trapezoid in plan view. The opposite end portions in the width direction of the first extension portion 69b protrude outward relative to the electric motor 91 and the hydraulic pump 92 in the width direction.

Specifically, the rear portion of the first extension portion 69b includes an inclined portion 69b1 extending diagonally from front to rear in the direction from the other of the opposite side portions (right portion) to the one of the opposite side portions (left portion). Thus, the inclined portion 69b1 is in the shape that conforms to the contour of the right rear portion of the outside cover 80. The first extension portion 69b includes an opening 69b2 passing through the first extension portion 69b in the up-down direction.

The second extension portion 69c defines a front end portion of the base portion 69, and the opposite side portions in the width direction of the second extension portion 69c protrude outward relative to the electric motor 91 and the hydraulic pump 92 in the width direction. The second extension portion 69c includes a cutout 69c1 at a front end portion thereof. The cutout 69c1 is provided to avoid contact with protrusions provided on the hydraulic pump 92 such as port(s).

As shown in FIGS. 7 and 14, the support portion 65 is attached to the swivel base 2 via a plurality of mounting devices 70. Under the conditions in which the electric motor 91 and the hydraulic pump 92 are attached to the support portion 65, the plurality of mounting devices 70 are located outward of the electric motor 91, the hydraulic pump 92, and the support portion 65 in the width direction in plan view,.

The plurality of mounting devices 70 are vibration-proof structures including elastically deformable elastic portions and/or the like. As shown in FIG. 14, there are four such mounting devices 70, for example. As shown in FIG. 7, the plurality of mounting devices 70 are attached to fixed brackets 41 and 42 attached to the swivel base 2. Note that the number of the plurality of mounting devices 70 is not limited to four, and may be three, or may be five. In the present example embodiment, the plurality of mounting devices 70 include a pair of rear mounting devices 70a and a pair of front mounting devices 70b.

As shown in FIG. 14, the pair of rear portion mounting devices 70a are arranged in the width direction at the rear end portion of the first extension portion 69b. The pair of rear portion mounting devices 70a support one of the opposite sides in the width direction (left side) and the other of the opposite sides (right side) of the rear end portion of the first extension portion 69b. Thus, the pair of rear portion mounting devices 70a are, in plan view, located outward of the electric motor 91, the hydraulic pump 92 and the support portion 65. Specifically, the center of a nut N fastening a corresponding rear portion mounting device 70a and the first extension portion 69b is located outward of the electric motor 91, the hydraulic pump 92 and the support portion 65 in the width direction. The pair of rear portion mounting devices 70a are displaced from each other in the front-rear direction.

The pair of front portion mounting devices 70b are arranged in the width direction at the front end portion of the second extension portion 69c. The pair of front portion mounting devices 70b support one of the opposite sides in the width direction (, left side) and the other of the opposite sides (right side) of the front end portion of the second extension portion 69c. Thus, the pair of front portion mounting devices 70b are, in plan view, located outward of the electric motor 91, the hydraulic pump 92 and the support portion 65 in the width direction. Specifically, the center of a nut N fastening a corresponding front portion mounting devices 70b and the second extension portion 69c is located outward of the electric motor 91, the hydraulic pump 92 and the support portion 65 in the width direction. The pair of front portion mounting devices 70b are arranged such that they coincide with each other in position in the front-rear direction.

As shown in FIGS. 21 and 22, the support portion 65 includes dowel pin(s) 66e and 67c to be fitted in the first bracket 61 and/or the second bracket 62. As shown in FIG. 21, the first upright plate 66 includes dowel pin(s) (first dowel pin) 66e directed in the axial direction of the drive shaft 91a. A plurality of the first dowel pins 66e are provided on the first upright plate 66 and, in the present example embodiment, the first upright plate 66 includes two first dowel pins 66e.

Figure 23:
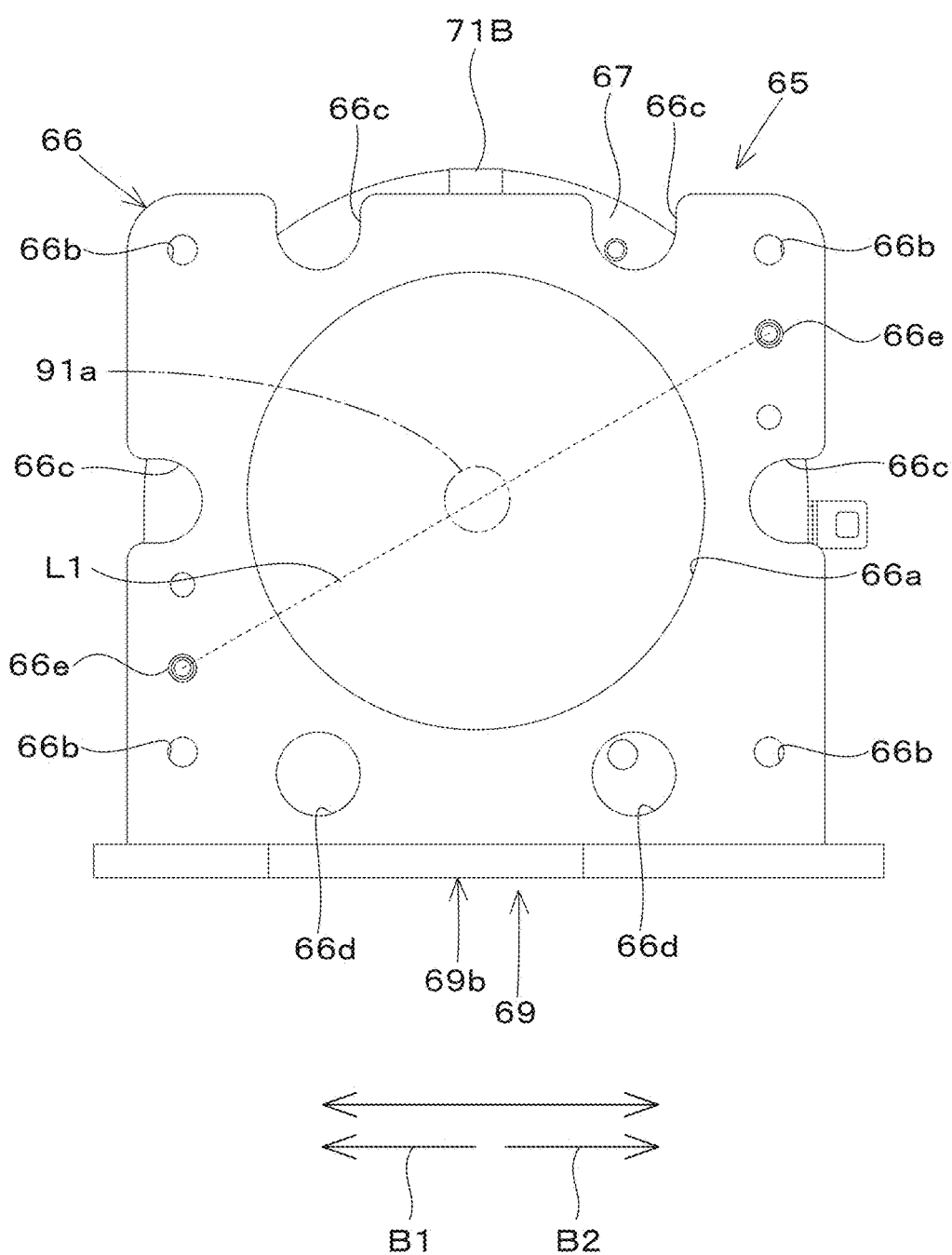
FIG. 23 is a rear view of a support portion showing the positions of first dowel pins.

FIG. 23 is a rear view of the support portion 65 showing the positions of the first dowel pins 66e. As shown in FIG. 23, the pair of first dowel pins 66e are provided at a peripheral portion of the first upright plate 66, and is positioned such that a straight line L1 connecting the axes of the first dowel pins 66e passes through the axis of the drive shaft 91a. In the present example embodiment, one of the first dowel pins 66e is provided at a lower portion of one of the opposite sides in the width direction (left side) of the first extension portion 61B, and the other first dowel pin 66e is provided at an upper portion of the other of the opposite sides (right side) of the first extension portion 61B.

As shown in FIG. 21, the first bracket 61 includes holes (first fitting holes) 61B2 in which the first dowel pins 66e are fitted. The first fitting holes 61B2 are through-holes extending in the axial direction of the drive shaft 91a, and are provided at positions corresponding to the pair of first dowel pins 66e.

As shown in FIG. 22, the second upright plate 67 includes dowel pin(s) (second dowel pins) 67c directed in the axial direction of the input shaft 92a. A plurality of the second dowel pins 67c are provided on the second upright plate 67 and, in the present example embodiment, the second upright plate 67 includes two first dowel pins 67c.

Figure 24:
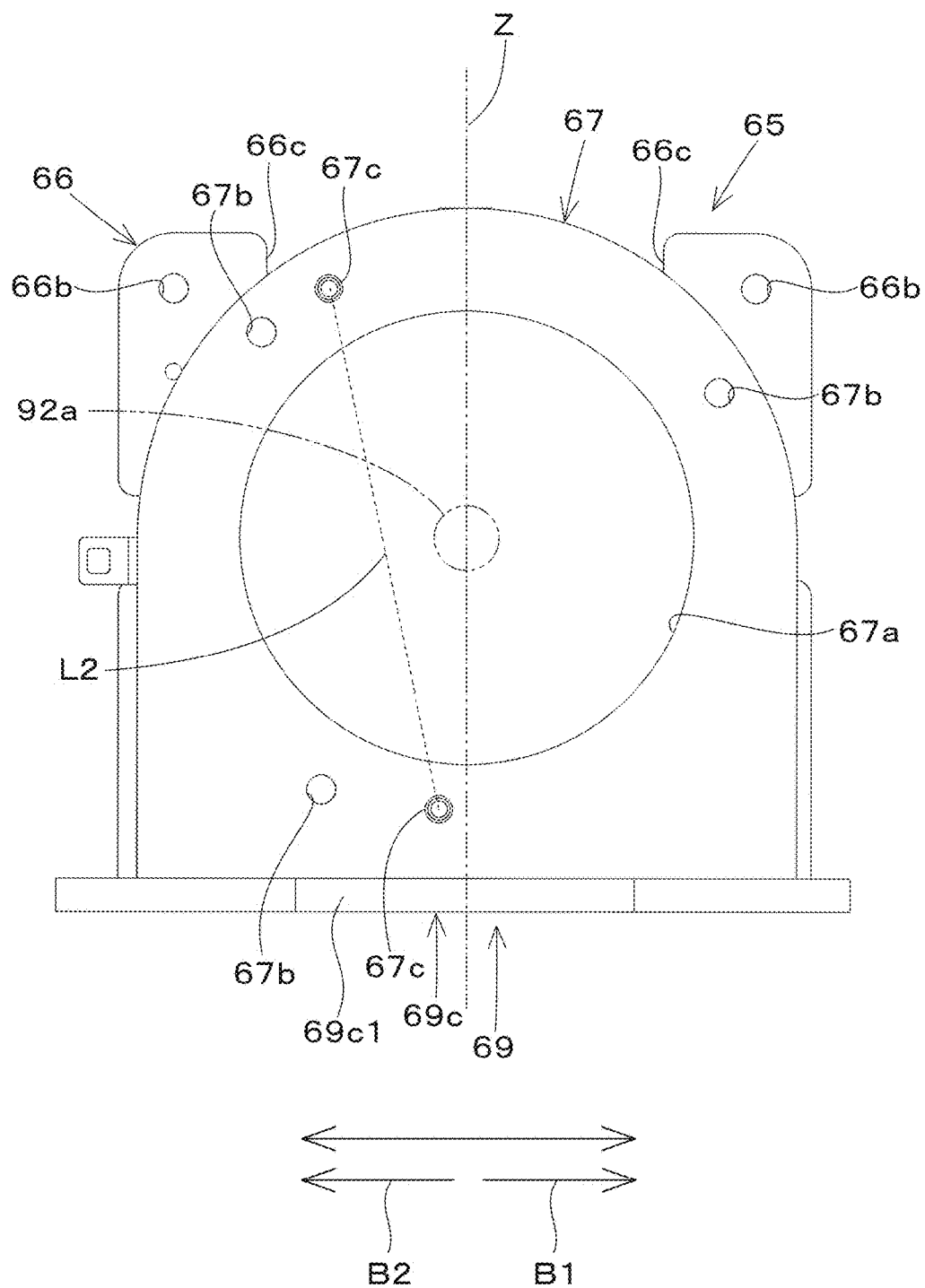
FIG. 24 is a front view of a support portion showing the positions of second dowel pins.

FIG. 24 is a front view of the support portion 65 showing the positions of the second dowel pins 67c. As shown in FIG. 24, the pair of second dowel pins 67c are provided at a peripheral portion of the second upright plate 67, and are arranged such that a straight line L2 connecting the axes of the second dowel pins 67c is displaced from the axis of the input shaft 92a. In the present example embodiment, one of the second dowel pins 67c is provided at the other of the opposite sides in the width direction (right side) of the upper portion of the second extension portion 62B, and the other second dowel pin 67c is provided at the other of the opposite sides (right side) of the lower portion of the second extension portion 62B. That is, the pair of second dowel pins 67c are located rightward of a perpendicular line Z passing through the axis of the input shaft 92a.

As shown in FIG. 22, the second bracket 62 includes holes (second fitting holes) 62B2 to have the second dowel pins 67c fitted therein. The second fitting holes 62B2 are through-holes extending in the axial direction of the input shaft 92a, and are provided at positions corresponding to the pair of second dowel pins 67c.

At least two or more of the electric motor 91, the first bracket 61, the support portion 65, the second bracket 62, and the hydraulic pump 92 are provided with a portion-for-attachment 71 to attach a hoisting attachment 75 thereto. In the present example embodiment, such portions-for-attachment 71 are provided on the electric motor 91, the support portion 65, and the second bracket 62. With this, by attaching a hoisting attachment 75 to each portion-for-attachment 71, it is possible to lift up (hoist up) a connected structure in which the electric motor 91 is connected to the support portion 65 via the first bracket 61 and the hydraulic pump 92 is connected to the support portion 65 via the second bracket 62. In the present example embodiment, the hoisting attachment 75 is an eyebolt, and is detachably attached to the portion-for-attachment 71. Note that the holes in the portions-for-attachment 71 to each of which the hoisting attachment 75 is fastened are the same, and therefore the same hoisting attachment 75 can be used.

A pair of the portions-for-attachment 71 are provided on the electric motor 91. The pair of portions-for-attachment 71 are provided at an upper portion at one of opposite ends in the axial direction of the drive shaft 91a (left end) of the casing 91*b* of the electric motor 91 and at an upper portion at the other of the opposite ends (left end) of the casing 91*b* of the electric motor 91.

The support portion 65 includes the portion-for-attachment 71 (second portion-for-attachment 71B) to attach the hoisting attachment 75 (second hoisting attachment 75B). The second portion-for-attachment 71B is configured to connect the upper portion of the first upright plate 66 and the upper portion of the curved portion 68.

The second bracket 62 includes the portion-for-attachment 71 (first portion-for-attachment 71A) to attach the hoisting attachment 75 (first hoisting attachment 75A). The first portion-for-attachment 71A is provided at the upper portion of the second bracket 62.

Note that the description of example embodiments above discusses example cases in which the portions-for-attachment 71 are provided on the electric motor 91, the support portion 65 and the second bracket 62. However, it is only necessary that at least two of the electric motor 91, the first bracket 61, the support portion 65, the second bracket 62 and the hydraulic pump 92 be provided with the portions-for-attachment 71 to attach the hoisting attachment 75, and the portions-for-attachment 71 may be provided on the first bracket 61 and/or the hydraulic pump 92.

The following details the manner in which the electric motor 91, the hydraulic pump 92, the connector 60, the first bracket 61, the second bracket 62 and the support portion 65 are assembled. The following first discusses the manner in which the electric motor 91, the connector 60, the first bracket 61 and the support portion 65 are assembled. As shown in FIG. 18, the operator positions the first socket hole 61*a* and the first spigot fitting portion 91*b*2 relative to each other, and attaches the first spigot fitting portion 91*b*2 to the first socket hole 61*a*. The operator puts the fasteners V1 through the holes 61A1 in the first coupling portion 61A to attach the first bracket 61 to the electric motor 91.

The operator attaches the connector 60 to the drive shaft 91*a* of the electric motor 91 to which the first bracket 61 is attached. Specifically, the operator inserts the drive shaft 91*a* into the first insertion hole 60*a*1 in the first connector portion 60*a* of the connector 60, and causes the drive shaft 91*a* (which is a splined shaft) and the first insertion hole 60*a*1 (which is a splined bearing) to fit with each other in the direction of rotation of the drive shaft 91*a*. The operator screws the restrictors 60*d* (socket set screws) into the first attaching holes 60*a*2, and causes the distal portion of each restrictor 60*d* to abut the outer surface of the drive shaft 91*a*. With this, the operator can attach the connector 60 to the drive shaft 91*a* such that the connector 60 is rotatable together with the drive shaft 91*a* and is restricted from moving in the axial direction. Note that, in the following description, the step of attaching the first bracket 61 and the connector 60 to the electric motor 91 may be referred to a "first step" of the process to attach the electric motor 91 to the support portion 65. The structure that includes the electric motor 91, the first bracket 61 and the connector 60 assembled in the first step may be referred to as a "first assembly". In the following description, the step of attaching the connector 60 to one of the drive shaft 91*a* and the input shaft 92*a* such that the connector 60 is rotatable together with the one of the drive shaft 91*a* and the input shaft 92*a* and restricted from moving in the axial direction may be referred to as a "first step" of the process to attach the connector 60 to the electric motor 91 and the hydraulic pump 92.

The operator attaches the hoisting attachments 75 to the pair of portions-for-attachment 71 of the electric motor 91. The operator attaches the hook of a crane provided in a work site such as a factory or the like to each hoisting attachment 75, and lifts up (hoists up) the first assembly.

As shown in FIG. 21, the operator inserts the connector 60 in the first opening portion 66*a* and positions the first dowel pins 66*e* and the first fitting holes 61B2 relative to each other. In so doing, since the pair of first dowel pins 66*e* are positioned such that the straight line L1 connecting the axes of the first dowel pins 66*e* passes through the axis of the drive shaft 91*a*, by swinging the first assembly about the drive shaft 91*a*, the operator can easily position the first dowel pins 66*e* and the first fitting holes 61B2 relative to each other. After fitting the first dowel pins 66*e* into the first fitting holes 61B2, the operator inserts the fasteners V2 into the first connected portions 61B1, to attach the first bracket 61 to the support portion 65. Note that, in the following description, the step of attaching the first assembly to the support portion 65 may be referred to as a "second step" of the process to attach the electric motor 91 to the support portion 65.

The following discusses the manner in which the hydraulic pump 92, the connector 60, the second bracket 62 and the support portion 65 are assembled. As shown in FIG. 19, the operator positions the second socket hole 62*a* and the second spigot fitting portion 92*b*2 relative to each other, and attaches the second spigot fitting portion 92*b*2 to the second socket hole 62*a*. As shown in FIG. 19, the operator fastens the fasteners V3 to the holes 62A1 via the holes in the second collar portion 92*b*1, to attach the second bracket 62 to the hydraulic pump 92.

Note that, in the following description, the step of attaching the second bracket 62 to the hydraulic pump 92 may be referred to as a "first step" of the process to attach the hydraulic pump 92 to the support portion 65. The structure that includes the hydraulic pump 92 and the second bracket 62 assembled in the first step may be referred to as a "second assembly".

The operator, while positioning the second dowel pins 67*c* and the second fitting holes 62B2 relative to each other, inserts the input shaft 92*a* into the second insertion hole 60*b*1 of the second connector portion 60*b*, and causes the input shaft 92*a* (which is a splined shaft) and the second insertion hole 60*b*1 (which is a splined bearing) to fit with each other in the direction of rotation of the input shaft 92*a*. With this, the operator can attach the input shaft 92*a* to the connector 60 such that the connector 60 is rotatable together with the input shaft 92*a* and is not restricted from moving in the axial direction. In so doing, since the pair of second dowel pins 67*c* are positioned such that the straight line L2 connecting the axes of the second dowel pins 67*c* is displaced from the axis of the input shaft 92*a*, in the case where the operator performs work from one of opposite sides in the width direction (from left side), the operator can easily position the input shaft 92*a* and the second connector portion 60*b* relative to each other, and position the second dowel pins 67*c* and the second fitting holes 62B2 relative to each other, without being prevented by the second dowel pins 67*c* from checking the positions of the input shaft 92*a* and the second connector portion 60*b*.

Note that, in the following description, the step of attaching the other of the drive shaft 91*a* and the input shaft 92*a* to the connector 60 such that the other of the drive shaft 91*a* and the input shaft 92*a* is rotatable together with the connector 60 and is not restricted from moving in the axial direction relative to the connector 60 may be referred to as a "second step" of the process to attach the connector 60 to the electric motor 91 and the hydraulic pump 92. Under the conditions in which the connector 60 is attached to the electric motor 91 or the hydraulic pump 92 that has one of the shafts (the electric motor 91 in the present example embodiment) and attached to the support portion 65, by moving the electric motor 91 or the hydraulic pump 92 that has the other of the shafts (the hydraulic pump 92 in the present example embodiment) in the axial direction, it is possible to detach the hydraulic pump 92 from the connector 60.

When the operator attaches the second assembly to the support portion 65, the operator may attach the first hoisting attachment 75A to the first portion-for-attachment 71A. The operator can attach the hook of a crane to the first hoisting attachment 75A and lift up (hoist up) the second assembly.

As shown in FIG. 22, the operator inserts the fasteners V4 into the second connected portions 62B1 to attach the second bracket 62 to the support portion 65. Note that, in the following description, the step of attaching the second assembly to the support portion 65 may be referred to as a "second step" of the process to attach the hydraulic pump 92 to the support portion 65. The structure including the electric motor 91, the hydraulic pump 92, the connector 60, the first bracket 61, the second bracket 62 and the support portion 65 may be referred to as a "third assembly".

Figure 25:
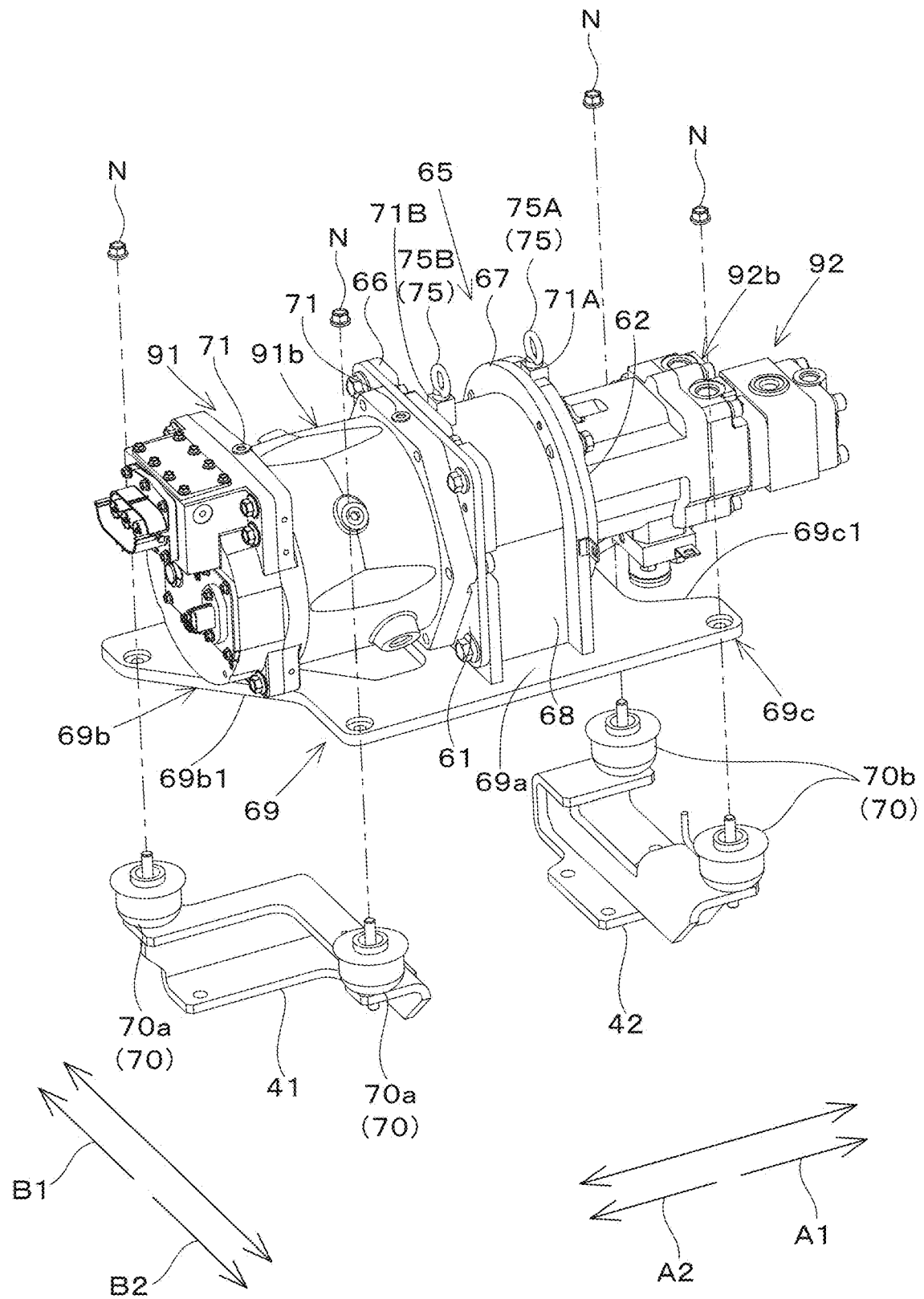
FIG. 25 is a right rear perspective view showing the manner in which a third assembly is attached.

Then, the operator attaches the first hoisting attachment 75A to the first portion-for-attachment 71A, and attaches the second hoisting attachment 75B to the second portion-for-attachment 71B. The operator can attach the hook of a crane to the first hoisting attachment 75A and to the second hoisting attachment 75B, and lift up (hoist up) the third assembly. FIG. 25 is a right rear perspective view showing the manner in which the third assembly is attached. The operator moves the third assembly toward the fixed brackets 41 and 42 on the swivel base 2 using the crane and, as shown in FIG. 25, positions the plurality of mounting devices 70 and the support portion 65 relative to each other. The operator fastens the pair of rear portion mounting devices 70a and the first extension portion 69b and fastens the pair of front portion mounting devices 70b and the second extension portion 69c, using nuts N.

The description of example embodiments above discusses example cases in which a the support portion 65 includes the dowel pins (first dowel pins) 66e and the dowel pins (second dowel pins) 67c, and the first bracket 61 and the second bracket 62 are positioned relative to the support portion 65. However, the configuration in which, instead of the dowel pins 66e and 67c, some other members are used to position the first bracket 61 and the second bracket 62 relative to the support portion 65 may be used.

Figure 26:
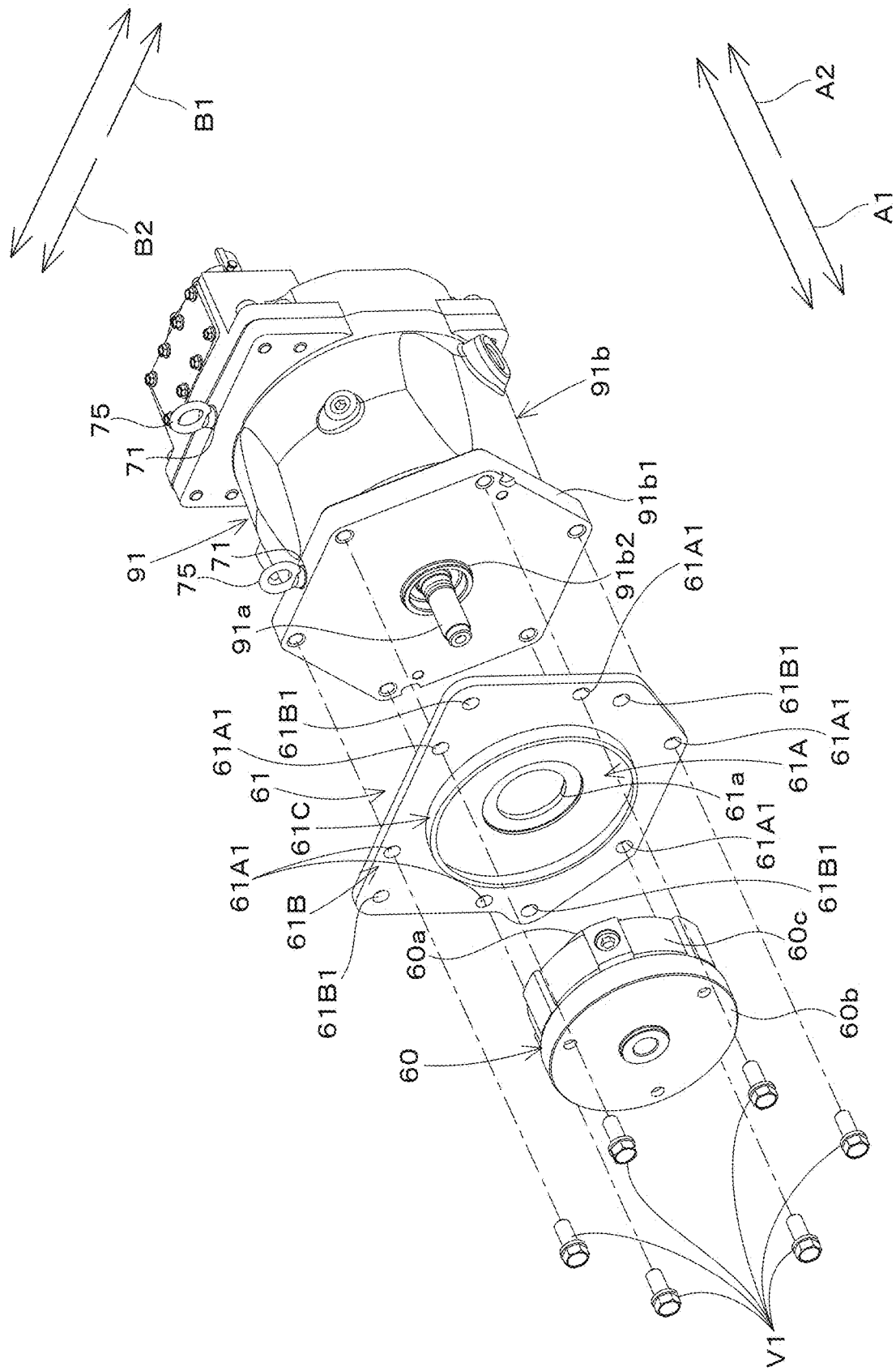
FIG. 26 is an exploded perspective view of an electric motor, a connector, and a first bracket of a variation of an example embodiment of the present invention as seen from the left front.
Figure 27:
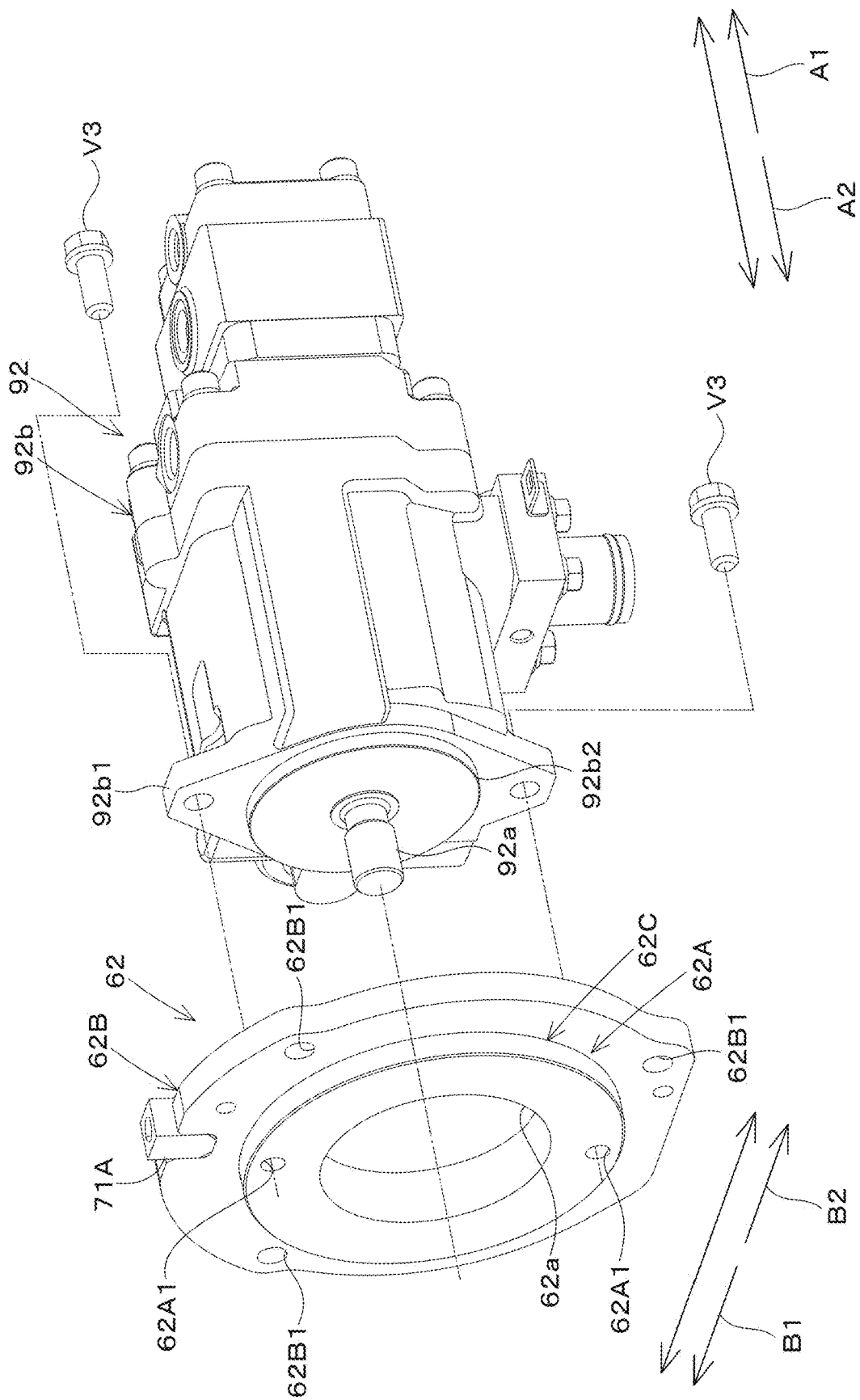
FIG. 27 is an exploded perspective view of a hydraulic pump and a second bracket of a variation of an example embodiment of the present invention as seen from the right rear.
Figure 28:
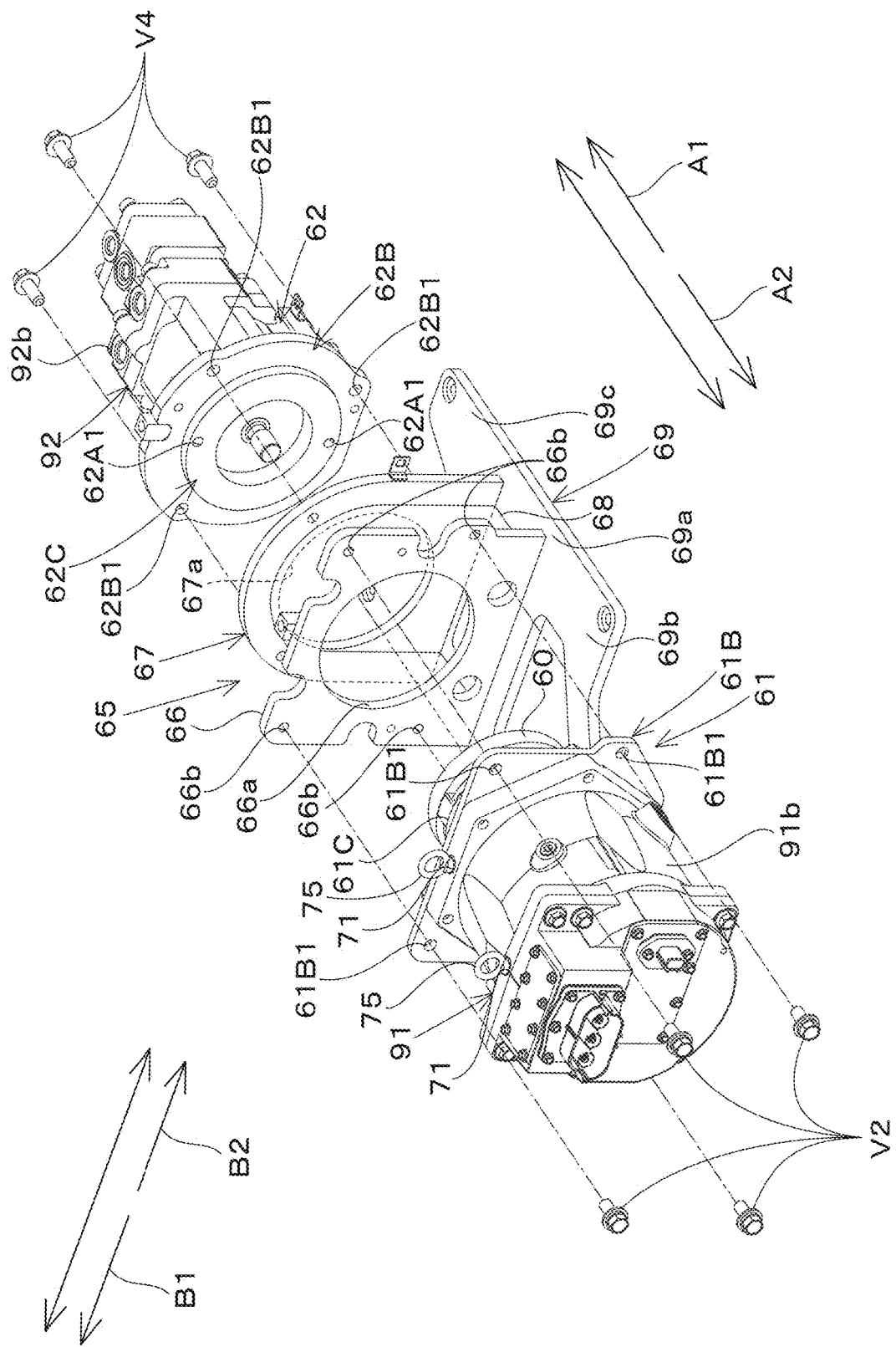
FIG. 28 is a right rear perspective view showing the manner in which a first assembly and a second assembly are attached to a support portion according to a variation of an example embodiment of the present invention.

FIG. 26 is an exploded perspective view of the electric motor 91, the connector 60 and the first bracket 61 according to a variation of an example embodiment of the present invention as seen from the left front. FIG. 27 is an exploded perspective view of the hydraulic pump 92 and the second bracket 62 according to the variation as seen from the right rear. FIG. 28 is a right rear perspective view showing the manner in which the first assembly and the second assembly are attached to the support portion 65 according to the variation.

As shown in FIG. 26, the first bracket 61 according to the variation includes a third spigot fitting portion (spigot fitting portion) 61C. The third spigot fitting portion 61C projects from the first coupling portion 61A toward the distal end of the drive shaft 91a, i.e., projects away from the electric motor 91 (projects forward). The third spigot fitting portion 61C is a rib in the form of a circular ring, and the outer diameter of the third spigot fitting portion 61C is substantially the same as the inner diameter of the first opening portion 66a. As shown in FIG. 28, the third spigot fitting portion 61C is attached to the first opening portion 66a. The inner diameter of the third spigot fitting portion 61C is greater than the outer diameter of the connector 60. Thus, the third spigot fitting portion 61C may house a portion of the connector 60 therein. In such a case, since it is possible to cover the space between the connector 60 and the drive shaft 91a with the third spigot fitting portion 61C, it is possible to improve the dust resistance of the space between the connector 60 and the drive shaft 91a.

With regard to the first bracket 61 of the variation, unlike the first bracket 61 shown in FIG. 18, etc., the lower one of the first connected portions 61B1 provided on the first extension portion 61B is located closer to the hole 61A1 at the center in the up-down direction than to the lower hole 61A1.

Furthermore, with regard to the first bracket 61 of the variation, unlike the first bracket 61 shown in FIG. 18, etc., one of the first connected portions 61B1 provided on the first extension portion 61B is displaced outward along the width direction from a corresponding hole 61A1. In the example shown in FIGS. 26 and 28, one of the lower first connected portions 61B1 that is located at one of opposite sides in the width direction (right side) is displaced outward along the width direction (rightward) from the corresponding hole 61A1.

Thus, since the first connected portions 61B1 are located outward of the electric motor 91 and the like in the width direction, the operator can easily achieve the access using a tool when attaching the fasteners V2 to the first connected portions 61B1.

As shown in FIG. 27, the second bracket 62 of the variation includes a fourth spigot fitting portion (spigot fitting portion) 62C. The fourth spigot fitting portion 62C projects from the second coupling portion 62A toward the distal end of the input shaft 92a, i.e., projects away from the hydraulic pump 92 (projects rearward). The fourth spigot fitting portion 62C is in the shape of a cylinder. The outer diameter of the fourth spigot fitting portion 62C is substantially the same as the inner diameter of the second opening portion 67a and, as shown in FIG. 28, the fourth spigot fitting portion 62C is attached to the second opening portion 67a.

A swivel working machine 1 as has been described includes a swivel base 2, a battery 90, an electric motor 91 to rotate a drive shaft 91a using electricity outputted from the battery 90, a hydraulic pump 92 including an input shaft 92a to receive input of power from the drive shaft 91a and to be driven by power inputted into the input shaft 92a from the drive shaft 91a to deliver hydraulic fluid, a connector 60 to connect the drive shaft 91a and the input shaft 92a, a support portion 65 to support the electric motor 91 and the hydraulic pump 92 on or above the swivel base 2, and a bracket (first bracket) 61 provided independently of the electric motor 91 to connect the electric motor 91 and the support portion 65, wherein a structure (first assembly) in which the connector 60 and the first bracket 61 are attached to the support portion 65 is attached to the support portion 65 via the first bracket 61.

With the above configuration, it is possible to easily attach the electric motor 91 to the support portion 65 irrespective of the shape of the electric motor 91 and the shape of the support portion 65. It is also possible to easily perform positioning with respect to the drive shaft 91a by attaching the connector 60 to the electric motor 91 in advance. Thus, it is possible to properly transmit the power outputted from the drive shaft 91*a* to the input shaft 92*a* without loss. This makes it possible to extend the driving time of the electric motor 91 by reducing loss.

The electric motor 91 includes a spigot fitting portion (first spigot fitting portion) 91*b*2 around the drive shaft 91*a*, and the first bracket 61 includes a socket hole (first socket hole) 61*a* to have the spigot fitting portion 91*b*2 attached thereto.

With the above configuration, it is possible to prevent or reduce the likelihood that the drive shaft 91*a* will be displaced from the first bracket 61, and possible to accurately connect the drive shaft 91*a*, the connector 60 and the input shaft 92*a*. With this, it is possible to properly transmit the power outputted from the drive shaft 91*a* to the input shaft 92*a* without loss.

The outer diameter of the connector 60 is greater than the inner diameter of the first socket hole 61*a*.

With the above configuration, it is possible to use a relatively large connector 60 regardless of the inner diameter of the first socket hole 61*a*, and it is possible to properly transmit the power to output from the drive shaft 91*a* to the input shaft 92*a* without loss. Furthermore, since the first bracket 61 and the connector 60 are attached in advance to the electric motor 91 and then such first bracket 61, connector 60 and electric motor 91 are attached to the support portion 65, it is possible to easily perform positioning with respect to the drive shaft 91*a* as compared to cases where the electric motor 91 is attached to the support portion 65 and then the connector 60 is attached.

The support portion 65 includes a housing to, under the conditions in which the electric motor 91 is attached to the support portion 65 via the first bracket 61, surround the connector 60 at a position radially outward of the connector 60.

With the above configuration, the support portion 65 is able to support the electric motor 91 and cover the connector 60. Thus, it is possible to eliminate or reduce the likelihood that the connector 60 rotated by the drive shaft 91*a* will contact external objects. Furthermore, since the first bracket 61 and the connector 60 are attached in advance to the electric motor 91 and then such first bracket 61, connector 60 and electric motor 91 are attached to the support portion 65, it is possible to easily perform positioning with respect to the drive shaft 91*a* as compared to cases where the electric motor 91 is attached to the support portion 65 and then the connector 60 is attached.

The first bracket 61 includes an extension portion (first extension portion) 61B extending outward in a radial direction of the drive shaft 91*a* relative to the electric motor 91, and the first extension portion 61B includes a connected portion (first connected portion) 61B1 connected to the support portion 65.

With the above configuration, it is possible to ensure an area where the first bracket 61 and the support portion 65 are connected irrespective of the shape of the electric motor 91 and the shape of the support portion 65. With this, it is possible to easily attach the electric motor 91 to the support portion 65.

The first connected portion 61B1 includes a hole to have a fastener V2 inserted therethrough, and the first bracket 61 and the support portion 65 are connected by the fastener V2.

With the above configuration, it is possible to easily and reliably attach the first bracket 61 to the support portion 65. Since the first extension portion 61B extends outward in the radial direction of the drive shaft 91*a* relative to the electric motor 91, it is possible to ensure a sufficient area in which a tool is operated to attach the fastener V2.

The support portion 65 includes a dowel pin (first dowel pin) 66*e* directed in the axial direction of the drive shaft 91*a*, and the first bracket 61 includes a hole (first fitting hole) 61*a* to have the first dowel pin 66*e* fitted therein.

With the above configuration, it is possible to eliminate or reduce the likelihood that the drive shaft 91*a* will be displaced from the support portion 65, and it is possible to accurately connect the drive shaft 91*a*, the connector 60 and the input shaft 92*a*. With this, it is possible to properly transmit the power outputted from the drive shaft 91*a* to the input shaft 92*a* without loss.

The first bracket 61 includes a portion-for-attachment 71 to attach a hoisting attachment 75 thereto.

With the above configuration, when attaching the first bracket 61 and the connector 60 attached to the electric motor 91 to the support portion 65, it is possible to lift them up using the hoisting attachment 75. Thus, it is possible to easily attach the first bracket 61, the connector 60, and the electric motor 91 to the support portion 65.

A structure (second assembly), in which the connector 60 and the first bracket 61 are attached to the electric motor 91 and the hydraulic pump 92 is attached to another bracket (second bracket) other than the first bracket 61, is attached to the support portion 65 via the second bracket 62.

With the above configuration, it is possible to easily attach the hydraulic pump 92 to the support portion 65 irrespective of the shape of the hydraulic pump 92 and the shape of the support portion 65.

A method of assembling a swivel working machine 1 is a method of assembling a swivel working machine 1 including an electric motor 91 to rotate a drive shaft 91*a*, a hydraulic pump 92 including an input shaft 92*a* to receive input of power from the drive shaft 91*a* and drivable by power inputted into the input shaft 92*a* from the drive shaft 91*a*, a connector 60 to connect the drive shaft 91*a* and the input shaft 92*a*, a support portion 65 to support the electric motor 91 and the hydraulic pump 92, and a first bracket 61 provided independently of the electric motor 91 to connect the electric motor 91 and the support portion 65, the method including a first step including attaching the first bracket 61 and the connector 60 to the electric motor 91, and a second step including attaching the first bracket 61, the connector 60, and the electric motor 91 assembled in the first step to the support portion 65.

With the above configuration, it is possible to easily attach the electric motor 91 to the support portion 65 irrespective of the shape of the electric motor 91 and the shape of the support portion 65. Since the connector 60 is attached in advance to the electric motor 91, it is possible to easily perform positioning with respect to the drive shaft 91*a*.

A swivel working machine 1 as has been described includes a swivel base 2, a battery 90, an electric motor 91 to rotate a drive shaft 91*a* to rotate using electricity outputted from the battery 90, a hydraulic pump 92 including an input shaft 92*a* to receive input of power from the drive shaft 91*a* and drivable by power inputted into the input shaft 92*a* from the drive shaft 91*a* to deliver hydraulic fluid, a support portion 65 to support the electric motor 91 and the hydraulic pump 92 on or above the swivel base 2, and a bracket (second bracket) 62 provided independently of the hydraulic pump 92 to connect the hydraulic pump 92 and the support portion 65, wherein a structure (second assembly) in which the second bracket 62 is attached to the hydraulic pump 92 is attached to the support portion 65 via the second bracket 62.

With the above configuration, it is possible to easily attach the hydraulic pump 92 to the support portion 65 irrespective of the shape of the hydraulic pump 92 and the shape of the support portion 65.

The second bracket 62 includes an extension portion (second extension portion) 62B extending outward in a radial direction of the input shaft 92*a* relative to the hydraulic pump 92, and the second extension portion 62B includes a connected portion (second connected portion) 62B1 connected to the support portion 65.

With the above configuration, it is possible to ensure an area in which the second bracket 62 and the support portion 65 are connected, irrespective of the shape of the hydraulic pump 92 and the shape of the support portion 65. With this, it is possible to easily attach the hydraulic pump 92 to the support portion 65.

The second connected portion 62B1 includes a hole to have a fastener V4 inserted therethrough, and the second bracket 62 and the support portion 65 are connected by the fastener V4.

With the above configuration, it is possible to easily and reliably attach the second bracket 62 to the support portion 65. Since the second extension portion 62B extends outward in the radial direction of the drive shaft 91*a* relative to the hydraulic pump 92, it is possible to ensure a sufficient area in which a too; to attach the fastener V4 is operated.

The support portion 65 includes a dowel pin (second dowel pin) 67*c* directed in the axial direction of the input shaft 92*a*, and the second bracket 62 includes a hole (second fitting hole) 62B2 to have the second dowel pin 67*c* fitted therein.

With the above configuration, it is possible to eliminate or reduce the likelihood that the input shaft 92*a* will be displaced relative to the support portion 65, and it is possible to accurately connect the drive shaft 91*a*, the connector 60 and the input shaft 92*a*. With this, it is possible to properly transmit the power outputted from the drive shaft 91*a* to the input shaft 92*a* without loss.

The second bracket 62 includes a first portion-for-attachment 71A to attach a first hoisting attachment 75A thereto.

With the above configuration, when attaching, to the support portion 65, the second bracket 62 attached to the hydraulic pump 92, it is possible to lift them up using the first hoisting attachment 75A. Thus, it is possible to easily attach the second bracket 62 and the hydraulic pump 92 to the support portion 65. By lifting up the first hoisting attachment 75A, it is possible to easily carry the electric motor 91 and the hydraulic pump 92 attached on the support portion 65.

The support portion 65 includes a second portion-for-attachment 71B to attach a second hoisting attachment 75B thereto.

With the above configuration, by lifting up the second hoisting attachment 75B in addition to the first hoisting attachment 75A, it is possible to easily carry the electric motor 91 and the hydraulic pump 92 attached on the support portion 65.

The hydraulic pump 92 includes a spigot fitting portion (second spigot fitting portion) 92*b*2 around the input shaft 92*a*, and the second bracket 62 includes a socket hole (second socket hole) 62*a* to attach the spigot fitting portion 91*b*2 thereto.

With the above configuration, it is possible to eliminate or reduce the likelihood that the drive shaft 91*a* will be displaced relative to the second bracket 62, and it is possible to accurately connect the drive shaft 91*a*, the connector 60 and the input shaft 92*a*. With this, it is possible to properly transmit the power outputted from the drive shaft 91*a* to the input shaft 92*a* without loss.

The swivel working machine 1 includes a connector 60 to connect the drive shaft 91*a* and the input shaft 92*a*, the hydraulic pump 92 is attached to the support portion 65 via the second bracket 62, and the support portion 65 is a housing to, under the conditions in which the connector 60 is attached to the input shaft 92*a*, surround the connector 60 at a position radially outward of the connector 60.

With the above configuration, the support portion 65 is able to support the hydraulic pump 92 and cover the connector 60. Thus, it is possible to eliminate or reduce the likelihood that the connector 60 rotated by the drive shaft 91*a* will contact external objects.

A method of assembling a swivel working machine 1 is a method of assembling a swivel working machine 1 including an electric motor 91 to rotate a drive shaft 91*a*, a hydraulic pump 92 including an input shaft 92*a* to receive input of power from the drive shaft 91*a* and drivable by power inputted into the input shaft 92*a* from the drive shaft 91*a* to deliver hydraulic fluid, a support portion 65 to support the electric motor 91 and the hydraulic pump 92, and a second bracket 62 provided independently of the hydraulic pump 92 to connect the hydraulic pump 92 and the support portion 65, the method including a first step including attaching the second bracket 62 to the hydraulic pump 92, and a second step including attaching the second bracket 62 and the hydraulic pump 92 assembled in the first step to the support portion 65.

With the above configuration, it is possible to easily attach the hydraulic pump 92 to the support portion 65 irrespective of the hydraulic pump 92 and the shape of the support portion 65.

A swivel working machine 1 as has been described includes a swivel base 2, a battery 90, a support body 50 to support the battery 90 on or above the swivel base 2, an electric motor 91 to be driven by electricity outputted from the battery 90, a hydraulic pump 92 to be driven by the electric motor 91 to deliver hydraulic fluid, and a support portion 65 to support the electric motor 91 and the hydraulic pump 92 on or above the swivel base 2, wherein the support portion 65 is separate from the support body 50 and is attached to the swivel base 2 via a plurality of mounting devices 70.

With the above configuration, since the support portion 65 supports the electric motor 91 and the hydraulic pump 92 independently of the battery 90, it is possible to eliminate or reduce the likelihood that the vibrations generated by driving of the electric motor 91 and the pulsations of the hydraulic pump 92 will be directly transmitted to the battery 90. Furthermore, since the assembly of the battery 90 and the assembly of the electric motor 91 and the hydraulic pump 92 are structured separately from each other, it is possible to achieve easy mounting on the swivel base 2. It is also possible to eliminate or reduce the likelihood that the vibrations generated by driving of the electric motor 91 and the pulsations of the hydraulic pump 92 will be transmitted to the battery 90 via the support portion 65 and the swivel base 2. With this, it is possible to eliminate or reduce the likelihood that the battery 90 will resonate due to the vibrations and pulsations, the vibrations and the like will be amplified, and noise will be generated.

The support body 50 is fixed to the swivel base 2.

With the above configuration, since the battery 90 placed on the support body 50 is fixed to the swivel base 2, if vibrations are transmitted from the swivel base 2, the battery 90 does not vibrate independently of the swivel base 2 but vibrates together with the swivel base 2. Thus, it is possible to eliminate or reduce the likelihood that the battery 90 will resonate due to the vibrations and pulsations, the vibrations and the like will be amplified, and noise will be generated.

The swivel working machine 1 further includes a stabilizer portion (lower upright portion) 57 provided upright at an upper portion of the support body 50 and attached to at least one of opposite sides of the battery 90.

With the above configuration, it is possible to fix the battery 90 more firmly to the support body 50. Thus, since it is possible to firmly fix the battery 90 to the swivel base 2, if vibrations are transmitted from the swivel base 2, the battery 90 does not vibrate independently of the swivel base 2, making it possible to eliminate or reduce the likelihood that the battery 90 will resonate due to the vibrations and pulsation, the vibrations and the like will be amplified, and noise will be generated.

The support portion 65 supports the electric motor 91 and the hydraulic pump 92 which are arranged in a front-rear direction, and under the conditions in which the electric motor 91 and the hydraulic pump 92 are attached to the support portion 65, the plurality of mounting devices 70 are each located outward of the electric motor 91, the hydraulic pump 92 and the support portion 65 in plan view.

With the above configuration, in the case where the swivel base 2 rotates, the plurality of mounting devices 70 are able to prevent or reduce vibrations in the width direction, and more suitably support the electric motor 91, the hydraulic pump 92 and the support portion 65. Furthermore, when attaching the plurality of mounting devices 70 to the support portion 65, it is possible to more easily achieve assess using a tool.

The battery 90 is located at a widthwise central portion of a rear portion of the swivel base 2, and the electric motor 91 and the hydraulic pump 92 are provided at one side of the battery 90 via the support portion 65.

With the above configuration, it is possible to place, with priority, the electric motor 91 and the hydraulic pump 92 supported by the mounting devices 70 at the portion of the swivel base 2 that undergoes relatively large vibrations. Thus, it is possible to improve the durability of the devices provided on the swivel base 2, as well as reducing the number of mounting devices 70 and the size of the mounting devices 70, making it possible to reduce cost.

The swivel working machine 1 further includes a first bracket 61 provided independently of the electric motor 91 to connect the electric motor 91 and the support portion 65, and a second bracket 62 provided independently of the hydraulic pump 92 to connect the hydraulic pump 92 and the support portion 65. At least two of the electric motor 91, the first bracket 61, the support portion 65, the second bracket 62 and the hydraulic pump 92 are provided with a portion-for-attachment 71 to attach a hoisting attachments 75 thereto, the portion-for-attachment 71 being configured such that attaching the hoisting attachment 75 to the portion-for-attachment 71 allows a connected structure to be hoisted, the connector being a structure in which the electric motor 91 is connected to the support portion 65 via the first bracket 61 and the hydraulic pump 92 is connected to the support portion 65 via the second bracket 62.

With the above configuration, by lifting them up using the hoisting attachment 75, it is possible to easily carry the assembly of the electric motor 91, the first bracket 61, the support portion 65, the second bracket 62 and the hydraulic pump 92 toward the plurality of mounting devices 70. This makes it possible to easily attach the assembly on the plurality of mounting devices 70.

An electric working machine 1 as has been described includes a machine body (swivel base) 2, a support body 50 provided on the swivel base 2, a battery 90 placed on the support body 50, and an electric motor 91 to be driven by electricity outputted from the battery 90, wherein the support body 50 includes a plurality of elongated plates 52 for placement of an outer peripheral portion of a bottom of the battery 90, and surfaces for placement of the battery 90 of the elongated plates 52 are smoothened or substantially smoothened by machining.

With the above configuration, it is possible to support the battery 90 with a simple configuration including the combination of elongated plates 52, making it possible to reduce the area subjected to machining and stably support the battery 90.

The portion of the support body 50 that is other than the surfaces for placement of the plates 52 is not subjected to machining.

With the above configuration, it is possible to reduce an increase in processing cost resulting from machining on a wide area.

The support body 50 includes a frame 51 to connect the plurality of plates 52, and the frame 51 is fixed by welding to lower surfaces and/or side surfaces of the plates 52.

With the above configuration, even though the surfaces for placement are subjected to machining, it is possible to reliably support the plurality of plates 52 without having to remove welded portions.

The plurality of plates 52 are spaced away from each other and fixed to the frame 51.

With the above configuration, it is possible to obtain areas for welding between the plates 52 to be welded to the frame 51.

The plates 52 subjected to machining after fixed to the frame 51 by welding, for example.

With the above configuration, even in the case where welding distortion occurs on the plates 52 due to the welding, it is possible to reliably support the battery 90.

The plurality of plates 52 include a first plate portion 52a for placement of a front edge portion of the battery 90, a second plate portion 52b for placement of a rear edge portion of the battery 90, a third plate portion 52c for placement of one of opposite sides in the width direction of the battery 90, and a fourth plate portion 52d for placement of the other of the opposite sides in the width direction of the battery 90.

With the above configuration, it is possible to reliably and easily support the battery 90 with the plates 52 having been subjected to machining.

The support body 50 includes a long first connector plate 53 to connect a widthwise central portion of the first plate portion 52a and a widthwise central portion of the second plate portion 52b.

With the above configuration, it is possible to improve the strength of the connection between the first plate portion 52a and the second plate portion 52b with a simple configuration.

The support body 50 includes a second connector plate 54 passing through a center of an opening 51E at a central portion of the frame 51 and extending from one of opposite ends in the width direction of the frame 51 to the other of the opposite ends of the frame 51, and the first connector plate 53 and the second connector plate 54 are perpendicular to each other.

With the above configuration, it is possible to improve the strength of the frame 51 with a simple configuration.

The battery 90 includes a plurality of batteries 90a, the plurality of batteries 90a are arranged adjacent to each other in the width direction, the first plate portion 52a has placed thereon front edge portions of the plurality of batteries 90a, the second plate portion 52b has placed thereon rear edge portions of the plurality of batteries 90a, the third plate portion 52c has placed thereon a first edge portion of one of the batteries 90a that is located at one of opposite ends in the width direction, and the fourth plate portion 52d has placed thereon a second edge portion of another of the batteries 90a that is located at the other of the opposite ends in the width direction.

With the above configuration, it is possible to support the batteries 90a with a simple configuration including the combination of elongated plates 52, making it possible to reduce the area subjected to machining and stably support the batteries 90a.

The battery 90 includes a plurality of batteries 90a, the first connector plate 53 has placed thereon two adjacent ones of the batteries 90a, and has a vent hole 53a between the two adjacent ones of the batteries 90a.

With the above configuration, it is possible to dissipate heat through the space between the batteries 90a while reliably supporting the two batteries 90a. Thus, it is possible to both support and cool the batteries 90a.

The support body 50 includes a retainer 55 provided on the first plate portion 52a or the second plate portion 52b to fix the battery 90. The retainer 55 is attached such that the retainer 55 is adjustable in the front-rear direction.

With the above configuration, it is possible to reliably fix the battery 90 regardless of the size variations of the batteries 90.

The electric working machine 1 includes a hydraulic device M provided on the swivel base 2 and a hydraulic pump 92 to be driven by the electric motor 91 to deliver hydraulic fluid to actuate the hydraulic device M.

With the above configuration, also with the electric working machine 1 that includes a working device 20 driven by hydraulic fluid, it is possible to achieve the specific effect(s) described above.

An electric working machine 1 includes an machine body (swivel base) 2, a battery 90, an electric motor 91 to rotate a drive shaft 91a using electricity outputted from the battery 90, a hydraulic pump 92 including an input shaft 92a to receive input of power from the drive shaft 91a and drivable by power inputted into the input shaft 92a from the drive shaft 91a to deliver hydraulic fluid, a connector 60 to connect the drive shaft 91a and the input shaft 92a, and a support portion 65 to support the electric motor 91 and the hydraulic pump 92 on or above the swivel base 2, wherein the connector 60 is rotatable together with one of the drive shaft 91a and the input shaft 92a and restricted from moving an axial direction, and is rotatable together with the other of the drive shaft 91a and the input shaft 92a and not restricted from moving in the axial direction.

With the above configuration, the electric motor 91 and the hydraulic pump 92 are supported by the support portion 65, and the connector 60 restricts the one of the shafts from moving in the axial direction. Thus, even though the step of restricting the movement in the axial direction of the other of the shafts using the connector 60 is omitted, it is possible to maintain the relative positions in the axial direction of the connector 60 and the other of the shafts. Furthermore, it is possible to detach the other of the shafts from the connector 60 without performing the step of eliminating the restriction on the connector 60 and the other of the shafts in the axial direction. Furthermore, since the movement of the one of the shafts relative to the connector 60 in the axial direction is restricted, it is possible to prevent the elative positions of the connector 60 and the one of the shafts from changing when detaching the other of the shafts from the connector 60. Thus, it is possible to improve the work performance when attaching the electric motor 91, the connector 60 and the hydraulic pump 92.

The connector 60 includes a first connector portion 60a to have attached thereto one of the shafts, a second connector portion 60b to have attached thereto the other of the shafts, and an elastic body 60c to connect the first connector portion 60a and the second connector portion 60b.

With the above configuration, even in the case of a relatively large connector 60 including the elastic body 60c, it is possible to more easily attach the drive shaft 91a and the input shaft 92a.

The elastic body 60c includes a first connecting structure 60c1 fixed to the first connector portion 60a, a second connecting structure 60c2 fixed to the second connector portion 60b, and an elastic portion 60c3 fixed to the first connecting structure 60c1 and the second connecting structure 60c2.

With the above configuration, it is possible to prevent or reduce the wearing of the contact surfaces of the first connecting structure 60c1 and the elastic portion 60c3, and the contact surfaces of the second connecting structure 60c2 and the elastic portion 60c3. Thus, it is possible to increase the lifetime of the connector 60.

The elastic portion 60c3 is fixed by being bonded to the first connecting structure 60c1 and the second connecting structure 60c2.

With the above configuration, it is possible to prevent or reduce more reliably the wearing of the contact surfaces of the first connecting structure 60c1 and the elastic portion 60c3, and the contact surfaces of the second connecting structure 60c2 and the elastic portion 60c3.

The drive shaft 91a and the input shaft 92a are splined shafts, and the first connector portion 60a and the second connector portion 60b include splined bearings to fit with the spline shafts.

With the above configuration, it is possible to easily and reliably eliminate or reduce the likelihood that the relative positions of the axes of both the drive shaft 91a and the input shaft 92a and the connector 60 will move in the direction of rotation.

The first connector portion 60a is configured to have attached thereto a restrictor 60d to restrict movement of the one of the shafts in the axial direction.

With the above configuration, it is possible to prevent or reduce easily and reliably the movement of the one of the drive shaft 91a and the input shaft 92a and the connector 60 in the axial direction.

The support portion 65 includes a housing to, under the conditions in which the electric motor 91 is attached to the support portion 65, surround the connector 60 at a position radially outward of the connector 60.

The swivel working machine 1 includes a housing 65 to, under the conditions in which the electric motor 91 and the hydraulic pump 92 are attached to the support portion 65, surround the connector 60 at a position radially outward of the connector 60, and under the conditions in which the connector 60 is attached to the electric motor 91 or the hydraulic pump 92 that has the one of the shafts and attached to the support portion 65, the electric motor 91 or the hydraulic pump 92 that has the other of the shafts is detachable from the connector 60 by moving it in the axial direction of the other of the shafts.

With the above configuration, it is possible, using the housing 65, to eliminate to reduce the likelihood that the connector 60 rotated by the rotating shaft will come into contact with the surrounding devices. Since it is possible to omit the step of restricting the movement in the axial direction of the other of the shafts or the step of removing the restriction, it is possible to eliminate or reduce the likelihood that the hydraulic pump 92 will not be easily detachable and attachable due to a support portion 65 which is a housing.

A method of assembling an electric working machine 1 is a method of assembling an electric working machine 1 including an electric motor 91 to rotate a drive shaft 91a, a hydraulic pump 92 including an input shaft 92a to receive input of power from the drive shaft 91a and drivable by power inputted into the input shaft 92a from the drive shaft 91a to deliver hydraulic fluid, a connector 60 to connect the drive shaft 91a and the input shaft 92a, and a support portion 65 to support the electric motor 91 and the hydraulic pump 92, the method including a first step including attaching the connector 60 to one of the drive shaft 91a and the input shaft 92a such that the connector 60 is rotatable together with the one of the drive shaft 91a and the input shaft 92a and restricted from moving in the axial direction, and a second step including attaching to the connector 60 the other of the drive shaft 91a and the input shaft 92a such that the other of the drive shaft 91a and the input shaft 92a is rotatable together with the connector 60 and not restricted in moving in the axis shaft direction.

With the above configuration, the electric motor 91 and the hydraulic pump 92 are supported by the support portion 65, and the connector 60 restricts the one of the shafts from moving in the axial direction. Thus, even though the step of restricting the movement in the axial direction of the other of the shafts by the connector 60 is omitted, it is possible to maintain the relative positions in the axial direction of the connector 60 and the other of the shafts. Furthermore, it is possible to detach the other of the shafts from the connector 60 without performing the step of removing the restriction on the connector 60 and the other of the shafts in the axial direction. Moreover, since the movement of the one of the shafts relative to the connector 60 in the axial direction is restricted, it is possible to prevent the relative positions of the connector 60 and the one of the shafts from changing when detaching the other of the shafts from the connector 60. Accordingly, it is possible to improve the work performance when attaching the electric motor 91, the connector 60 and the hydraulic pump 92.

While example embodiments of the present invention have been described above, it is to be understood that variations and modifications will be apparent to those skilled in the art without departing from the scope and spirit of the present invention. The scope of the present invention, therefore, is to be determined solely by the following claims. For example, the above description of example embodiments discusses example eases in which the present invention is applied to backhoes which are swivel working machines, but this does not imply any limitation. Example embodiments of the present invention are applicable to various working machines such as construction machines, civil engineering machines, and agricultural machines.

The above description of example embodiments discusses a configuration in which the travel motors ML and MR, the swivel motor MT and elements of the working device 20 are driven by hydraulic fluid, i.e. a configuration in which they are driven by the driving force of the electric motor 91 via hydraulic fluid. However, this does not imply any limitation. One or more of or all of those listed above may be driven directly by the electric motor (electric actuator) 91.

What is claimed is:

1. A swivel working machine comprising:
    a swivel base;
    a battery;
    a support body to support the battery on or above the swivel base;
    an electric motor to be driven by electricity outputted from the battery;
    a hydraulic pump to be driven by the electric motor to deliver hydraulic fluid; and
    a support portion to support the electric motor and the hydraulic pump on or above the swivel base; wherein
    the support portion is separate from the support body and is attached to the swivel base via a plurality of mounting devices.

2. The swivel working machine according to claim 1, wherein the support body is fixed to the swivel base.

3. The swivel working machine according to claim 2, further comprising a stabilizer portion provided upright at an upper portion of the support body and attached to at least one of opposite sides of the battery.

4. The swivel working machine according to claim 1, wherein
    the support portion supports the electric motor and the hydraulic pump arranged in a front-rear direction; and
    under conditions in which the electric motor and the hydraulic pump are attached to the support portion, the plurality of mounting devices are each located outward of the electric motor, the hydraulic pump, and the support portion in a width direction in plan view.

5. The swivel working machine according to claim 1, wherein
    the battery is located at a widthwise central portion of a rear portion of the swivel base; and
    the electric motor and the hydraulic pump are provided at one side of the battery via the support portion.

6. The swivel working machine according to claim 1, further comprising:
    a first bracket provided independently of the electric motor to connect the electric motor and the support portion; and
    a second bracket provided independently of the hydraulic pump to connect the hydraulic pump and the support portion; wherein
    at least two of the electric motor, the first bracket, the support portion, the second bracket, and the hydraulic pump are provided with a portion-for-attachment to attach a hoisting attachment thereto, the portion-for-attachment being configured such that attaching the hoisting attachment to the portion-for-attachment allows a connected structure to be hoisted, the connected structure being a structure in which the electric motor is connected to the support portion via the first bracket and the hydraulic pump is connected to the support portion via the second bracket.

7. The swivel working machine according to claim 1, wherein
    the electric motor includes a drive shaft to be driven to rotate by electricity outputted by the battery; and
    the hydraulic pump includes an input shaft to receive input of power from the drive shaft and is driven by power inputted from the drive shaft into the input shaft;
    the swivel working machine further comprises:
        a connector to connect the drive shaft and the input shaft; and a first bracket provided independently of the electric motor to connect the electric motor and the support portion; and a structure in which the connector and the first bracket are attached to the electric motor is attached to the support portion via the first bracket.

8. The swivel working machine according to claim 7, wherein the electric motor includes a spigot fitting portion around the drive shaft; and the first bracket includes a socket hole to which the spigot fitting portion is attached.

9. The swivel working machine according to claim 8, wherein an outer diameter of the connector is larger than an inner diameter of the socket hole.

10. The swivel working machine according to claim 7, wherein the support portion includes a housing to surround the connector at a position radially outward of the connector with the electric motor attached to the support portion via the first bracket.

11. The swivel working machine according to claim 7, wherein the first bracket includes a first extension portion extending outward in a radial direction of the drive shaft relative to the electric motor; and the first extension portion includes a first connected portion to be connected to the support portion.

12. The swivel working machine according to claim 11, wherein the first connected portion includes a hole into which a fastener is inserted; and the first bracket and the support portion are connected via the fastener.

13. The swivel working machine according to claim 7, wherein the support portion includes at least one first dowel pin extending in an axial direction of the drive shaft; and the first bracket includes at least one hole into which the at least one first dowel pin fits.

14. The swivel working machine according to claim 1, wherein the electric motor includes a drive shaft driven to be driven to rotate by electricity outputted from the battery;

the hydraulic pump includes an input shaft to receive input of power from the drive shaft and is driven by power inputted into the input shaft from the drive shaft;

the swivel working machine further comprises:

a connector to connect the drive shaft and the input shaft; and a second bracket provided independently of the hydraulic pump to connect the hydraulic pump and the support portion; and a structure in which the second bracket is attached to the hydraulic pump is attached to the support portion via the second bracket.

15. The swivel working machine according to claim 14, wherein the second bracket includes a second extension portion extending outward in a radial direction of the input shaft relative to the hydraulic pump; and the second extension portion includes a second connected portion to be connected to the support portion.

16. The swivel working machine according to claim 15, wherein the second connected portion includes a hole into which a fastener is inserted; and the second bracket and the support portion are connected via the fastener.

17. The swivel working machine according to claim 14, wherein the support portion includes at least one second dowel pin extending in an axial direction of the input shaft; and the second bracket includes at least one hole into which the second dowel pin is inserted.

18. The swivel working machine according to claim 14, wherein the hydraulic pump includes a spigot fitting portion around the input shaft; and the second bracket includes a socket to which the spigot fitting portion is attached.

19. The swivel working machine according to claim 1, wherein the support body includes a plurality of elongated plates for placement of an outer perimeter of a bottom of the battery; and a surface of each of the plurality of elongated plates for placement of the battery unit is smoothened or substantially smoothened by machining.

20. The swivel working machine according to claim 1, wherein:

the electric motor includes a drive shaft to be driven to rotate by electricity outputted from the battery; and the hydraulic pump includes an input shaft to receive input of power from the drive shaft and is driven by power inputted into the input shaft from the drive shaft;

the swivel working machine further comprises:

a connector to connect the drive shaft and the input shaft; and the connector is (i) rotatable together with one of the drive shaft and the input shaft and is restricted from moving in an axial direction, and (ii) rotatable together with the other of the drive shaft and the input shaft and is not restricted from moving in the axial direction.

* * * * *